US00RE44782E

(19) United States
(12) Reissued Patent
Rideout

(10) Patent Number: US RE44,782 E
(45) Date of Reissued Patent: Feb. 25, 2014

(54) MULTICAST VIDEOCONFERENCING

(75) Inventor: Neil Rideout, New Waterford (CA)

(73) Assignee: Supracomm, Inc., Reno, NV (US)

(21) Appl. No.: 13/524,912

(22) Filed: Jun. 15, 2012

Related U.S. Patent Documents

Reissue of:
(64) Patent No.: 7,984,174
Issued: Jul. 19, 2011
Appl. No.: 10/534,370
PCT Filed: Nov. 12, 2003
PCT No.: PCT/US03/36349
§ 371 (c)(1),
(2), (4) Date: Jul. 3, 2006
PCT Pub. No.: WO2004/044710
PCT Pub. Date: May 27, 2004

U.S. Applications:
(60) Provisional application No. 60/425,621, filed on Nov. 11, 2002.

(51) Int. Cl.
*G06F 15/16* (2006.01)

(52) U.S. Cl.
USPC ..... 709/231; 709/230; 709/233

(58) Field of Classification Search
USPC ..... 709/201, 230, 231, 233
See application file for complete search history.

(56) References Cited

U.S. PATENT DOCUMENTS

| | | | |
|---|---|---|---|
| 5,727,002 | A | 3/1998 | Miller et al. |
| 5,832,229 | A | 11/1998 | Tomoda et al. |
| 5,893,091 | A | 4/1999 | Hunt et al. |
| 6,288,739 | B1 | 9/2001 | Hales et al. |
| 6,415,312 | B1 | 7/2002 | Boivie |
| 6,718,168 | B2 | 4/2004 | Ala-Luukko et al. |
| 6,751,218 | B1 | 6/2004 | Hagirahim et al. |
| 7,013,322 | B2 | 3/2006 | Lahr |
| 7,257,641 | B1 | 8/2007 | VanBuskirk et al. |
| 2003/0084106 | A1 | 5/2003 | Erev et al. |
| 2004/0022244 | A1 | 2/2004 | Boers et al. |

FOREIGN PATENT DOCUMENTS

| | | | |
|---|---|---|---|
| WO | WO-2004044710 | A2 | 5/2004 |
| WO | WO-2004044710 | A3 | 12/2004 |

OTHER PUBLICATIONS

Co-pending U.S. Appl. No. 13/117,030, filed May 26, 2011.
Co-pending U.S. Appl. No. 13/166,719, filed Jun. 22, 2011.
International Search Report mailed Sep. 9, 2004 for International Patent Application No. PCT/US03/36349 filed Nov. 12, 2003, pp. 1-4.

*Primary Examiner* — Minh-Chau Nguyen
(74) *Attorney, Agent, or Firm* — Perkins Coie LLP

(57) ABSTRACT

In one embodiment, the invention is a method of transferring data. The method includes receiving a first video data stream at a first machine. The method also includes multicasting the first video data stream in uncompressed and raw form through a network. The method further includes receiving the first video data stream at a second machine. The method also includes playing the first video data stream on the second machine.

23 Claims, 39 Drawing Sheets

| | | | |
|---|---|---|---|
| V=2 | P | PT=SR=200 | LENGTH |
| SSRC OF SENDER | | | |
| NTP TIMESTAMP (NETWORK TIME) | | | |
| NTP TIMESTAMP | | | |
| RTP TIMESTAMP (NETWORK TIME IN RTP UNITS) | | | |
| SENDER'S PACKET COUNT | | | |
| SENDER'S OCTET COUNT | | | |
| SSRC OF FIRST COURSE | | | |
| | CUMULATIVE NUMBER OF PACKETS LOST | | |
| EXTENDED HIGHEST SEQUENCE NUMBER RECEIVED | | | |
| INTERARRIVAL JITTER | | | |
| LAST SR | | | |
| DELAY SINCE LAST SR | | | |

| V=2 | P | X | CC | M | PT | SEQUENCE NUMBER |
|---|---|---|---|---|---|---|
| TIMESTAMP | | | | | | |
| SYNCHRONIZATION SOURCE IDENTIFIER | | | | | | |
| CONTRIBUTING SOURCE IDENTIFIERS (0 TO 15 ENTRIES) | | | | | | |

| *PACKET LOSS PATTERN* | *ACK INFORMATION* | | | |
|---|---|---|---|---|
| | $A_{last}$ | N | $A_{curr}$ | |
| 1_ | 0 | 0 | 1 | |
| 1__4 | 1 | 3 | 4 | |
| 1__4_6 | 4 | 5 | 6 | $A_6$ |
| 1__4_6__9 | 6 | 8 | 9 | |
| _6__9 10 | 6 | 8 | 10 | |
| 6__9 10 11 | 6 | 8 | 11 | |

(B) TRANSMISSION RATE OF A SINGLE RAP FLOW WITH PER-ACK FINE GRAIN RATE ADAPTATION (A) TRANSMISSION RATE OF A SINGLE RAP FLOW WITHOUT FINE GRAIN RATE ADAPTATION

| GROUP | UNICAST (%) | | MULTICAST (%) | | SYSTEM RESOURCES (%) | |
|---|---|---|---|---|---|---|
| | CPU/RAM | OS | CPU/RAM | OS | UNICAST | MULTICAST |
| 1-1 | 30 | 25 | - | - | 55 | - |
| 1-2 | 60 | 25 | 2.6 | 25 | 85 | 27.6 |
| 1-3 | 90 | 25 | 3.1 | 25 | >100 | 28.1 |
| 1-4 | N/A | 25 | - | 25 | N/A | - |
| 1-5 | N/A | 25 | - | 25 | N/A | - |
| 1-6 | N/A | 25 | 10 | 25 | N/A | 35 |
| 1-7 | N/A | 25 | 10 | 25 | N/A | 35 |
| 1-8 | N/A | 25 | 10 | 25 | N/A | 35 |
| 1-9 | N/A | 25 | 10 | 25 | N/A | 35 |
| 1-10 | N/A | 25 | 10 | 25 | N/A | 35 |
| 1-128 | N/A | 25 | 10 | 25 | N/A | 35 +/-7 |

STEPS:
1. ON-LINE LIST IS SENT TO EACH CLIENT
2. CLIENT #1 STARTS CONFERENCE
3. SDP BLOB* IS SENT TO CLIENT #1
4. CONFERENCE NAME IS SENT TO CLIENT #2
5. CLIENT #2 REQUESTS CONFERENCE NAME SDP BLOB*
6. SDP BLOB* IS SENT TO CLIENT #2
7. CONFERENCE CONNECTED

* SDP BLOB CONTAINS SPECIFIC INFORMATION ABOUT EACH CONFERENCE

CLIENTS #2 AND #3 CAN JOIN/CREATE A CONFERENCE WITHOUT DIFFICULTY BECAUSE THEIR ISP USES A MULTICAST ENABLED ROUTER.

CLIENT #1 WILL NOT BE ABLE TO JOIN/CREATE A CONFERENCE BECAUSE THEIR ISP DOES NOT USE A MULTICAST ENABLED ROUTER.

CLIENT #2 CAN JOIN/CREATE A CONFERENCE WITHOUT DIFFICULTY BECAUSE THEIR ISP USES A MULTICAST ENABLED ROUTER.

CLIENT #1 WILL BE ABLE TO JOIN/CREATE A CONFERENCE VIA A MULTICAST TUNNELING SERVER.

THE MULTICAST TUNNELING SERVER RECEIVES A MULTICAST IP AND CONVERTS IT TO A STANDARD UNICAST IP ALLOWING NON MULTICASTING ROUTERS TO RECEIVE AND TRANSMIT THE SIGNAL.

Notes:
The data being sent to a server must be placed in a text box.
A text box must also be created to hold a reply from the server

MULTICAST VIDEOCONFERENCING

Matter enclosed in heavy brackets [ ] appears in the original patent but forms no part of this reissue specification; matter printed in italics indicates the additions made by reissue.

*CROSS REFERENCE TO RELATED APPLICATIONS*

*This application is a U.S. National Phase Application of International Application No. PCT/US2003/36349 filed Nov. 12, 2003, which claims priority to U.S. Provisional Patent Application No. 60/425,621, filed Nov. 11, 2002, which are hereby incorporated herein by reference in their entireties.*

FIELD

The present invention relates to the field of data transmission. More particularly, the present invention relates to videoconferencing using a low-bandwidth approach.

BACKGROUND

Quality Video Conferencing over a network is becoming more and more desirable in businesses and education as well as for personal use. Video Conferencing is a many-to-many relationship, but also includes video telephony and distance education. Presently, there are two main types of audio/video conferencing. First is desktop audio/video conferencing, where a small camera is typically placed on top of a personal computer (PC) or workstation and video is usually displayed in a small window, potentially with shared applications (such as a shared whiteboard). The second type of video conferencing is studio based audio/video conferencing. Here, a room is specially equipped for video conferencing with one or more cameras, microphones, large monitors and possibly other equipment; such as an overhead camera for document viewing (Type 1 is typically software based; type 2 is typically hardware based). The room in which studio conferencing occurs may not be specifically for this purpose. Instead, a standard seminar room with portable equipment may be used. Typically, this type of conferencing is used for formal meetings.

Currently, networks and video conferencing function on a unicast-based technology. Therefore, the internet ends up being a best effort network that has high bandwidth requirements, significant packet loss, packet delay variation, quality degradation and time expenses. As a result, end users have become accustomed to the lack of quality in audio/video data transmission and the constant waiting for the data to be received.

As mentioned, typically, the transmission of full motion video across any computer network, such as, WAN, LAN, CAN, WAP, is achieved using unicast technology. Unicast depends on compression and decompression algorithms in order to transmit vast amounts of video/audio data. Further, unicast requires delay times for buffering video, which is the ability to pre-load portions or all of the video onto a computer for viewing. Also, there is a loss of video quality when compression of the video is used. The problems accompanying such transmission can only be achieved by:

1) hardware modifications
2) bulky deployment
3) high bandwidth availability
4) large computer processor availability
5) need for compression of video data More importantly, the ability to simultaneously video conference more than 3 participants of the video conference poses a challenge.

Compression and decompression costs a lot of time and computer resources. Compression also degrades the quality of the video/audio data. Over the years, end users accepted slow speed and poor video quality. With respect to audio, certain codecs like MP3 provide more speed but less quality. WAV provides better quality but less speed. Thus, each time a user downloads video/audio from the internet, the user necessarily trades off some aspect of performance.

The use of video compression and decompression to transfer video data from one source to another requires a sufficient amount of time and the result is poor quality. Therefore, video conferencing to a large number of participants becomes almost impossible in a unicast environment. In this situation, as well as many others, a multicast environment would alleviate the above mentioned problems with its low bandwidth usage and time efficiency benefiting any network.

SUMMARY

In one embodiment, the invention is a method of transferring data. The method includes receiving a first video data stream at a first machine. The method also includes multicasting the first video data stream in uncompressed and raw form through a network. The method further includes receiving the first video data stream at a second machine. The method also includes playing the first video data stream on the second machine.

In an alternate embodiment, the invention is an apparatus for videoconferencing. The apparatus includes a user interface having a video capture component and a video display component. The apparatus also includes a processor coupled to the user interface to control the video capture component and receive data from the video capture component and to control the video display component and send data to the video display component. The apparatus further includes a network interface coupled to the processor to receive data from the video capture component and to multicast to a network the data from the video capture component. The network interface is further to receive multicast video data from the network and to send multicast data to the processor for use with the video display component.

In another alternate embodiment, the invention is a computer-implemented method of videoconferencing through a network. The method includes receiving a first video stream at a first machine. Additionally, the method includes multicasting the first video stream through the network. Moreover, the method includes receiving the first video stream at a set of machines. Also, the method includes playing the first video stream on the set of machines.

In yet another alternate embodiment, the invention is a machine-readable medium having embodied therein instructions, which, when executed by a processor, cause the processor to perform a method. The method includes receiving a first video data stream at a first machine. The method further includes multicasting the first video data stream in uncompressed and raw form through a network. Also, the method includes receiving the first video data stream at a second machine. Additionally, the method includes playing the first video data stream on the second machine.

In still another embodiment, the invention is a computer-implemented method of videoconferencing between multiple computers through a network utilizing a low-bandwidth and low-overhead protocol that avoids the high resource and high bandwidth requirements of prior videoconferencing methods. The method includes receiving a first video data stream at a first machine through a user interface of the first machine suitable for capturing video data. The method also includes multicasting the first video stream through the network without first compressing the first video stream and without first translating the first video stream into a non-video stream data format. The method further includes receiving the first video stream as multicast through the network at a set of machines. Moreover, the method includes playing the first video stream in a manner perceptible to users through a user interface for use by users to perceive images as received at the first machine on the set of machines.

In yet another alternate embodiment, the invention is an apparatus for videoconferencing. The apparatus includes a means for receiving a first video data stream. The apparatus also includes a means for multicasting the first video data stream in uncompressed and raw form. The apparatus further includes a means for receiving the multicast first video data stream at a remote location. Moreover, the apparatus includes a means for playing the multicast first video data stream at the remote location.

BRIEF DESCRIPTION OF THE DRAWINGS

The following drawings are exemplary of various embodiments and are thus illustrative of the claimed invention rather than limiting.

DETAILED DESCRIPTION

Figures 1, 4:
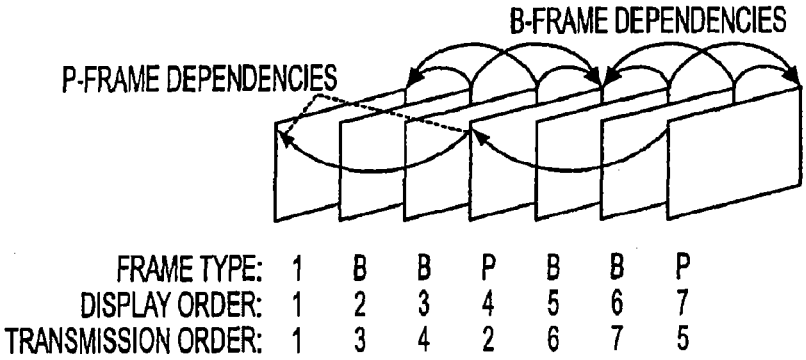
FIG. 1: The figure displays the location of frame types for inter-frame.
FIG. 4: The figure displays characteristics of Real-time transport control protocol (RTCP).

A method and apparatus for multicast videoconferencing is described. The invention is described with reference to various embodiments, which are exemplary and illustrative in nature, rather than limiting. Features or aspects of one embodiment may be included in other embodiments as appropriate, and may not be required for some embodiments of the invention. The scope of the invention is determined by the appended claims.

Incorporated herein by reference is application Ser. No. 60/425,621 as filed in the United States Patent Office on Nov. 11, 2002.

In one embodiment, the invention is a method of transferring data. The method includes receiving a first video data stream at a first machine. The method also includes multicasting the first video data stream in uncompressed and raw form through a network. The method further includes receiving the first video data stream at a second machine. The method also includes playing the first video data stream on the second machine.

In an alternate embodiment, the invention is an apparatus for videoconferencing. The apparatus includes a user interface having a video capture component and a video display component. The apparatus also includes a processor coupled to the user interface to control the video capture component and receive data from the video capture component and to control the video display component and send data to the video display component. The apparatus further includes a network interface coupled to the processor to receive data from the video capture component and to multicast to a network the data from the video capture component. The network interface is further to receive multicast video data from the network and to send multicast data to the processor for use with the video display component.

In another alternate embodiment, the invention is a computer-implemented method of videoconferencing through a network. The method includes receiving a first video stream at a first machine. Additionally, the method includes multicasting the first video stream through the network. Moreover, the method includes receiving the first video stream at a set of machines. Also, the method includes playing the first video stream on the set of machines.

In yet another alternate embodiment, the invention is a machine-readable medium having embodied therein instructions, which, when executed by a processor, cause the processor to perform a method. The method includes receiving a first video data stream at a first machine. The method further includes multicasting the first video data stream in uncompressed and raw form through a network. Also, the method includes receiving the first video data stream at a second machine. Additionally, the method includes playing the first video data stream on the second machine.

In still another embodiment, the invention is a computer-implemented method of videoconferencing between multiple computers through a network utilizing a low-bandwidth and low-overhead protocol that avoids the high resource and high bandwidth requirements of prior videoconferencing methods. The method includes receiving a first video data stream at a first machine through a user interface of the first machine suitable for capturing video data. The method also includes multicasting the first video stream through the network without first compressing the first video stream and without first translating the first video stream into a non-video stream data format. The method further includes receiving the first video stream as multicast through the network at a set of machines. Moreover, the method includes playing the first video stream in a manner perceptible to users through a user interface for use by users to perceive images as received at the first machine on the set of machines.

In yet another alternate embodiment, the invention is an apparatus for videoconferencing. The apparatus includes a means for receiving a first video data stream. The apparatus also includes a means for multicasting the first video data stream in uncompressed and raw form. The apparatus further includes a means for receiving the multicast first video data stream at a remote location. Moreover, the apparatus includes a means for playing the multicast first video data stream at the remote location.

Multicast technology is not restricted to audio/video conferencing. Multicast can be utilized by, but not limited to, teleconferencing, distributed games, software/file distribution, video/audio distribution, and replicated database updates. Its varied applications are audio/video conferencing, internet telephony, and streaming audio/video.

Multicast application models can be either point-to-multipoint or multipoint-to-multipoint. Where point-to-multipoint is one source to multiple receivers and multipoint-to-multipoint is multiple sources and multiple receivers.

Unicast technology creates a one-to-one (1 to 1) connection from the source computer to the client computer. Multicast technology, on the other hand, can create a connection from the source computer to any number of client computers by creating a one-to-one, one-to-many, or many-to-many relationship. With a one-to-many connection, the bandwidth is increased by reducing the number of streams sent. Unlike unicast, multicast does not have to use compression and decompression to transmit audio/video data. Instead, it transmits raw audio/video data over any given network leaving a clear, good quality audio/video picture and sound. Therefore, multicasting offers efficiency for the multicast group and peace and quite for those who are not participating.

There are some desirable features for multimedia networking, such as bandwidth, delay, loss, VCR-like function, and decoding complexity for example. Bandwidth is the rate of flow of data from one point to another point over time. During this flow there is some delay and loss of data occurs. When data is transmitting from sender to receiver there is some complexity in decoding algorithm. Therefore, it may be useful to have a VCR-like function set, such as, play, forward, reverse, stop, and pause for example.

The following description relates to a specific embodiment and some variations on that embodiment. As such, they are exemplary and illustrative of the claimed invention.

Video Compression

Compression is particularly useful in communication because it enables devices to transmit the same amount of data in fewer bits. It is transparent to an end user. Basically, it is the process whereby a collection of algorithms and techniques replaces the original pixel-related information with more compact mathematical descriptions. Decompression is the reverse process of decoding the mathematical descriptions back to pixels for display. In terms of video compression, we define compression as formatting a video file so it can play back and be stored on a personal computer. A compressor can be a piece of software, or hardware, or a combination of both. The goal of a good compressor for acceptable playback is to produce a video with a small file size that looks similar to the original movie when being played on a computer. A poorly compressed file has unacceptable image quality and jerky motion during play back.

Compression Techniques

Compression technique is used to compress the audio/video data that is significantly large in size and requires greater resources for transmission and storage. However, compression may take the load off of storage and transmission but it requires greater processing power when encoding and decoding algorithms are applied.

Lossless techniques create compressed files first and then decompresses the file into exactly the same file as the original. This typically yields about 2:1 compression. Some examples are Run-Length Encoding, Dynamic Pattern Substitution, Lempel-Ziv Encoding, and Huffman Encoding. There is one more general technique used for compression, i.e., Lossy. It is used primarily on still image and video image files, it creates compressed files that decompress into images that look similar to the original but are different in digital make up. This "loss" allows lossy compression to deliver from 2:1 to 1260:1 compression. A wide range of lossy compression techniques is available for digital video. Some examples are JPEG, MPEG, and H.261 (P×64) Video Coding Algorithms. Note that for 1260:1 compression, no legible data can be recovered according to Shannon's Law.

Intra-Frame and Inter-Frame Redundancy

Video compression involves the use of Intra-frame and Inter-frame compression. Inter-frame compression typically uses a system of key and delta frames to eliminate redundant information between frames. Key frames store an entire frame and delta frames record only changes. Intra-frame compression typically is performed solely with reference to information within a particular frame. It is performed on pixels in delta frames that remain after Inter-frame compression and on key frames.

Intra-frame compression is also known as "I-Frame". It is applied on individual frames, such as photographs and datagrams. It is designed to minimize the duplication of the data in each picture, known as Spatial Redundancy. In MPEG-1 Standard, I-Picture is being coded by intra-frame coding. When encoding I-Picture, one may only reduce the spatial redundancy in the picture without referencing other pictures. The coding process is thus similar to JPEG Standard. So encoding I-Picture is less complex than P-frame and B-frame. Decoding I-Picture is then the reverse process of encoding process. See FIG. 1 to view the position of I-frames, P-frames and B-Frames. Inter-frame is known as "P-Frame". It is a compression between frames. It is designed to minimize data redundancy in successive pictures, known as temporal redundancy. It is used in block-based motion pictures.

FIG. 1 displays the location of frame types for inter-frame. As illustrated, an I-frame is the first frame, followed by two B-frames, a P-frame, two more B-frames and a P-frame. The dependencies of the frames illustrated indicate which other frames are needed to properly utilize (display) the information encoded in the frame in question. For example, the fourth frame (P-frame) without the first frame (I-frame) may lack basic background or context information, resulting in an incomplete scene. Similarly, the second frame (B-frame) without one of the first frame or the fourth frame may lack basic background or context information, thus again resulting in an incomplete scene. The display order refers to how the frames are rendered or displayed, while the transmission order refers to the order in which the frames are transmitted, or the priority for transmission in bandwidth-limited environments where only some frames may be transmitted. Note that frames as illustrated may relate to layers of audio, levels of detail in video or visual depictions, layers of data, or other portions of data, rather than specifically being video frames.

Scalable vs. Non-Scalable Coding

In scalable video coding systems, representations are available in a series of relative degrees of resolution. Three dimensional (3D) Discrete Wavelet Transforms (DWT) are used for highly scalable video coding within a natural multi-resolution representation. The temporal transform effectively exploits motion to attempt maximum compression. This requires motion modeling with sufficiently precise motion parameters. In non-scalable coding, there have been various techniques used to optimize the number of bits spent on motion for a target bit-rate but the target bit-rate is unknown in scalable coders. Without some form of scalability in the motion information, scalable coders cannot operate equally efficiently over a wide range of bit-rates. For example, at low bit-rates the motion information might consume an undue proportion of the available bits.

Furthermore, at low bit-rates the video is usually decoded at a reduced spatial resolution, so high-precision motion vectors are virtually useless. Similarly, at high bit-rates the motion cost becomes insignificant, so higher compression may be possible with more precise motion information.

Fine Granular Scalability (FGS) is capable of being modified by any unpredictable bandwidth variations, due to heterogeneous access-technologies of the receivers or due to dynamic changes in network conditions. It can work on low complexity decoding and low memory requirements to provide common receivers and provides an opportunity to stream and decode any video content that is run over the internet. This, in general, supports both multicast and unicast and eliminates the need for coding content in different formats to serve different kinds of applications. FGS has been recently adopted by the ISO (International Standard Organization) MPEG-4 video standard as the core video-coding method for the MPEG-4 Streaming Video Protocol (SVP).

Congestion Control

Excessive loss and delay have overwhelming effects on video presentation quality and are usually a result of congestion. Congestion in any given network becomes a serious issue; therefore, there is a great need to control it. Any network, whether it is the internet, Local Area Network (LAN), etc., must deal with congestion. Congestion causes a network to become slow, bogged down, and causes a loss of information. Thus congestion leads to inefficiency and, if congested bad enough, a collapse of the network. Described below are some ways in which this congestion can be avoided in a multicast environment.

Multimedia streaming preferably is implemented with several features. First it should have a relatively constant rate at which it can flow. If the rate is not relatively constant, then it leads to low standard audio/video transmission. There is also a preference for low latency for packet delivery. If the packet delivery is not low latency then the result is slow packet transmission from one point to another. Small latency variance is another preferred feature of multimedia streaming. If there is a high latency variance for the packet delivery then resulting transmission may have lost packets resulting in a poor quality stream. If multimedia streaming does not have all of the above mentioned features, then the resulting transmission may be fragmented, poor quality or even not readable, depending on the severity of variation in the features. Multimedia streaming is more focused on a timely delivery rather than complete reliability. It appears that the fundamental ability to reduce packets on demand, but still maintain equal quality is preferable. Like unicast technology, multicast technology should have some sort of congestion control to prevent errors in transmission. For video streaming, congestion control takes the form of rate control. In trying to design multicast rate control protocols for a wireless and wired network there are some major challenges. One challenge is the varying transmissions characteristics of the wired/wireless media such as bandwidth, delay, and error. Another challenge is the conflicting flow control requests from different receivers. Rate control attempts to minimize the possibility of congestion by matching the rate of the video stream to the available bandwidth on the network.

Rate control can be done in three ways—at the source, at the receiver or hybrid. Therefore, there are three main categories of Rate Control—Source-Based Rate control, Receiver-Based Rate control, and Hybrid Rate control. Each category will be discussed in detail below.

In Source based rate control, the sender is responsible for adjusting the video transmission rate. This type of control can be applied to both unicast and multicast technologies. Source based rate control can minimize packet loss by matching the rate of the video stream to the available bandwidth on the network. Feedback is employed by a source based mechanism. This source based mechanism relays the changing status of the internet or network to the sender/source.

Based on the feedback from the network, the sender/source can adjust the transmission rate of the video. Source based rate control uses a probe based approach, where the source probes for the available network bandwidth by adjusting the sending rate in a way that preferably maintains minimal packet loss. The sending rate can be adjusted in two ways: first through additive increase and multiplicative decrease; secondly, by multiplicative increase and multiplicative decrease. Source-Based Rate control has two categories. They are single channel multicast and multiple channel multicast.

Single channel multicast deals with IVS (INRIA Video Conferencing System). In Single Channel multicast all the receivers share the same channel. As a result, single channel multicast can not accommodate demands from receivers with varying access link bandwidths. Single Channel multicast is also based on a probe based approach using AIMD, where the sender probes for the available network bandwidth. By doing this each receiver determines the network status. To probe for the available bandwidth, the source solicits network status information through probabilistic algorithms to avoid excessive feedback from receivers.

In Multiple channel multicast the receivers are grouped according to receiving rates. The sender of a multiple channel multicast evaluates the available outgoing bandwidth that can transmit X number of packets per unit time to Y number of receivers capable of receiving Z number of packets (number of packets available to be received by a receiver is different for each receiver) per unit time. To accommodate the difference in receiving rate, the sender uses multiple channel multicasting to ensure that each receiver receives all the packets in a reasonable amount of time and support any receivers that join at diverse times.

In receiver based rate control, the receiver regulates the receiving rate of video streams by adding/dropping channels, resulting in the source/sender not participating in the rate control. This type of control is aimed at solving the heterogeneity problem in the multicast case. Receiver-Based Rate control works reasonably well for unicast technology, but typically this type of rate control is applied to layered multicast video, where there are several layers in the video and each layer corresponds to one channel in the multicast tree. Receiver based rate control follows the probe-based approach. This approach consists of two parts. When there is no congestion the receiver probes for available bandwidth by joining a layer/channel increasing its receiver rate. If after the joining to a layer/channel there is no congestion, then the join was successful. Secondly, when there is congestion, the receiver drops a channel causing a reduction in its receiver rate.

Receiver based rate control is also a model based approach, which is based on the TCP throughput model. The following algorithm is the throughput model for TCP:

$$\lambda = \frac{1.5\sqrt{\frac{2}{3}} * \mathrm{MTU}}{\mathrm{RTT} * \sqrt{p}} \qquad [1]$$

This algorithm converts the data that is being transferred so it will be sent over the network. Where λ in [1] is the throughput of a TCP connection and MTU and RTT are maximum transit unit and round trip time, respectively. The "p" shows the packet loss ratio for the transmission. Based on this, Receiver-Based Rate control subscribes base layers, calculates throughput, and determines whether a base layer needs to be dropped and if the video transmission should be stopped. If the following equation is false, $\lambda < \gamma 0$ and the base layer is not dropped and it keeps receiving video, then it determines the current highest layer.

Hybrid rate control is targeted at multicast video and applied to both layered and non-layered video. Hybrid rate control is a combination of Source-Based Rate control and Receiver-Based Rate control. This type of control is based on Destination Set Grouping (DSG). With DSG there are multiple streams of the same video with different rates and quality and each is sent to an IP multicast group. Here, the receiver chooses which multicast group to join and the source/sender uses the feedback from each stream to adjust each streams rate.

Rate Shaping

Rate shaping is a technique that is used to modify the TCP window size to control the rate at which hosts will transmit TCP-based traffic. When the TCP window is full, the host is going to pause the transmission. Dynamic rate shaping is a signal processing technique that adapts the rate of compressed video (MPEG-1, MPEG-2, H.26x) to dynamically varying bandwidth constraints. The objective of rate shaping is to match the rate of the pre-compressed video bitstream to the target rate limitation. Rate shaping is required for Source- Based Rate control because the stored video may be pre-compressed at a different rate that may not match the available bandwidth on the network. It appears based on current research that if compression is required in low bandwidth situations and multicast congested environments, then rate shaping is the methodology to be used. See FIG. 2. In the streaming server the compressed video is stored on a storage device. It then goes to the rate shaper which modifies the compressed video and sends it to the transport protocol, which transmits the video to the internet. In the reverse direction, the transmit protocol sends the video to the Source-Based Rate control which adjusts the rate. It is then passed to the rate shaper and continues down the line.

Figures 2, 3:
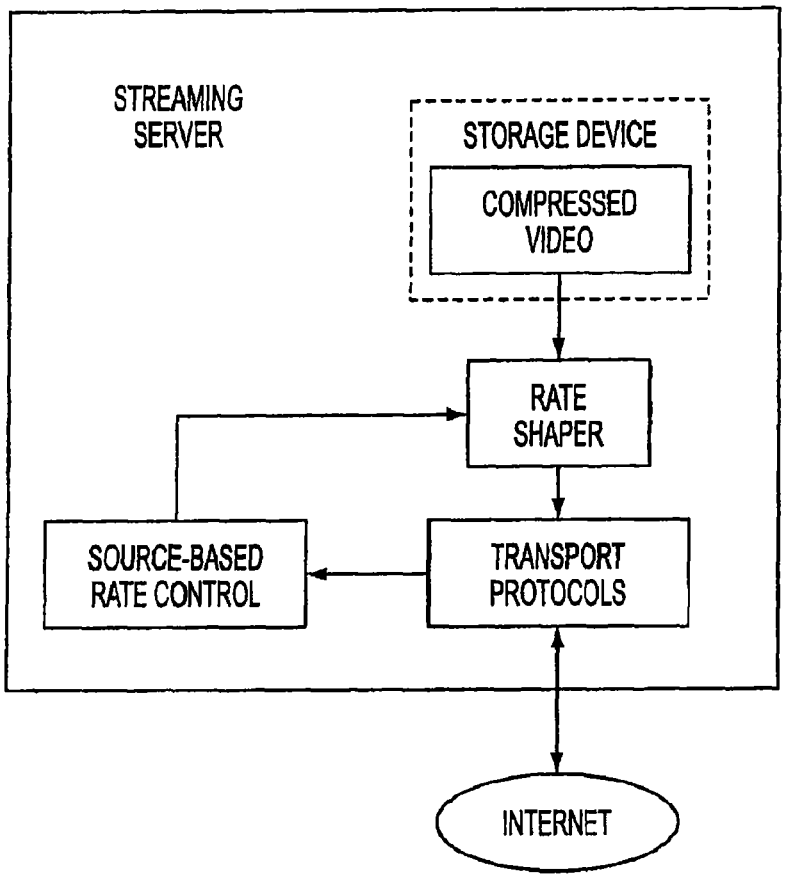
FIG. 2: This figure shows how the rate shaper manages the compressed video and where it fits in the network.
FIG. 3: The figure displays characteristics of Real-time transport Protocol.

FIG. 2 shows how the rate shaper manages the compressed video and where it fits in the network. The streaming server may be implemented as hardware or software or a combination of both for example, and thus may be embodied in a medium or in media. The storage device contains compressed video data (or data of some form/type) which is to be transmitted. Video data is provided to the rate shaper, which provides the data to the transport protocols (or transport module). The transport protocols interact with the network (such as the internet) and also interact with the source-based rate controller, which feeds back to the rate shaper to regulate the flow of data through the transport protocols.

Rate Filter

Rate filter can be divided up into many types of filters. There are four types of filters that will be described; they are as follows—codec filter, frame-dropping filter, layer-dropping filter, and frequency filter. All four filters may be deployed. Some like the codec filter may be modified to handle more than just audio/video.

The codec filter performs transcoding between different schemes and is used to decompress and compress a video stream.

Frame-dropping filters can distinguish frame types (such as I-frames, P-frames, B-frames, etc.) and drop frames according to importance. As an example, the dropping sequence may be B-frames, P-frames and finally I-frames. Frame-dropping filters may be used at the source or in the network. This filter is used to transmit frames at a lower rate by reducing the data rate of the video stream as a result of discarding a number of frames.

Layer-dropping filter is similar to frame dropping filter but instead of dropping frames it drops layers. Therefore, the layer dropping filter distinguishes between layers and drops them according to importance. The dropping sequence in this type of filter goes from the highest enhancement layer down to the base layer. This filter reduces the bandwidth usage but it also affects the frame rate.

A frequency filter operates in a frequency domain and performs operations on the compression layer. Frequency filters have different mechanisms. Low pass filtering is used to discard Discrete Cosine Transform (DCT) coefficients of high frequencies. A colour reduction filter is essentially the same as a low pass filter except it only operates on the chrominance (difference between one color and a reference color of the same brightness and chromaticity) information on the video stream. A colour to monochrome filter removes all colour information from the video stream. A frequency filter reduces the bandwidth usage without reducing the frame rate. Although this is good, it leads to a reduction in presentation of the resulting frame/picture.

TCP/UDP/BDP

TCP stands for Transmission Control Protocol. It is a basic communication language or protocol of the internet. It is a set of rules (protocol) used along with the IP (Internet Protocol) to send data in the form of message units between computers over the internet. In a combination of TCP/IP, TCP takes care of keeping track of the individual units of data (packets) and IP handles the actual delivery of the data. It also works for re-transmission mechanisms, tolerates against the delay of data, multiplicative decrease in case of congestion, and sharp variation in visual effect.

UDP stands for User Datagram Protocol. It is a communication protocol that offers a limited amount of service when messages are exchanged between computers in a network that uses the Internet Protocol (IP). UDP is an alternative to the Transmission Control Protocol (TCP) and, together with IP, is sometimes called UDP/IP. It is a lightweight transport protocol as compared to TCP, it is built on top of the IP, and squeezes extra performance from IP by not implicating some of the features that make IP a heavy-weight protocol. It is used where delivery is not guaranteed. It provides connectionless service that is not possible in TCP.

Bi-directional Delivery Protocol (BDP) utilizes multiple facets of TCP and UDP and acts as a bi-directional multicast delivery mechanism. On top of BDP, a synchronous stream of corrective data that bi-directionally passes from multipoint A to multipoint B in a constant error free state may be added.

BDP may be implemented in one embodiment by sending a binomial TCP packet forward and sending a simple UDP packet back, allowing for matching up of the TCP packet and the UDP packet. Moreover, checksums may be used to provide evidence of data integrity and allow for error correction. The packets and the checksums, alone or in combination, may be used to create a binomial acknowledgment mechanism.

For multicasting, it may be preferable to use multicast-enabled routers. Most routers are multicast-capable, but convincing third parties to enable this capability is not always an option. Using BDP, one may avoid requiring the routers to be actively involved in multicasting, and may avoid requiring multicast capabilities in routers. The control packets of the BDP may be sent at a low frequency which is used by software at high levels of the data processing/transmission stack but is not used or noticed by the low-level hardware of the routers in the data processing/transmission stack. Note that detection in this case relates to detection by the router such that the router will act on the packets, rather than detection in the sense of electrically sensing the data that makes up the control packets (and passing it up the data processing stack). Note that multicast may also be implemented using a standard socket and self-generated servers, such that the multicast triggers further transmission upon reception at a node on a network (such as a client device). In such an instance, BDP as described above may be used to varying degrees, depending on requirements of a particular implementation. Furthermore, in such an instance, prior installation of software to implement the protocol and receive data at a client device may not be necessary.

A flow (such as a video flow) is TCP-friendly if its arrival rate does not exceed the bandwidth of a conformant TCP connection in the same circumstances. The video connection may avoid congestion in a similar way to that of TCP and it can compete fairly with TCP flows. For this reason, the model-based rate control is also called "TCP-friendly" rate control.

Protocols

A protocol is a language of the network. It is a standard way of communicating across a network. TCP is one of the examples of a protocol which runs over a network. There are several types of protocols used on any given network, but for this document, what is described is Real-time Transport Protocol, Real-time Transport Control Protocol, and Resource Reservation Protocol. Real-Time Transport Protocol (RTP) is a standard protocol that transports real-time data, including video and audio. It is used for interactive services such as Internet telephony and Audio/video conferencing. It is developed by Internet Engineering Task Force (IETF). It provides end-to-end delivery services for data with real-time characteristics, such as interactive audio and video and supports a wide variety of fixed and variable-speed audio and video signals. It consists of two parts: one is called data and another is called control, i.e., Real-Time Transport Control Protocol (RTCP). Data of RTP is a thin protocol providing support for applications with real time properties such as continuous media (e.g., audio and video), including timing reconstruction, loss detection, security and content identification. RTP components include: a sequence number, which is used to detect lost packets; payload identification, which describes the specific media encoding so that it can be changed if it has to adapt to a variation in bandwidth; frame indication, which marks the beginning and end of each frame; source identification, which identifies the originator of the frame; and intra-media synchronization, which uses timestamps to detect different delay jitter within a single stream and compensates for it.

Real-Time Transport Protocol provides end-to-end delivery services for real time audio/video data in multicast distribution. It supports a variety of fixed and variable speeds of audio and video packets in both directions, i.e., either request is for transmitting data from sender to receiver or receiver to sender. During transmission of packets, padding is used between packets. FIG. 3 shows the process of transmitting data in RTP. In this figure, V is used for variable, P is for padding between packets, X is for extension of the files, such as MPEG or JPEG, CC is for Contribution source count, M is for marker (for silence suppression), and PT is for payload type. Real-Time Transport Control Protocol (RTCP) provides minimal control over the delivery and quality of the data. RTCP components include: quality of service (QoS) feedback, which includes the numbers of lost packets, round-trip time, and jitter, so that the sources can adjust their data rates accordingly; session control, which uses the RTCP BYE packet to allow participants to indicate that they are leaving a session; identification, which includes a participant's name, e-mail address, and telephone number for the information of other participants; and inter-media synchronization, which enables the synchronization of separately transmitted audio and video streams. These are the four main functions of RTCP.

Feedback information checks the quality of the data distribution. During an RTP session, RTCP controls packets and periodically sends the packets to all participants. Those packets contain information about the number of RTP packets sent and the number of packets lost.

Transport-Level Identification is used to keep track of each of the participants in a session and to associate multiple data streams from a given participant in a set of related RTP sessions, e.g., the synchronization of audio and video.

Transmission Interval Control ensures that the control traffic will not overwhelm network resources and is preferably limited to at most 5% of the overall session traffic.

The optional function of Minimal Session Control can be used to convey a minimal amount of information to all session participants, e.g., to display the name of a new user joining an informal session. When an RTP session is initiated, an application defines one network address and two ports for RTP and RTCP. If there are several media formats such as video and audio, a separate RTP session with its own RTCP packet may be required for each one. Other participants can then decide which particular session, and hence medium, they want to receive.

RTCP is basically used to monitor the quality of service. RTCP combines with RTP to control the time delay and loss of packets.

In FIG. 4, there are some steps that show the transmission of data between receiver and source. Here, the fraction lost and the cumulative number of packets lost is where RTCP has problems, but the joining of RTP manages this.

Figure 5:
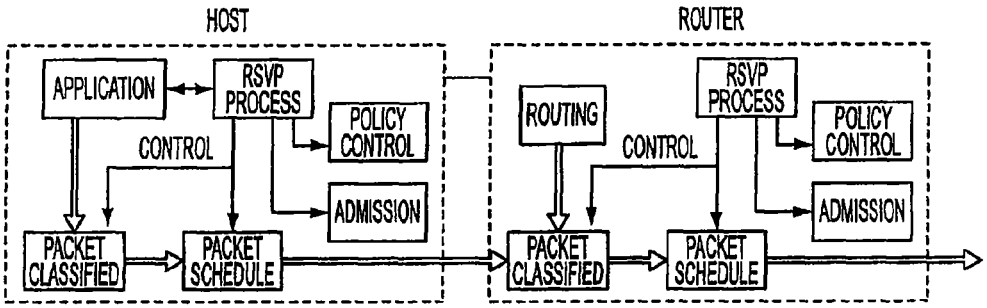
FIG. 5: The figure illustrates the process that occurs between host and router in Resource Reservation Protocol (RSVP).

Resource Reservation Protocol (RSVP) is an IETF proposed standard for requesting defined quality-of-service (QoS) levels over IP networks such as the Internet. It is a set of communication rules that allows channels or paths on the internet to be reserved for the multicast transmission of video and other high-bandwidth messages. The protocol was designed to allow the assignment of priorities to "streaming" applications, such as audio and video, which generate continuous traffic that requires predictable delivery. RSVP works by permitting an application transmitting data over a routed network to request and receive a given level of bandwidth. Two classes of reservation are defined; one is controlled load reservation that provides service approximating "best effort" under unloaded conditions and another is guaranteed service reservation that provides service that guarantees both bandwidth and delay. There is no packet loss and minimal delay in the delivery of packets, if the packet is transmitting between host and router and finally received to the end user, e.g., client. It reserves the resources along the path from receiver to sender. It also provides a control load service between sender and receiver. FIG. 5 shows the process that occurs between host and router. H.225 (Registration Admission Status) RAS control is basically a call signaling protocol and it is used in media stream packetization for packet-based multimedia communication systems.

FIG. 5 illustrates the process that occurs between host and router in Resource Reservation Protocol (RSVP). At the host, the application supplies data to the packet classifier and interfaces with the RSVP control. RSVP control employs process control and admission, and controls the packet classifier and the packet scheduler. The packet scheduler receives packets of data from the packet classifier and transmits those packets to the router. Within the router, routing control controls the router packet classifier and provides routing data. The router RSVP control uses the router policy control and router admission components, and controls the router packet classifier and router packet scheduler. The router packet scheduler transmits the packets on the network. H.225 call control signaling is used to setup connections between H.323 endpoints and reliable TCP call control channel is created across an IP network on TCP port 1720. See FIG. 6. This port initiates the Q.931 call control messages for the purpose of maintaining, connecting, and disconnecting calls. ITU H.225 recommendation specifies the support of Q.931 signaling messages. It provides the function of discovery, registration, admission, disengage, and bandwidth change. When a gateway is present in the network zone, H.225 call setup messages are exchanged either via Direct Call Signaling or Gatekeeper-Routed Call Signaling (GKRCS).

Figure 6:
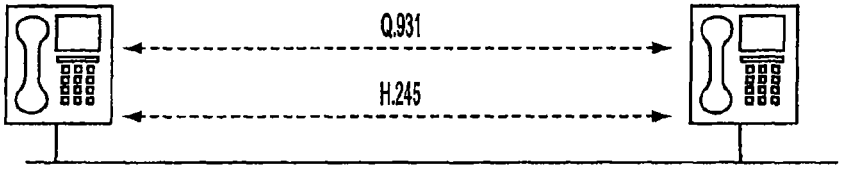
FIG. 6: The figure illustrates call signaling in H.232.

FIG. 6 illustrates call signaling in H.232. The protocol uses H.245 protocols and Q.931 protocols between two endpoint terminals, such as telephones for example.

Figure 7:
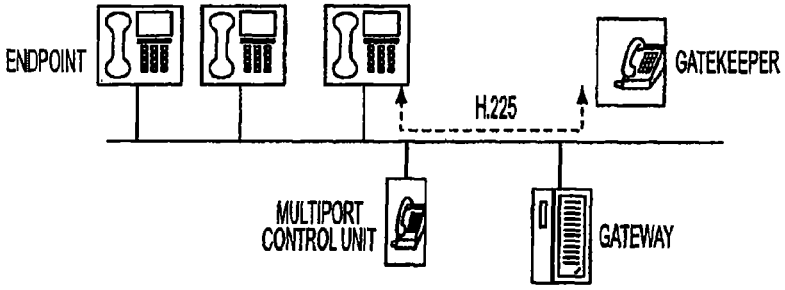
FIG. 7: The figure illustrates RAS control in H.225.

FIG. 7 illustrates RAS control in H.225. An endpoint terminal (such as a telephone or other terminal for example) uses H.225 signaling to request access to a network (not shown) from a gatekeeper, which controls the multiport control unit and gateway, thereby controlling access to the network.

RAS signaling protocol is used between endpoint (multiport control unit, Gateway) and Gatekeeper. See FIG. 7. RAS channel is opened before any other channel and is independent of the call setup and media transport channels. It uses User Datagram Protocol (UDP) ports 1719 (H.225 RAS messages) and 1718 (unicast gatekeeper discovery).

The Gatekeeper is an H.323 entity on the network that provides services such as address translation and network access control for H.323 terminals, gateways, and Media Control Units (MCU). Gatekeepers decide the method chosen during the RAS admission message exchange. If there is no gatekeeper present, H.225 messages are exchanged directly between the endpoints. It also provides bandwidth control services.

H.245 Media Control and transport handles end-to-end control messages between H.323 entities and it is used to negotiate channel usage and capabilities like flow control and exchanging messages. It takes care of multiplexing multiple media streams for function such as lip synchronization between audio and video communication.

Q.931 is an Integrated Services Digital Network (ISDN) connection control protocol, roughly comparable to TCP in the Internet protocol stack. Q.931 doesn't provide flow control or perform retransmission; it establishes first and then tears down calls between end points.

Session Initiation Protocol (SIP) is an IETF standard protocol for initiating an interactive user session that involves multimedia such as video, voice, chat, gaming, and virtual reality. It is an application-layer control/signaling that establishes and maintains session level information by the creating, modifying and tearing down of sessions, session parameters and media types with one or more participants. Sessions may include Internet telephone calls, multimedia distribution, and multimedia audio or video conferences. It is also considered a request-response protocol, where it deals with requests from clients and responses from servers. Because it can be used with any datagram or stream protocol such as UDP, TCP, ATM, etc., SIP is transport layer independent. The clients, who are typically referred to as user agents, communicate with the SIP server via a client-server relationship.

SIP supports personal mobility and is heavily influenced by http. It is considered to be a light weight protocol compared to H.323, meaning it allows for a faster setup and fewer messages are required on a call. SIP is flexible in enabling other information to be included in messages. It also has the ability to allow the user devices to exchange specialized information to enable new services. As an example, if a terminal is considered busy, SIP would be able to determine when the busy terminal would become free. SIP also creates its own addressing. 9729965000@gateway would be an example of this addressing.

Internet Call Processing supports decentralized and centralized multipoint conferences. Multipoint conference capabilities are handled in a variety of methods and configurations under H.323.

Decentralized multipoint conferences make use of multicast technology. Basically, H.323 terminals can multicast audio and video to other terminals without sending the data to an MCU. But the control of multipoint data is still centrally processed by the MCU, and H.245 control channel information is still transmitted in a point-to-point mode to an MC.

Centralized multipoint conferences require the existence of an MCU to facilitate a multipoint conference. All terminals send audio, video, data, and control streams to the MCU in a point-to-point fashion.

Media Gateway Control Protocol (MGCP) is a standard protocol that controls the signaling and session management during the audio/video conference. It is also known as H.248 or MEGACO. It is used to communicate between a media gateway and the media gateway controller. Softswitch is used to bridge a Public Switched Telephone Network (PSTN) and Voice over Internet Protocol (VoIP), by separating the function of gateway from the media gateway. See FIG. 8. Basically, it is an open Application Program Interface (API) and it is a new approach to telephony switching. It can lower the cost of local-exchange switching and ease the migration of networks to support packets from one end to another. The softswitch is where all the service intelligence resides for the delivery of local telephone services.

Figure 8:
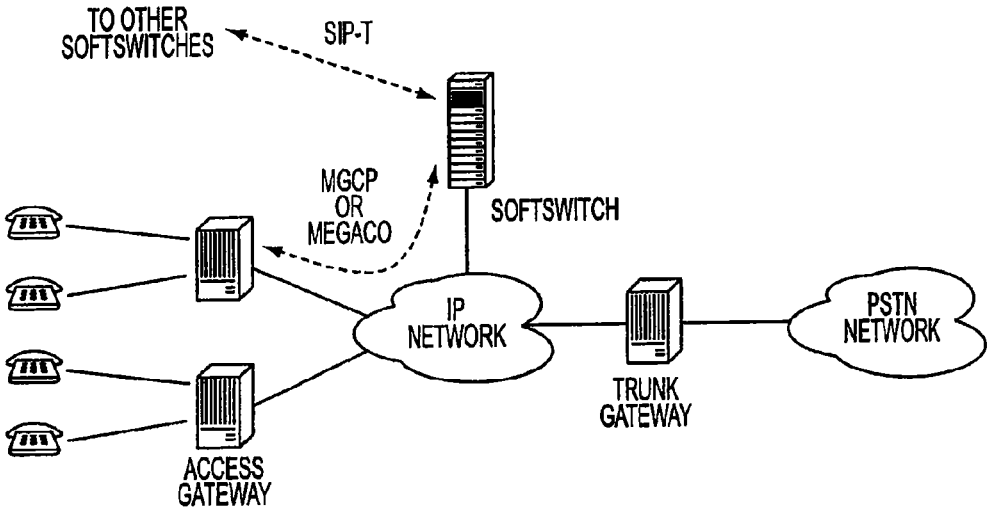
FIG. 8: The figure shows a Softswitch architecture.

FIG. 8 shows a Softswitch architecture. Endpoint telephones are coupled to access gateways, which are coupled through an IP network to a softswitch and a trunk gateway. The softswitch controls coupling between the access gateways and the trunk gateway through the IP network. The trunk gateway is coupled to the PSTN (telephone network switch or switch fabric). Quality of Service (QoS) is based on the idea that transmission rates, error rates, and other influences of the internet or any given network can be controlled, measured, improved and to some extent guaranteed in advance. It is measured and guaranteed in terms of the average delay at a gateway, variation in delay, cell loss and the error rate. QoS is a specific concern for the continuous transmission of high-bandwidth video and multimedia information over a network. Ordinary best-effort protocols that are used in public networks have issues transmitting this data independently.

ATM QoS parameters are a set of parameters that determine the quality of service. The following parameters are negotiated at the start of the call: Peak-to-peak cell delay variation, maximum cell transfer delay and cell loss ratio. There are also some parameters that are controlled via the networks design. These parameters are as follows: cell error ratio, severely errored cell block ratio, and the cell misinsertion rate.

Real-time multimedia over ATM (RMOA) was developed by ATM forum. RMOA has a new type of gateway referred to as H.323-H.323 gateway, which is considered to be more efficient and scalable than H.323 Voice over IP (VoIP) over ATM. Since the IP and UDP headers are not carried on the ATM network, the network becomes more efficient. As a result, RMOA takes advantage of the QoS capabilities of an ATM network. H.323 defines how to support multimedia traffic on best-effort packet-based networks which is an ITU-T (International Telecommunication Unit) recommendation. The two H.323-H.323 gateways are placed at the edges of the ATM network and are aided by H.323 gatekeepers. Gateways intercept the H.323 signaling messages which are inspected and the information carried within them is used to set up dedicated virtual circuits (VC) in the ATM network. A VC has appropriate resources committed in the network to transport each of the real-time media streams.

Figure 9:
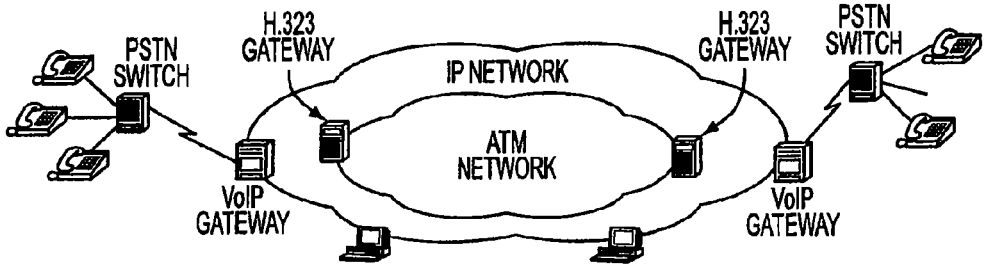
FIG. 9: The figure shows Real-Time Multimedia over ATM (RMOA).

A H.323 gatekeeper provides the service of registration, admission and status through the RAS channel, which also includes address resolution. Gatekeeper poses alias addresses for different endpoints. The gatekeeper can then translate this alias into an IP address and transport protocol port number. This process leads to H.323 Zones. A zone is the set of H.323 endpoints registered with a gatekeeper. The number of gatekeepers present equals the number of zones present. Essentially, gatekeepers force signaling messages to be specifically addressed to each gateway along the path. Gatekeepers use other codec's such as H.245 to carry out its tasks. Using FIG. 9 as a reference, it shows the setup of RMOA.

A basic telephone (demonstrated to the far left and right in FIG. 9) call into the PSTN (Public Switched Telephone Network) which gets routed to the VoIP gateway. From here, it goes onto the internet and passes through the H.323 gateway leading into the ATM network. It is important to maintain a QoS over any given network. Adding QoS to IP parameters is a relatively simple means for prioritization of traffic (RFC 2475) because it makes use of the IPv4 type of service (TOS). This process requires two types of packet forwarding. The first type is expedited forwarding, which assigns a minimum departure rate greater than the pre-agreed maximum arrival rate. The second type of packet forwarding is assured forwarding, where packets are forwarded with a high probability they arrive no faster than the pre-agreed maximum. Although this process pushes processing to the edge, it keeps the core relatively simple.

Figures 10, 11:
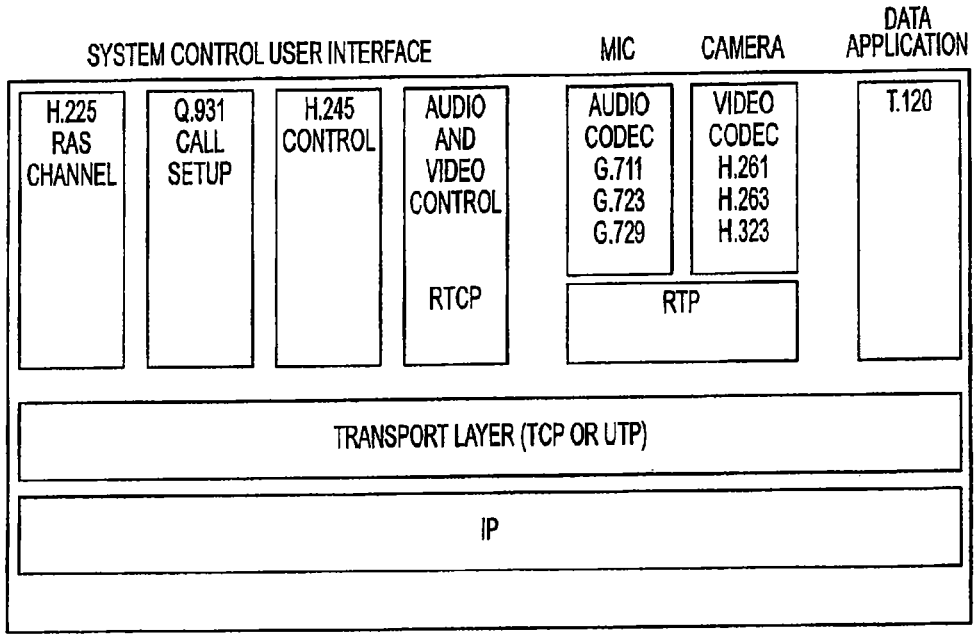
FIG. 10: The figure displays a TCP control box
FIG. 11: The figure shows the loss of packets and ACK information.

In FIG. 10, TCP Control Box consists of System Control User Interface, Mic, Camera, Data application, Transport Layer, and Internet Protocol. System Control User Interface including call signaling protocols (H.225), network interface layer 3 specification for basic call control (Q.931), control protocol for multimedia communication (H.245), and Audio and Video Control (RTCP). The Audio and Video codec that are used for Mic and Camera are G.711, G.723, G.729, H.261, and H.263. Data application is in the form of T.120, e.g., data protocols for multimedia conferencing.

Rate Adaptation Protocol (RAP) was proposed by R. Rejaie in 1998 and is based on an end-to-end architecture. RAP is an end-to-end rate based congestion control mechanism that can be deployed by any UDP based application. It deploys an additive increase and multiplicative decrease algorithms for coarse grain rate adjustments that follow window adjustments in TCP. RAP uses RTT signal to perform fine grain rate adaptation.

The decision function is based on transmission rates and whether congestion is present or not. If the network does not detect any congestion, then it will periodically increase the transmission rate. On the other hand, if congestion is detected, it will immediately decrease the transmission rate until congestion is no longer detected.

$$SRTT_i = 7/8 * SRTT_i + 1/8 * SampleRTT \quad [2]$$

$$Timeout = \mu * SRTT + \delta * VarRTT \quad [3]$$

$$\text{WHILE } (DepartTime_i + Timeout >= CurrTime) \quad [4]$$
$$\text{IF } (Flag_i \text{ != Acked})$$
$$\text{THEN}$$
$$Seq_i \text{ is lost}$$

There has been a mechanism created to detect loss in this process. The transmission of the data continues to be processed through the use of [2] until it determines that there is some packet loss. When packet loss is detected it is referred to as a timeout and goes through [3] to determine timeout (packet loss). The timeout mechanism is a backup for critical scenarios; for example, when a burst of packets is lost. Before a new packet is sent, the source sorts through the transmission history and detects timeout losses using [4].

Sometimes there are gaps in sequence numbers (ACK-Based). FIG. 11 shows the packet loss sequence and the information. Where $A_{curr}$ is the current packet and $A_{last}$ is the last packet before N, where N is the last packet before $A_{curr}$ that was still missing, that was received. In the first row of the packet loss pattern diagram, $A_{curr}$ is set to one, since the last packet before $A_{curr}$ is zero (0) making $A_{last}$ 0. This first transmission of packets is considered an open ended packet since N is equal to zero (0).

AIMD has proposed a set of algorithms that are to be carried out when there is packet loss and another set when there is no packet loss. Also proposed was another set of algorithms to determine when there is packet loss and when there is not packet loss, these equations will be discussed in detail later.

$$S_i = S_i + \alpha(\text{step height})$$

$$S_i = PacketSize/IPG_i$$

$$IPG_i + 1 = IPG_i * C/(IPG_i + C)$$

$$\alpha = S_i + 1 - S_i = PacketSize/C \quad [5]$$

When there is no packet loss then [5] is carried out. When it has been determined that packets have been lost, then [6] is carried out.

$$S_i + 1 = \beta * S_i$$

$$IPG_i + 1 = IPG_i/\beta$$

$$\beta = 0.5 \quad [6]$$

Where IPG is the inter-packet gap or packet loss and C is an equation that determines the number of packets sent during each step and increased by K every step.

The decision frequency is used to determine how often to change the rate. It is suggested that rate-based schemes modify their rates no more than once per RTT (Round Trip Time) using the most recent value Smoother RTT (SRTT). The decision frequency should not change too much as it may result in oscillation but not changing enough may result in unresponsive behaviour. The decision frequency preferably adjusts the Inter-Packet Gap (IPG) once every Round Trip Time (RTT) using the most recent value of Smoothed RTT (SRTT). In a steady state, the number of packets transmitted per step is increased by one and C is adjusted accordingly. If IPG is updated once every T seconds and C is determined to be T/K, then the number of packets sent during each step is increased by K every step. Here, RAP uses K=1 to emulate the TCP window adjustment.

Figure 12:
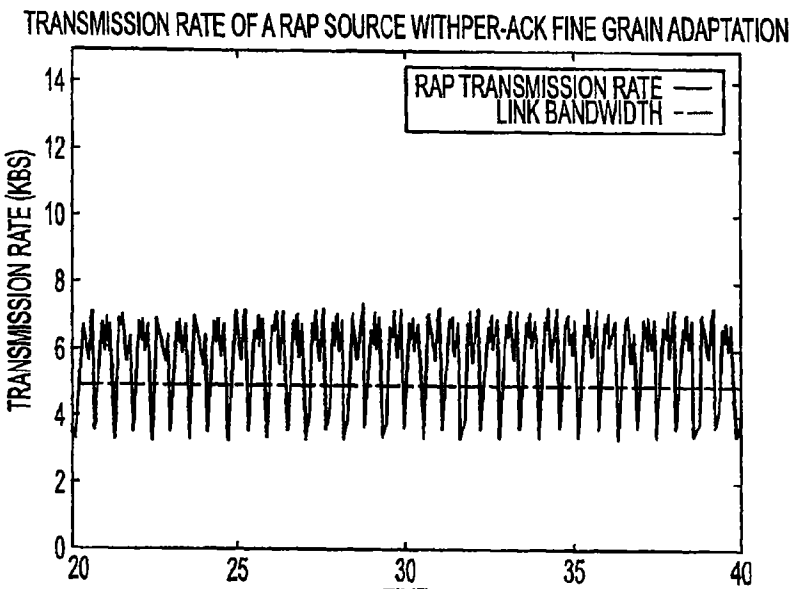
FIG. 12: The figure displays a RAP simulation result of the transmission rate of a single RAP flow with and without fine grain rate adaptation. A) Without fine grain rate adaptation. B) With fine grain rate adaptation.
Figure 12:
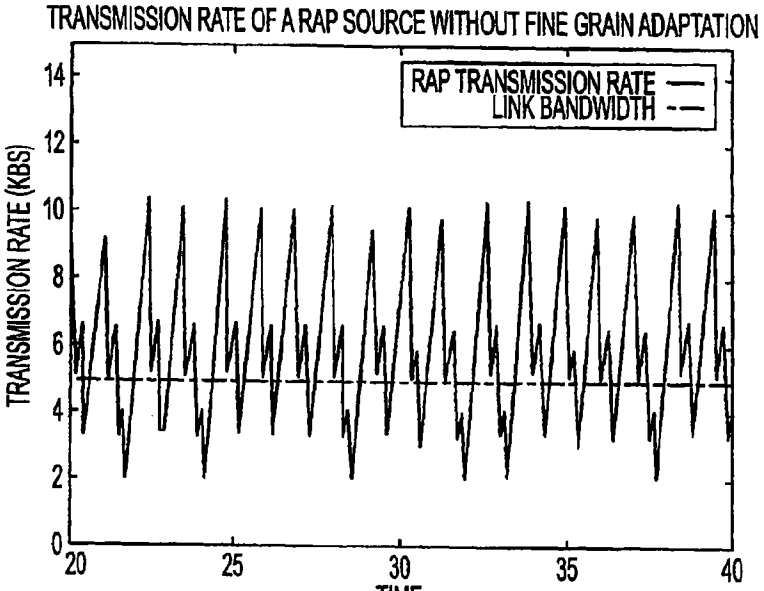

The purpose of fine grain rate adaptation is to make RAP more stable and responsive to congestion while performing the AIMD algorithm at a coarser granularity. As shown in FIG. 12, the simulation result of the transmission rate of a single RAP flow without fine grain rate adaptation is significantly higher per unit time than the transmission rate of a single flow with fine grain rate adaptation. Binomial algorithms allow for the increase and decrease in windows size. Wt is the window size at time t.

$$I: \omega_{t+R} \leftarrow \omega_t + \alpha/\omega_t^k;\ \alpha > 0 \quad [7]$$

$$D: \omega_{t+\delta t} \leftarrow \omega_t - \beta\omega_t^l 0 < \beta < 1 \quad [8]$$

When $\alpha>0$, then [7] is performed and increases the window as a result of receipt of one window ACK in an RTT. But when $\beta<1$, the windows size is decreased due to the detection if a loss by the sender. When any 1<1 in [8], then it has a decrease that is, in general, less than a multiplicative decrease. [7] and [8] are TCP friendly if and ONLY if K+1=1 and 1<=1 for suitable $\alpha$ and $\beta$. An equilibrium state is accomplished when all involved algorithms meet the following requirements;

$$K >= 0$$

$$l >= 0$$

$$k + 1 > 0$$

Figure 13:
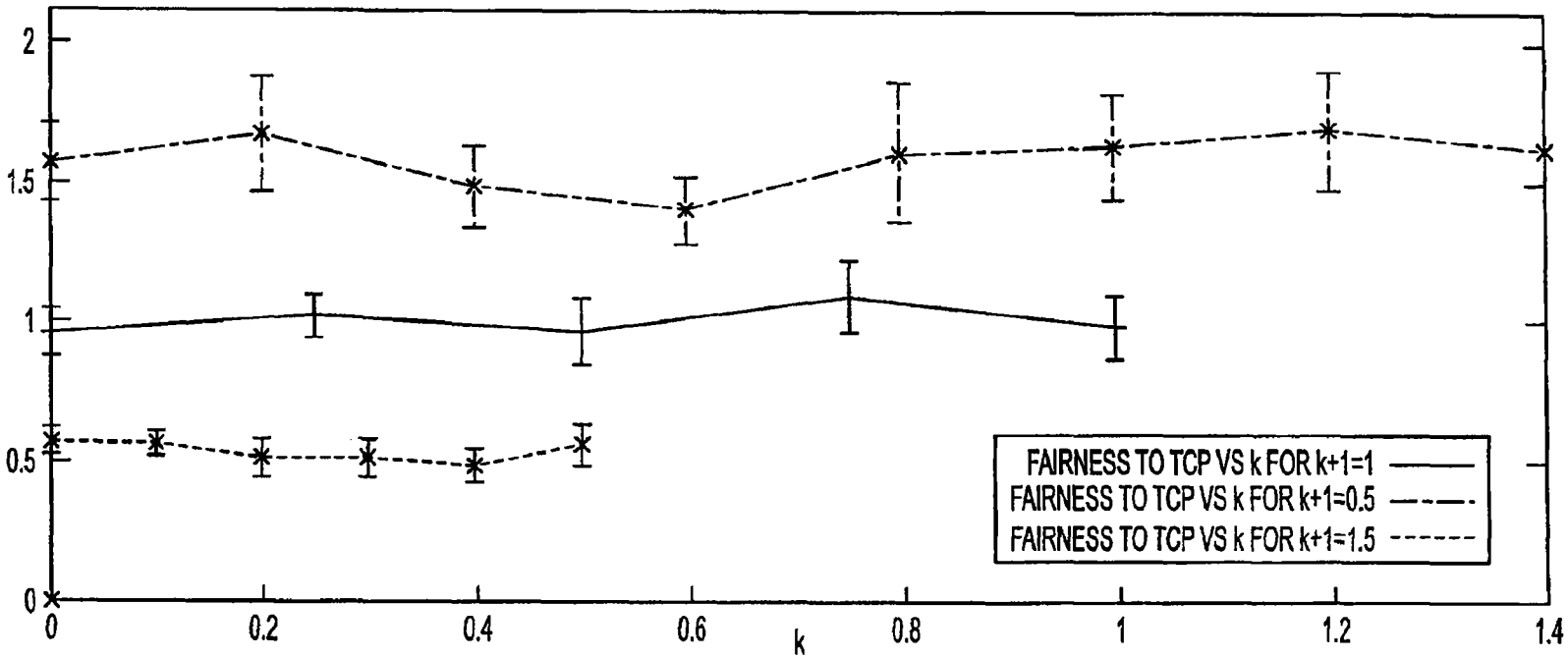
FIG. 13: The figure displays a ratio of throughput AIMD/Binomial.

Research collected through experimentation yielded FIG. 13. This figure demonstrates fairness to TCP vs. K for different values of K. The values of K are 0.5, 1.0 and 1.5.

Multicast

The packet loss of transmitting raw audio/video packets in forward direction multicast is about 12% in one embodiment. As the stream, containing the combined raw video and audio data, is received by the destination client computer, the destination client computer sends back a signal to the various checksum points requesting the missing data packets, e.g., the data packets that were not delivered to the destination client computer. It takes a fraction of a nano-second to check each checksum value along the way. For purposes of the following explanation client computer is client #1 and the destination client computer is client #2.

Figure 14:
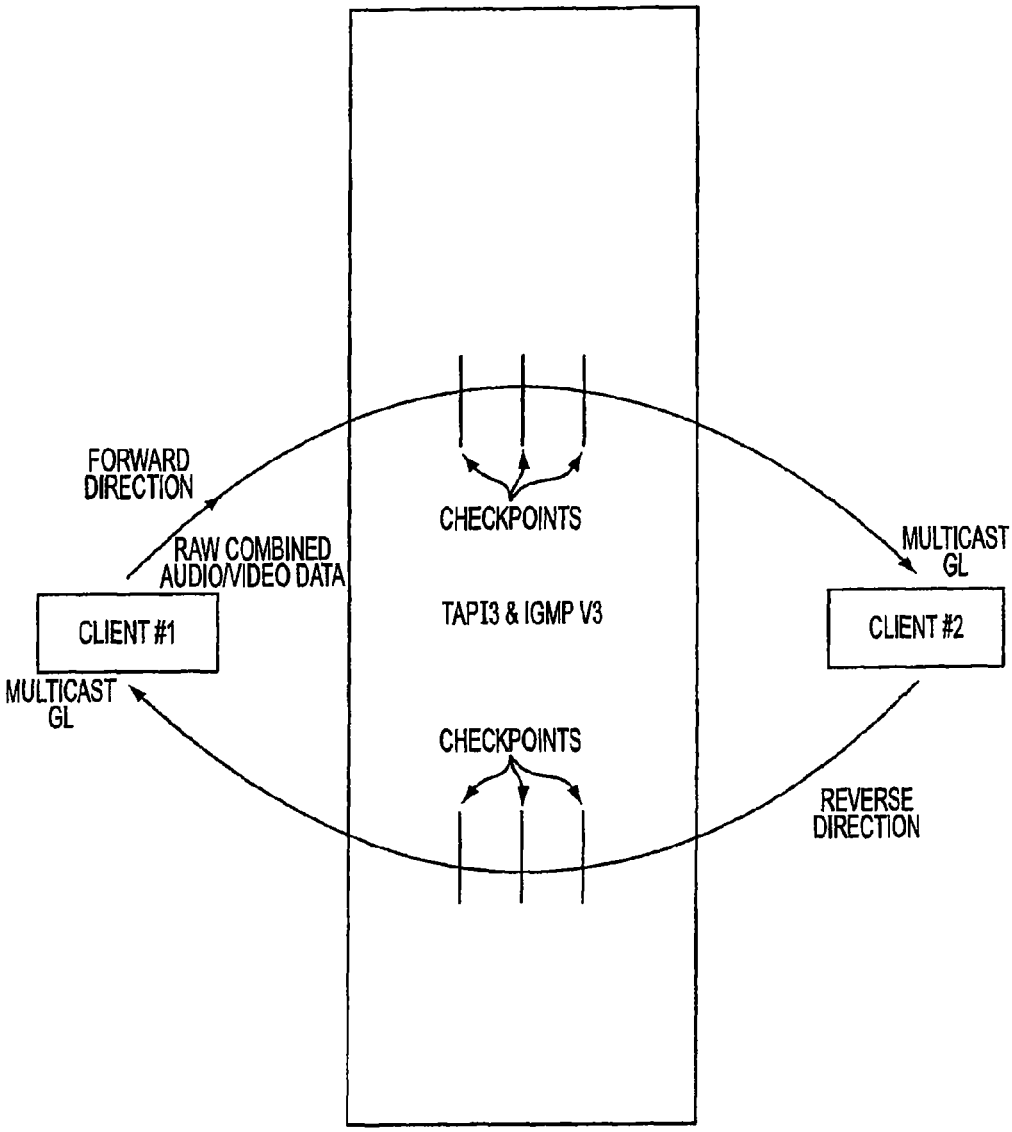
FIG. 14: The figure demonstrates multicast in the forward and reverse direction between two clients.

For sending data from client #2 back to the source client computer, the process is reversed (return direction). See FIG. 14. In other words, client #2 computer now behaves in the manner that client #1 computer previously behaved and sends data to client #1.

During the reverse process, the packet loss becomes negligible, in contrast to the 12% error rate in the forward direction. According to certain embodiments of the invention, on the return direction, the error rate is about +−1.08%.

The method for a one-to-many bilateral communication can and also be applied to a one-to-many unilateral net meeting (video conferencing). Recall, there was packet loss in a first pass (forward direction) for a particular stream of packets and the loss disappeared on the return direction. See FIG. 14. The rate at which data packets travel is based on the various computer equipment requirements or the maximum the hardware can handle. As an example, 36 MB of combined raw audio/video data can be sent over the network in approximately ten seconds. This goes form the source client computer through the USB port, through the network and then to the destination client computer, and then back to the source client computer.

Furthermore, the rate of input of input devices and the rate of output of output devices may adjust the rate at which the data packets travel. For example, an input camera has the ability to send input at approximately fifteen frames per second (15 frames/sec) and the USB port only transmits five (5) Mega hertz/sec from the camera to the computer. Therefore, the rate at which the packets are traveling can be adjusted based on technological advances of input device speed and camera speed.

Figures 15, 16:
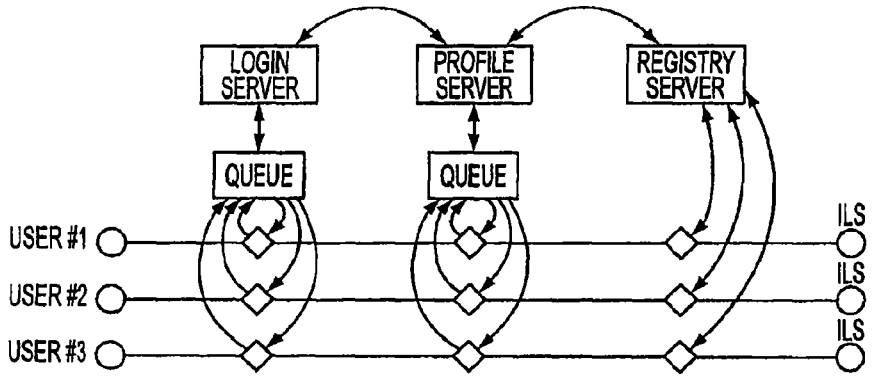
FIG. 15: The figure shows CPU usage and Operating System (OS) usage for a unicast and multicast environment along with total System Usage (System usage is calculated by CPU/RAM usage plus OS usage for both methods).
FIG. 16: The figure illustrates connections between an ILS server and users.

The above is an explanation of a one-tone (1 to 1) audio/video communication. The use of RAM, processor time, and bandwidth is minimal. But there are a number of ratios that may be considered. It ranges from a one-to-one (1 to 1) communication and can expand to at least a one-to-one hundred twenty eight (1 to 128) communication ratio. FIG. 15 demonstrates the RAM, CPU and Operating System (OS) usage as a percentage in a unicast and multicast transmission for various groups.

The total system resources for each instance are shown as well. In a unicast transmission once you reach a one-to-three (1 to 3) communication the system resources are completely used.

According to certain embodiments of the invention, in a multicast situation, a one-to-three (1 to 3) communication total system resource usage is thirty-five percent (35%). This is the vortex point, you can then add as many members to the group as you wish and when you reach a group of one-to-one hundred twenty-eight (1 to 128) the total system resource usage is approximately thirty-five percent plus/minus seven percent (35%+/−7%).

For better results and transmitting better quality of data (i.e., audio/video or any kind of data) we can use three servers, namely: Login server, Profile server and Registry server. Each server is connected through a gateway to the network. For example, Windows 2000 and XP have built-in Internet Location Server (ILS) servers. Also there are hundreds of public ILS servers available worldwide. Note that the login server, profile server and registry server can reside in one server or more than one server.

According to certain embodiments of the invention, when there are more than 1000 users who wish to participate in a given video conference with one another, then at least three server devices are used for housing the login, profile and registry servers. In FIG. 16, three users are shown connected to the ILS. There is one multicast data connection (for data needed for connecting the users) between the users and the ILS.

The login server and the profile server, is each associated with a multicast queue. See FIG. 16. For example, when user #1 sends out a signal, the login server's queue comes to the gateway and pings client #1. The queue sends many signals. Thus, the queue lines up the signals from each user in the queue. As a result, the login server can process each user one at a time from the queue. For example, it may take the login server 2 to 3 seconds to process 1000 users who want to log in and who are queued up.

After the login server has completed its job, the login server sends a signal to the profile server. The profile server provides IDs to each user. In other words, the profile server checks to see if the user is who the user says he is. When the profile server is done checking out a particular user, the profile server signals the registry server with respect to the user who has just been checked. The registry server sends back information to the profile server regarding the user.

Note that the first time a new user creates a signature on the multicast network; the registry server comes into play. The new user then enters all his information (name, address, etc.).

Once a user is logged in and user has been checked against the information in the registry server, that particular user can join a given net meeting. The profile server sends back to the user who is on the same stream any messages, or tells the user if there are other users that are waiting to video conference with that user. The profile server also provides information on communication ports, IP numbers, and any other information that the user needs to know for establishing multicast connections.

With reference to FIG. 16, user #1, user #2, and user #3 are logged in and connected to the ILS. Further user #1 is online but is not video conferencing with any other user initially. User #1 waits to be invited by someone to video conference. User #3 invites user #1 to a video conference. User #3 sends a message out to the profile server inform that user #3 wants to invite user #1 to a video conference. Profile server then sends a message to user #1 informing user #1 of user #3's invitation. User #1 can agree to join the video conference by letting the ILS server know of user #1's desire to join. User #1 and user #3 are then connected to each other on the same stream. Each user (client computer) that is connected has an independent open port available to receive the multicast signal. There may be up to 9000 open multicast ports on each client (based on current technological limitations). Even though user #1 is connected to user #3, such a connection does not terminate the responsibility of the profile server. Periodically, both user #1 and user #3 will each create a second stream for sending to the profile server. For example, every 10 seconds both user #1 and user #3 will each create a second stream for sending to the profile server. However, the connection to the profile server, at this point, is not a constant steady link. The second stream will check for incoming messages, for example. The check lasts for about 2 seconds and then the connection to profile server breaks up. If, there is an incoming message to an appropriate user that has logged in, the profile server will respond by sending the message to the appropriate user. When any user sends out that second stream to the profile server but does not get an acknowledgment from the profile server, then it probably means that there is no multicast connection. For example, there will be no multicast connection if the profile server has crashed.

Figure 17:
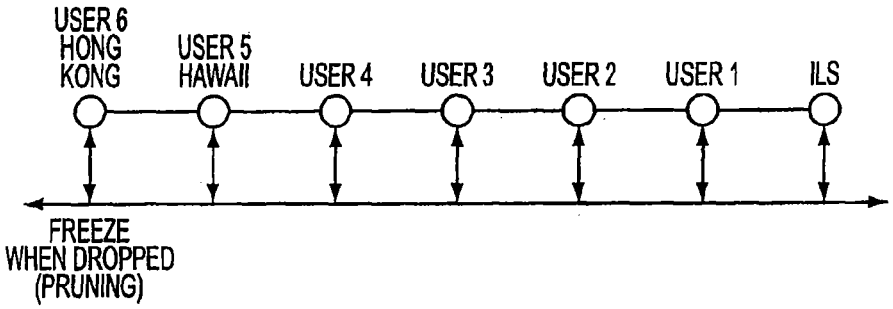
FIG. 17: The figure illustrates a one-to-many connection using an ILS server.
Figure 18:
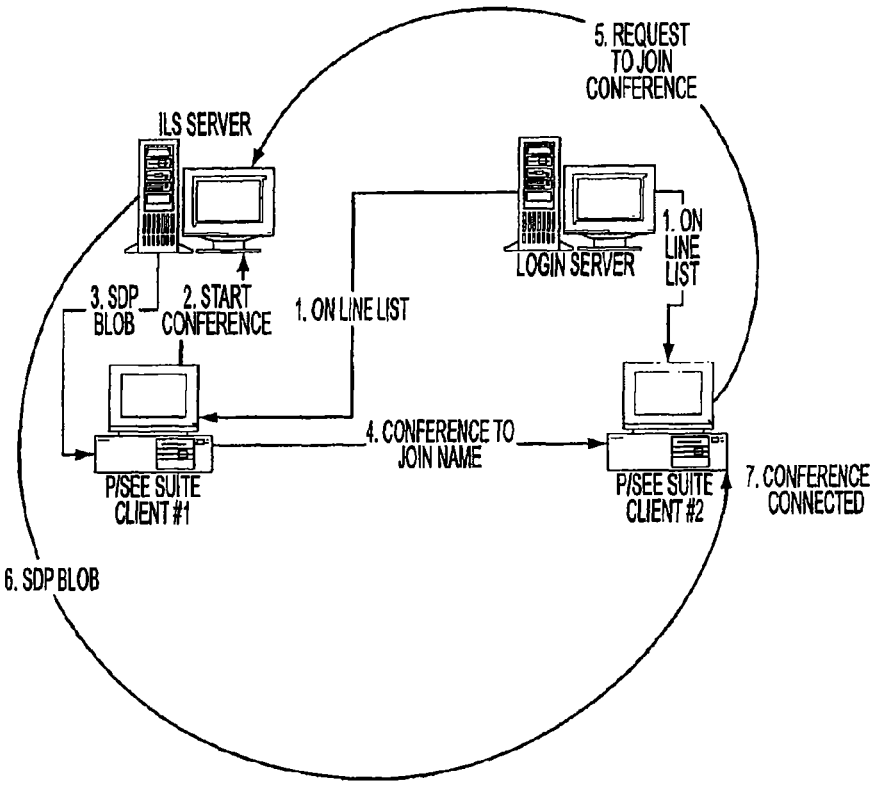
FIG. 18: The figure illustrates an Intranet connection for a net meeting.

If there is a one-to-many video conferencing, the ILS establishes a stream (connection) from the outermost point in the network. See FIG. 17. User 6 (Hong Kong) is the outermost user. In FIG. 17, all the other users will also connect to that connection. If any user drops off, for example Hong Kong, then user 5 (Hawaii) becomes the outermost point. At this point, the ILS server seamlessly drops Hong Kong (without crashing the conference) and connects Hawaii as the outermost point. The Hong Kong zone (video) gets frozen, this process is known as pruning. The 5 remaining users continue video conferencing with one another. The conference will continue until the very last user drops off. When the very last user drops off, the connection shuts down. FIG. 18 illustrates an intranet connection for a net meeting in certain embodiments of the invention. For purposes of simplicity, only 2 client computers are shown as participants of the net meeting. However, at least 128 participants can be included. With reference to FIG. 18, the following operations are:

Operation 1: Online list sent to each client (the login server send out to every gateway, i.e., to each client informing of who is online.)

Operation 2: Client #1 starts conference by connecting ILS server to request start of conference.

Operation 3: The ILS creates a multicast stream containing specific information about the conference to client #1.

Operation 4: Client #1 invites client #2 to join the net meeting (video conference) and conference name is sent to client #2.

Operation 5: If client #2 agrees to join then client #2 will inform the ILS of its desire to join. Client #2 requests the multicast stream containing specific information about the conference.

Operation 6: The multicast stream containing specific information about the conference is sent to client #2.

Operation 7: The conference is connected.

According to certain embodiments of the invention, the rate of sending raw video/audio data using multicast needs to match the biggest bandwidth among the participants for a T1 capacity connection. Typically, the capacity of each participant for receiving data is known.

Figure 19:
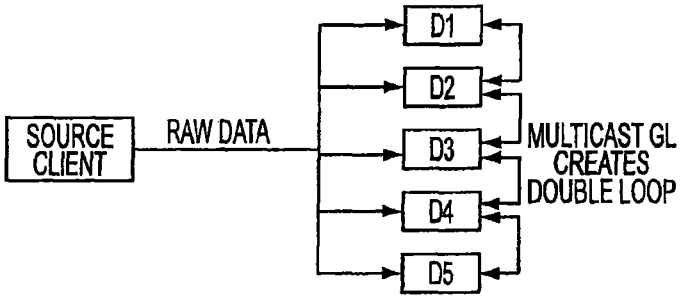
FIG. 19: The figure illustrates a source client sending raw audio/video data to a number of destinations.
Figure 20:
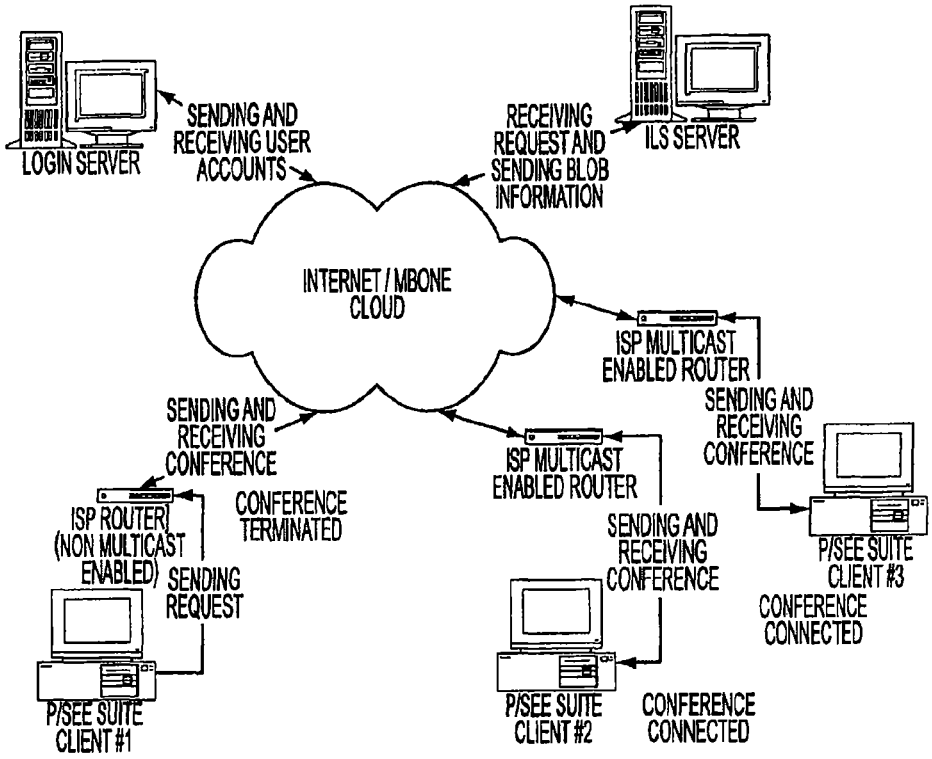
FIG. 20: The figure illustrates an embodiment of a P/See Suite internet communications solution.
Figure 21:
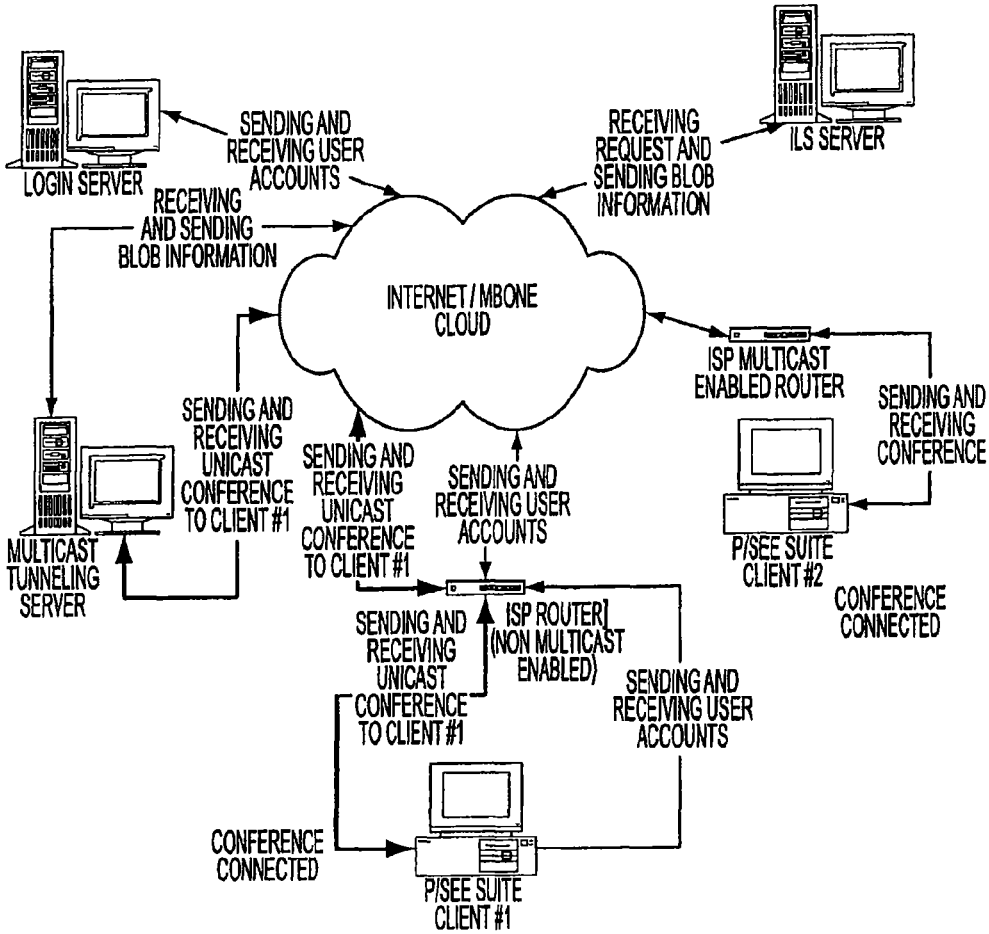
FIG. 21: The figure illustrates another embodiment of a P/See Suite internet communications solution.
Figure 22:
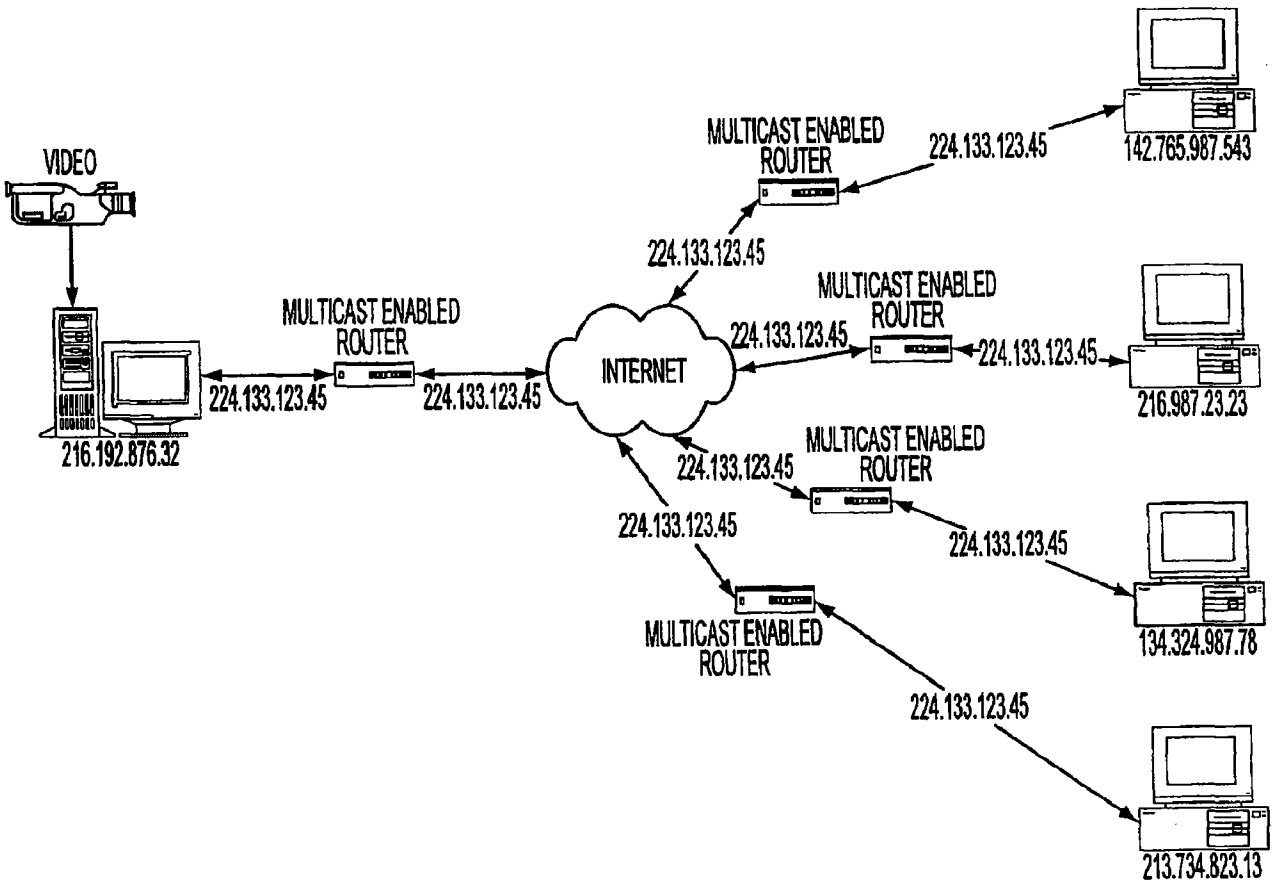
FIG. 22: The figure illustrates a multicast system showing media streams of a one-to-many net meeting.

In the case of a one-to-many unilateral net meeting, multicast GL (Global listener) is used in a double loop. See FIG. 19. For example, in FIG. 19, the source client sends combined raw video/audio data to destination client D1, the D1 sends the same data to D2. D2 sends the data back to D1. This is the double loop, which gets rid of packet loss. Thus, the double loop applies for D1 through D5. Note that D1 through D5 are receiving the same data from the source because the data is unilaterally broadcast from the source client. Each destination client checks with the adjacent client. FIG. 20 and FIG. 21 illustrate a system for a one-to-many bilateral net meeting. According to certain embodiments of the invention, FIG. 22 illustrates the multicast characteristics of a one-to-many bilateral net meeting.

E-Mail:

According to certain embodiments of the invention, the method for sending combined raw video/audio data through the network as described herein can apply to e-mail systems as well. When video is sent through e-mail, the common problems are (with respect to SMTP)

A. Size of the files: The files are usually too big too be opened by an e-mail application. The average video is 15 megaB, and the application usually can't open more than 5 megaB.

B. Intensity of the network: How many hops (routers) to get from source to destination.

C. Traffic on the network: How many users on the system.

D. Time: The time it takes for recipients to receive their email.

Figure 23:
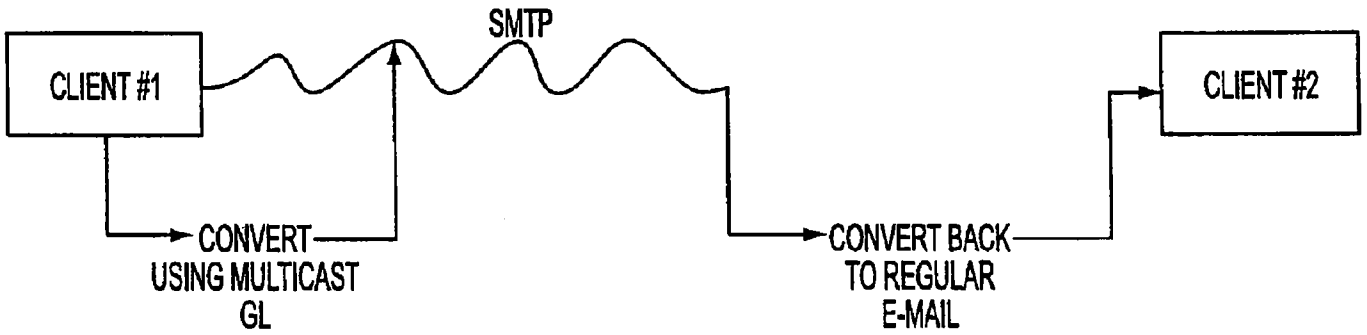
FIG. 23: The figure illustrates sending video from one client to another.

In FIG. 23, e-mail containing raw audio/video content from client #1 is converted using multicast GL and sent through SMTP to client #2. Then, the data is converted back to a regular email message when the data gets to client #2.

Figure 24:
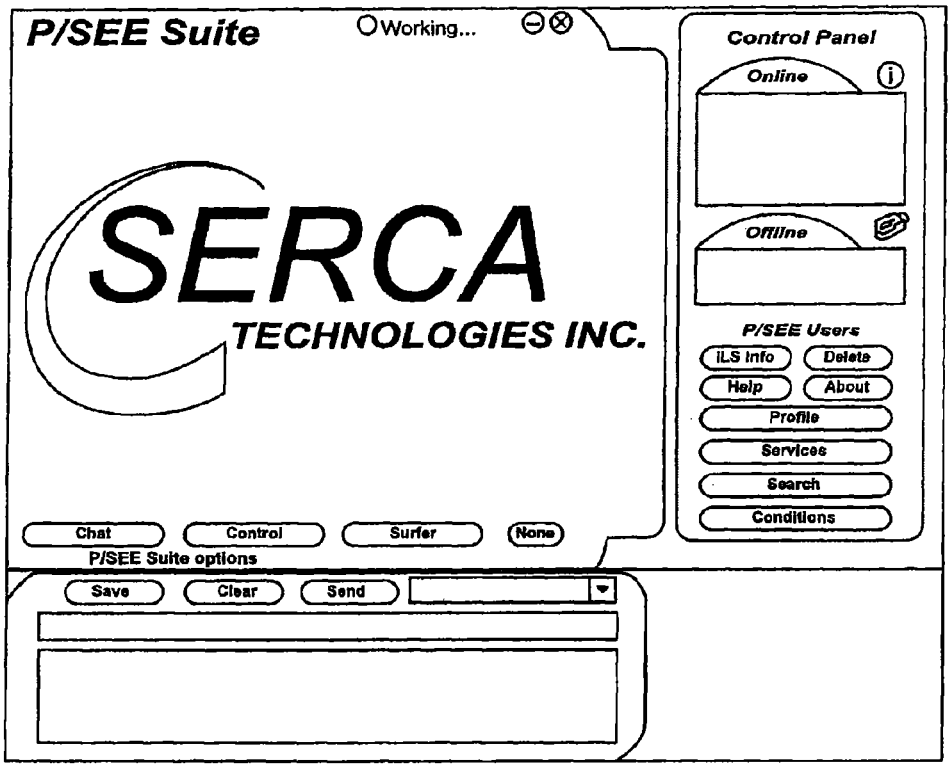
FIG. 24: The figure displays the initial P/See user interface. When the executable is selected for P/See Suite the illustrated application displays. Here the chat box is displayed but when the actual application opens one must select the chat button in order for it to come into view.

For example, in FIG. 24, client #1 sends 40 second commercial video to client #2 using SMTP. There may be about 10 to 15 routers between client #1 and client #2 for example. The raw video/audio data of about 5 megaB is stretched as a file into a 2 Kb stream. Such a process is herein referred to as a RICH Media E-Mail Response (RMER). In an RMER process, the multimedia data stream goes through an expedited traversal of the routers between the client computers as long as the routers are multicast enabled. The first multicast enabled router that gets the multicast stream will look at the IP address of the destination client and will fire the stream to the destination IP address.

In certain embodiments of the invention, if a modem does not accept multicast transmission, then the multicast is sent in the guise of unicast transmission through the modem and onto the first multicast enabled router. In other words the multicast transmission masquerades as a unicast transmission.

FIG. 24 displays the initial P/See user interface. When the executable is selected for P/See Suite the illustrated application displays. Here the chat box is displayed but when the actual application opens one must select the chat button in order for it to come into view.

P/SEE Suite

An embodiment of the invention is herein referred to as P/SEE Suite and for convenience is described, but not limited to, six (6) participants in a net meeting using the P/SEE Suite application. The number of participants may vary but potentially thousands of participants can participate at one time. Moreover, another present implementation of P/SEE Suite uses eight (8) participants.

Using six (6) participants for convenience, the user interface (See FIG. 24. for user interface of P/See Suite) of P/SEE Suite has six windows for video conferencing, with each having the ability to support one unicast or multicast user at a time. Potentially, an individual selects a group he/she wants to video conference with. Accordingly, a message is then sent to each individual of the group (in this example five (5) individuals). Each individual must accept the "invitation" to become part of the video conference in order to be added to the group.

P/SEE Suite offers instant access to video conference with any willing participant in a state of the art video conference workstation. This application offers internet users the ability to live real-time video conference with at least five (5) other family members or friends in a many-to-many multicast environment. This means that P/SEE Suite allows for the sending and receiving of audio, video and text messages, in real time, to and from anyone in the world via a direct connect, local area network and the internet.

P/SEE Suite also offers the ability to do multi-client web browsing, implying that a group of participants can surf the web together. Located at the top of the browser there is a lock icon. This icon allows the initiator (the participant that selected the icon) to lock the web sites of the entire group of participants. This essentially allows a multi-client browsing method with the initiator controlling the viewed web pages of the other participants locked into the multi-client browsing.

The text chat option (See FIG. 24 to view the Text Chat section) was added in case someone that was added to the friends list does not have audio/video. Messages can be sent to one individual on the friends list or it can be sent to the group of online users, making this application a client/server based, multi-user chat session.

P/SEE Suite has three main sections: the Video Conferencing Form, the Control Panel, and the drop down Text Based Chat. See FIG. 24 to view the user interface of P/SEE Suite. Each section will be discussed in succession. See FIG. 24 for user interface containing the three (3) sections. The Video Conferencing Form contains six (6) blocks which displays the live video feed from the six (6) participants involved in the video conference. Below these windows are four buttons: Chat, Control, Surfer, All/None.

The Chat button allows the user to hide or show the text chat section so he/she can send instant messages to one or more of the list of online friends or hide the options if the user wishes not to use it at that time. The Control button allows the user to display the control panel out of the right-hand side of the application or hide it behind the video conferencing form. The Surfer button is a quick launch web browser for individual web browsing. In order for a multi-client web browsing to be initiated a group must be selected and a confirmation request would be sent to each user.

If both or one of the control panel and chat windows are hidden then when the All button is clicked, the Control Panel and the Text Chat become visible and the button that said All now says None. When both, the Control Panel and Chat boxes, are displayed then the None button is displayed and selection of that button will hide both windows.

The Control Panel is automatically displayed to the right of the main form (Video Conferencing form) and can be hidden as described above.

The Control Panel has two boxes. One box contains a list of friends that are currently online with the P/SEE Suite application and the other box gives a list of friends that are not currently on-line. The user can select up to five (5) friends from the online list box to video conference with. A request message is then sent to each selected friend. The selected on-line friend does not have the option to decline the request to video conference.

There are several buttons on the Control Panel that the user can select. They are as follows: ILS Info, Delete, Help, About, Profile, Services, Search and Conditions. These buttons will be described in succession.

The ILS (Internet Locator Server) Info button allows the user to choose the ILS he/she wishes to use. It also gives the user the ability to use one that is in the list by highlighting it and selecting the button that says Use Selected. The user can create a new ILS by selecting new or delete one already in the list by highlighting one and then select delete from list. The Cancel buttons closes the window and disregards the changes. See FIG. 25 for window that displays when this button is selected.

Figure 25:
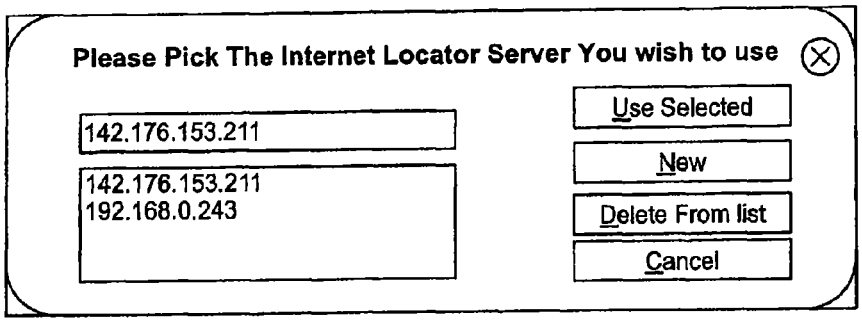
FIG. 25: The figure displays consequences of the ILS button. The ILS (Internet Server Locator) button displays the illustrated window. This allows the user to use the selected ILS, create a new one, delete one from the list, and cancel the option.

FIG. 25 displays consequences of the ILS button. The ILS (Internet Server Locator) button displays the illustrated window. This allows the user to use the selected ILS, create a new one, delete one from the list, and cancel the option.

The Delete button allows the user to delete a friend from the friend list. The friend is selected in the list and when the delete button is pressed the user is removed from the friend list. If one tries to delete a friend when one has yet to add any one will receive a message stating so. The Help button brings up a window containing a list of topics in which the user can select any topic and read up on how to accomplish what they want using the application.

The About button uses one scrolling window that covers the Video Conferencing Form and displays the details of who created the application, the requirements for the program to run, and the company that created the application.

When selecting the Profile button, the user is presented with a window that shows all of the information that was entered when it was first entered. This window also allows one to change any information and also hide information from other users. Whenever a change has been to this windows and the apply button has been selected then the changes will take affect and be reflected in the application. See FIG. 26 for window that displays when this button is selected.

Figure 26:
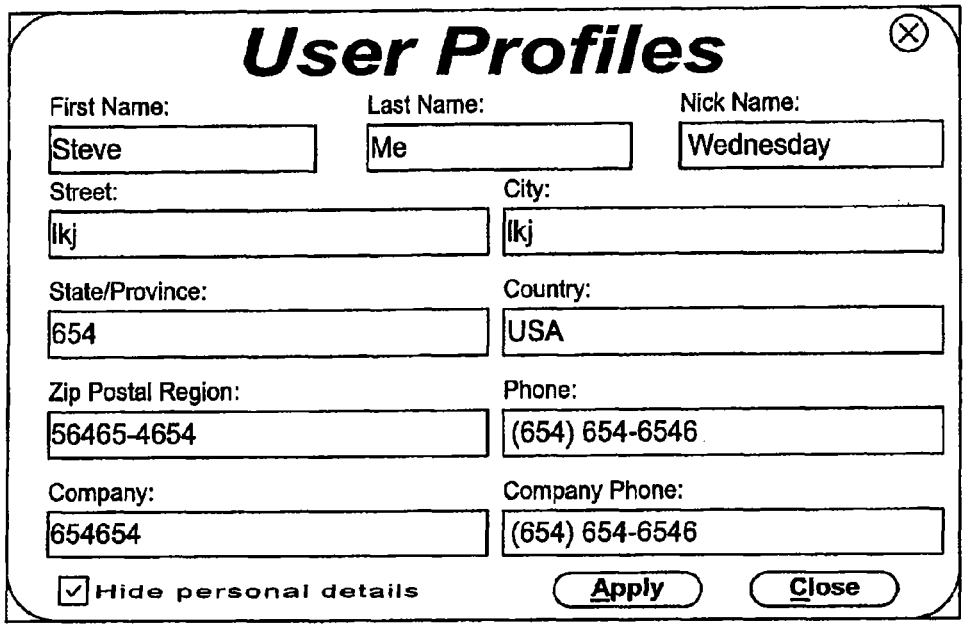
FIG. 26: The figure displays consequences of the profile button. The Profile button displays the illustrated window. It details the user's information and gives the user the ability to change/update the information. Here the user also has the option to hide personal details from other users. Any changes to the page will be saved.

FIG. 26 displays consequences of the profile button. The Profile button displays the illustrated window. It details the user's information and gives the user the ability to change/update the information. Here the user also has the option to hide personal details from other users. Any changes to the page will be saved.

When the user selects the services button a window displays of the service and links. This windows has eight possible choices for the user that are essentially quick launches to that default browser (depends on what button is selected) displaying the appropriate web page. See FIG. 27 for the window that displays when this button is selected.

Figure 27:
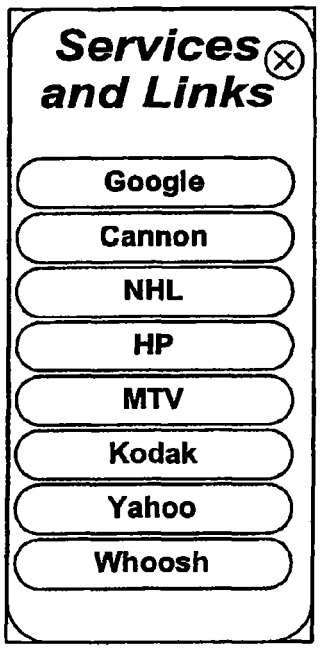
FIG. 27: The figure displays consequences of the services button. When the Services button is selected the illustrated window displays. It allows the user to select one of the quick launch buttons and thereby display the home page of the selected web site in the browser.

FIG. 27 displays consequences of the services button. When the Services button is selected the illustrated window displays. It allows the user to select one of the quick launch buttons and thereby display the home page of the selected web site in the browser.

When the Search button is selected another interface appears containing a search option to find a friend/user. The window has three text boxes that allow the user to search for someone using their first name, last name or their nick name. The results display in a box below and by clicking on the person's name one is able to add them to one's friend list. See FIG. 28 for window that displays when this button is selected.

Figure 28:
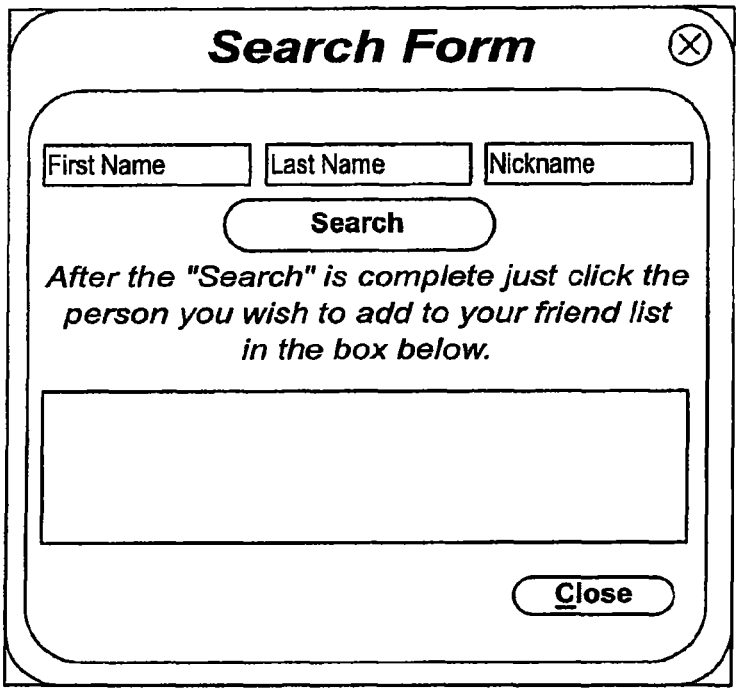
FIG. 28: The figure displays consequences of the search button. When the search button is selected the illustrated window is displayed. Here the user has the ability to search for a friend via first name, last name, and/or nickname. When the search is complete, clicking on the friend's name adds them to the list.

FIG. 28 displays consequences of the search button. When the search button is selected the illustrated window is displayed. Here the user has the ability to search for a friend via first name, last name, and/or nickname. When the search is complete, clicking on the friend's name adds them to the list.

The Conditions button allows the user to view the current settings of the servers and friend's user list. When the window comes into view there are three tabs across the top. The Startup Tab allows the user to change password, auto login and set his/her current status (available/unavailable). There is also a box that contains the system information. See FIG. 29 for window that displays when this button is selected.

Figure 29:
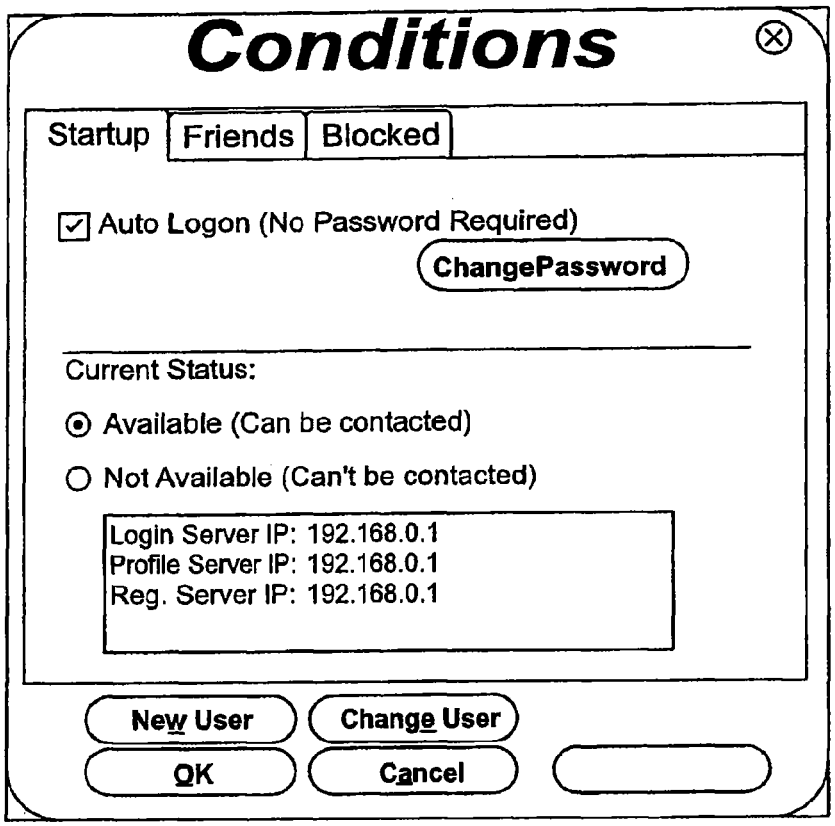
FIG. 29: The figure displays consequences of the conditions button. When the button is selected the illustrated window appears with the startup tab already selected. Here the user is able to select an auto login (No password required), change their current status (Available/unavailable), and to view system information.

FIG. 29: The figure displays consequences of the conditions button. When the button is selected the illustrated window appears with the startup tab already selected. Here the user is able to select an auto login (No password required), change their current status (Available/unavailable), and to view system information.

The next tab is the friends tab. This shows a list of friends that a user has selected and added to the user's friend's list. If an individual's name is highlighted, then the three check-boxes at the top may become checked if it applies to that specific user. A user can be either able to send video, audio or chat or any combination thereof. See FIG. 30 for window that displays when this button is selected.

Figure 30:
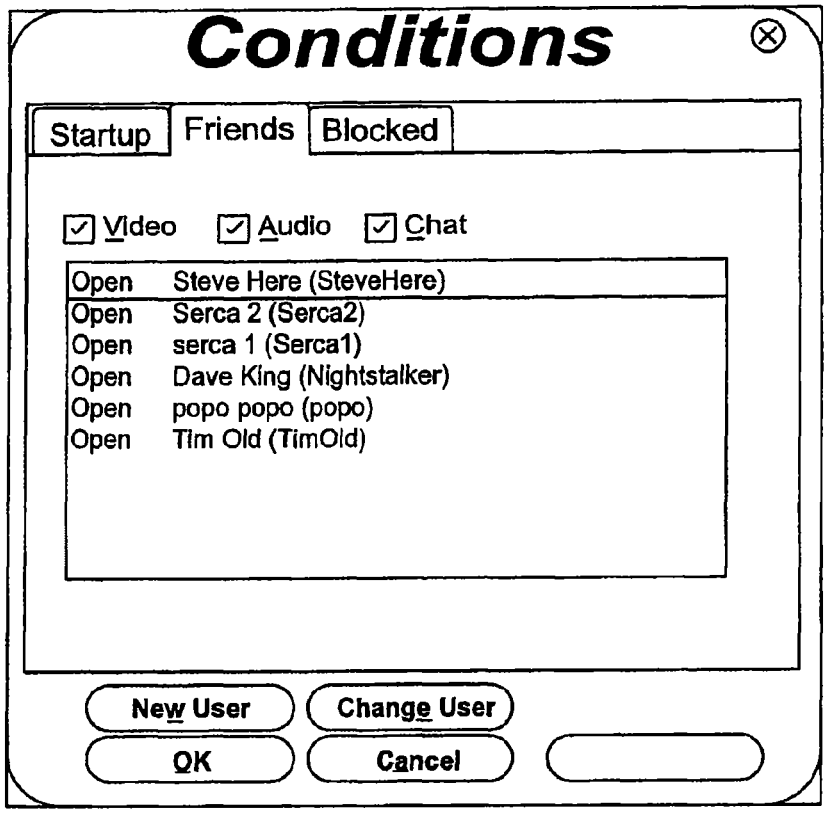
FIG. 30: The figure displays consequences of the conditions button with the friends tab selected. When the conditions button is selected and the friends tab is selected the illustrated form displays. This allows the user to view what conditions/restrictions, if any, their friends have. Conditions/Restrictions may include: able to (send and/or receive) video, audio, or chat.

FIG. 30: The figure displays consequences of the conditions button with the friends tab selected. When the conditions button is selected and the friends tab is selected the illustrated form displays. This allows the user to view what conditions/restrictions, if any, their friends have. Conditions/Restrictions may include: able to (send and/or receive) video, audio, or chat.

The final tab on this screen is the Blocked tab. This tab contains a list of users that have been added as a friend but the user has decided to block them. If the user wishes to unblock a user, then the friend's name is highlighted and the removed button is selected. See FIG. 31 for window that displays when this button is selected.

Figure 31:
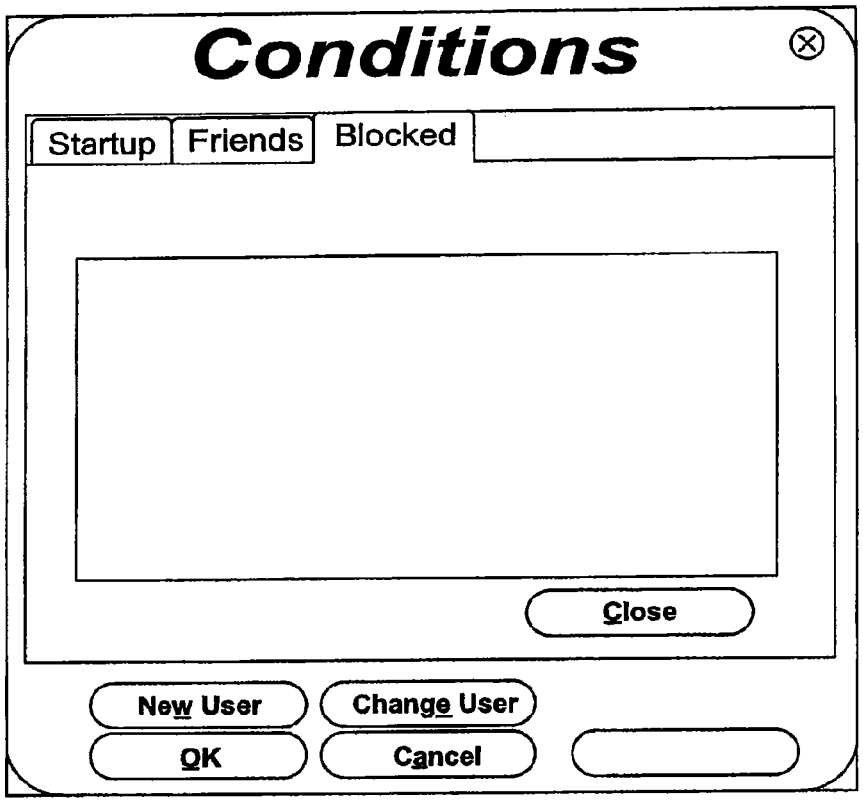
FIG. 31: The figure displays consequences of the conditions button with the block tab selected. The conditions buttons displays the interface with the block tab selected. Here the user is able to unblock a previous user that was selected as a friend. Also, here a new user can be created or change users.

FIG. 31: The figure displays consequences of the conditions button with the block tab selected. The conditions buttons displays the interface with the block tab selected. Here the user is able to unblock a previous user that was selected as a friend. Also, here a new user can be created or change users.

On each of these tabs there is an option to add a new user or change user. There is also an apply button to save any changes that have been made to any of the screens.

The final section is the Chat Section of the application. As described before the Chat section can be hidden or displayed by either selecting the Chat button or the All/None button on the Video Conferencing Form. This form is available in case someone in the friends list does not have the ability to interact using audio/video. See FIG. 24 for window that displays when the user wishes to have the chat box in view.

On this form there are three main text boxes and three buttons. The text box with the drop down option allows the user to select a friend, which he/she wants to send a message, that is on-line or all the friends that are on-line. The white text box is where the user types what he/she wants to say. In order to send the message, the send button must be selected. When the message is sent it displays the information in the grey text box to view the current conversation. If the user wants the information cleared then he/she selects the clear button and everything is erased from the screen. If the user desires to save the chat then simply selecting the save button does so. If a friend is not selected in the drop down menu then no message can be sent.

According to certain embodiments of the invention, several servers must be utilized in order for the application to work.

The Login server connects to clients via TCP Winsock connections, all the information sent is encrypted. The login server has several characteristics: The transaction is processed and the information is send to the login queue in folder. The login server checks the login out folder for a response, which is processed and sent back to the user. The TCP connection is set back to a listen state. The Login Queue also has several characteristics: The login queue checks the in folder for any new additional registrations and logins. If it is a registration, then the information is added to the login database. If the user is already registered, the login queue verifies login, adds IP to the database and send the transaction to the profile in folder. If a logoff is requested, then the client's IP is deleted from the database and sends the transaction to the profile in folder. Like the Login server, the Profile server connects to the clients via TCP Winsock connections and the information is encrypted. This server also has its own characteristics: Profile information is processed and the transaction is sent to the profile queue in folder. Profile server checks the profile out folder for response; this is processed and sent back to the client. Then the TCP connection is set back to a listen state. The Profile queue has the following characteristics: The queue checks the profile in folder for transactions (the transactions can be for a friend list, add a friend, and delete a friend) The response transaction is sent to the out folder with the information about the processed transaction.

When someone wants to register, the Registration server connects to the client via TCP Winsock connection and all information is encrypted. The client gets connected to the server via two (2) connections. The first connection carries registration information from the client to the Registration server while the other connection carries photo information from client to Registration server. Connection two (2) is only made when a photo is supplied.

The server then verifies if there is a duplicate entry and if there is a message is sent back to the user. If it is not duplicate information, then the server creates a unique serial number or identifier which is then sent back to the client which will be used as a unique password for logging onto the system. Then a transaction is sent to the login and profile queues with new registration information.

When doing searches or adding a friend to the friend list, a query is sent to the registration server via a TCP Winsock connection. The registration database is queried and the results are sent back to the client.

P/See suite is an excellent video conferencing tool. It allows a user of the application to video conference with five (5) friends on their friends list, text chat with one or all of the people that are on-line with P/See Suite, and revolutionize the idea of browsing the net with a friend through its ability to lock friends into a web browsing session. All of this is achieved through a multicast environment.

P/See Podium

P/See podium is a video conferencing tool that allows real time audio/video that is multicast from one-to-many and also receiving audio from many upon request. P/See podium is aimed at long distance education over the net.

In order to accomplish this, participants would be given a time and date on when the conference lecture would begin. The students/participants would then log onto the TCP/IP server and their IP information would be forwarded to the podium host. The lecture is received by the students that have IP addresses forwarded to the server. The lecture is broadcast in real time and the participants are able to reply with feedback or questions.

Frame rates of 15-32 fps according to P/See podium—based on a video window of one quarter (¼) screen on a 600*800 screen resolution, video is h-323 and h-324 compliant and can be received by non-podium viewers if the viewers is multicast enabled, audio is compliant with G-711 and can be extracted by the non-podium viewer this may be achieved using a fifty-six (56) K modem, ISDN, xDSL, Cable and satellite up to full motion video—the frame rates mentioned are all approximates due to the nature of the internet. Reception rates can be affected by the internet time of day, local net traffic, number of clients, quality of phone line, for example. The transmission should stay steady. Cable connections have a disadvantage of bandwidth sharing in their local area. With a modem dial up connections, a 56K modem may connect at a lower speed due to line conditions (if there is a lot of static on the lines) or if the dial-up ISP does not allow high-speed connections. In most areas the fastest a 56K modem can connect is 53K.

Due to the size of digital data, email is limited as to what can be emailed across the internet because of available bandwidth. As a result of this limitation, the sending of video or real time visual data used for the purposes of multiple conferences calling or advertising is prohibitive. Without the need for data compression technology, RMER (Rich Media Email Response) overcomes these limitations.

The flow of video data can be transmitted at a size of approximately 2 Kb using RMER over the internet. This is not a new form of compression, but by reconstituting the present information into a format that is more efficiently sized for transmission.

With this, individuals may send video data, with the use of the internet and wireless network, directly to new generation cell phones for face-to-face conversations. Businesses may direct email their advertisements to users with a particular interest. Therefore, RMER allows the movement of visual information that promotes endless possibilities for the communications and advertising industries. This can be accomplished through every level of receiving mediums, whether it is wireless phones, a personal computer, or some device yet to be developed.

RMER allows the possibility of multi conference calling, which now can only be accomplished via wider area network (WAN) within a controlled environment. This is a benefit for all business that wants to reach a wider array of possible clients.

Altorete (Advanced Core of P/See Suite)

Altorete is the advanced flow of data-grams through a multicast system. The stream of data continuously flows/travels along the data pipe (satellite, fiber optic or twisted pair) in an endless circle once a stream has been created by the originating server. Connector points within the loop, the modem allow access to the data and to retrieve data for use on personal computers. The inner circle of the stream contains the core data where the out side contains the reference headers and index files. Error correction loops take place as the stream passes over a point in the loop. These error correction loops assure that the data has the correct datagram checksum. Since there is a need for continuous feed of data into the multicast cast stream, flow feeder servers are used.

Flow Feeder servers act similarly to Dynamic Name Servers (DNS). Data continuously travels along the pipe moving at speeds that are relative to the network speeds. Where fiber optic networks are involved, the data-grams can be pushed through the network at speeds that reflect high efficiency transmission and are only affected by termination points and modems. When it reaches the modem, the data is extracted from the stream and sent to the requesting computer along the stream. The data is then stored on the user's (or client) computer until it receives an action to be read. At this point it gets deleted leaving the Time to Live (TTL) at zero and the stream continues. Potentially, when data is accessed solely in a streaming manner, the data may effectively be stored within its transmission through the network, thereby eliminating the need for local storage (such as a hard drive) in a computer.

Video conferencing through multicast provides the client or end user with quality picture and sound. There is no time loss, delay or excessive use of bandwidth resulting in a more efficient and real time transfer of video. The transfer of raw audio/video data rather than the use of compression and decompression enable efficiency of transport over any network. The use of multicasting requires less system resources for a one-to-many relationship than unicast technology does. Video conferencing is accomplished by the sound card and video card dealing with the sound data and video data respectively; there is no need for special hardware.

It is expected that applications can be based on several components of the P/See Core. For example, some of these applications may relate to transmission of audio, video, web and/or data. Audio applications may encompass, but not be limited to, audio presentation, radio over the internet, and telephony. Video applications may encompass, but not be limited to, video conferencing systems, distance learning and video phones. Web applications may include, but not be limited to, technical support, text based chat, and live updates to sporting events (i.e. Nascar races). Data applications may consist of, but not be limited to, data streams for example. The working model of P/See Suite is one embodiment of a working core for video conferencing.

Prior Embodiment

As most software does, the P/See software has evolved over time. What follows is a description of an earlier embodiment, which provides some similar features and some different aspects. Note that features from one of these embodiments may be incorporated into other embodiments without undue experimentation, such that the earlier embodiment may be used for various forms of data, and the embodiments described above may incorporate features described below for example. Moreover, note that the previously described embodiments generally evolved from the embodiment described below, and that features are thus interchangeable between the various embodiments.

According to certain embodiments of the invention, video and audio data are not compressed before transmission over the network. Instead, raw video/audio data is sent from one client computer to another through the network. The network referred to herein may take a variety of forms such as a fiber optic network, a satellite network, a combination of different media, a wide area network such as the Internet, etc. The client computers referred to herein are the actual or potential participants in a given video/audio conference over a network. Details of these embodiments are described in greater detail herein.

Further, communications of video/audio data from one client computer to another require high bandwidth. The spectrum for lowband, which is from 9600 baud to 53 kbs, encompasses the range of a 33.6 k modem to a 56K modem.

According to certain embodiments of the invention, multicast protocol is used to transmit raw uncompressed video/audio data from one client computer to another through the network. Details of these embodiments are described in greater detail herein.

By using multicast, there is virtually no bandwidth problem. However, multicast is laden with errors. Inherent to the multicast protocol are errors related to packet loss.

It is to be noted that the scope of the invention is not limited to any particular type of network, client computers, input devices, output devices, etc. The embodiments apply without limitation, to any system that is associated with conferencing, in general.

In respect to dealing with raw uncompressed video/audio data on the client side, according to certain embodiments of the invention, the video component of the client computer directly handles the video data. Similarly, the sound component of the client computer directly handles the audio data. In other words, the video card, for example, relays the video data from the input source (such as a camera) to the display screen (such as a computer monitor). Thus, the computer processor is relieved from having to process the video and/or audio data from the input source. Thus, less computer resources are tied up and less errors are involved because no processing by the processor.

Figure 32:
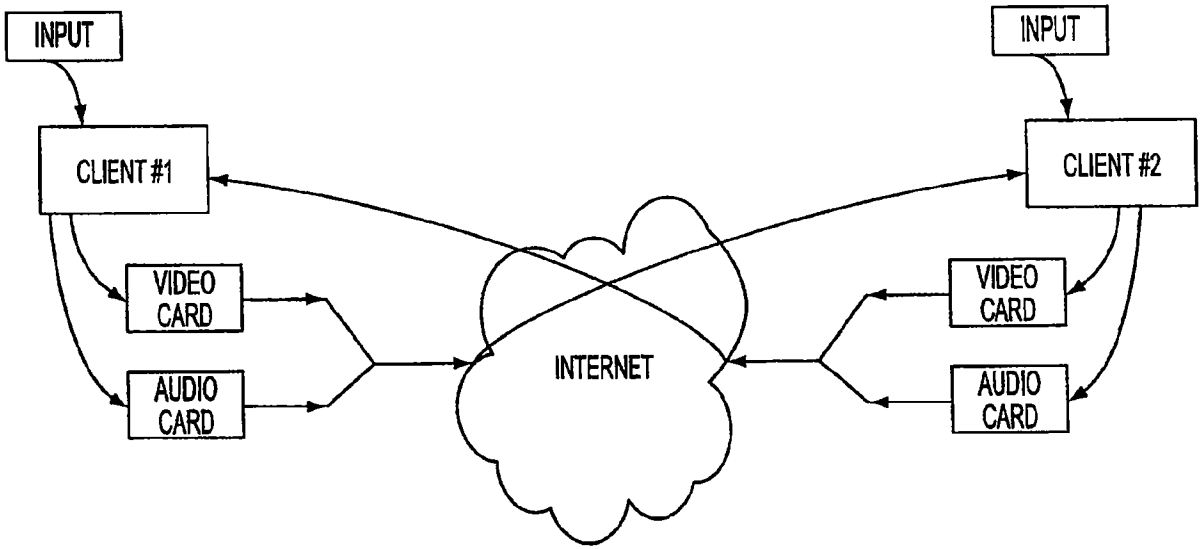
FIG. 32 illustrates an embodiment of two clients coupled together through a network such as the internet.

As video input comes into the client from the input source (the camera), the video data goes from the input port directly into the video card. Similarly, the audio input from with the microphone is sent from the input port directly to the sound card, for example. See FIG. 32.

The combined raw audio/video data is then sent through the network through the computer port to network using multicast protocol. According to certain embodiments of the invention, the IP multicast protocol used is the Internet Group Management Protocol (IGMP V3). The type of multicast protocol that is used may vary from implementation to implementation. The present invention is not limited to any particular type of multicast protocol.

Multicast IP conserves bandwidth by forcing the network to do packet replication only when necessary, and offers an attractive alternative to Unicast transmission for the delivery of network ticker tapes, live stock quotes, multiparty videoconferencing, and shared whiteboard applications (among others), for example. It is important to note that the applications for IP Multicast are not solely limited to the Internet. Multicast IP can also play an important role in large distributed commercial networks.

As an example, assume that a stock ticker application is required to transmit packets to 100, stations within an organization's network. Unicast transmission to the group of stations will require the periodic transmission of 100 packets where many packets may be required to traverse the same link(s).

Multicast IP transmission is a preferable solution for this type of application since it requires only a single packet transmission by the source, which is then replicated at forks in the Multicast delivery tree. The multicast delivery tree is described in further detail herein with respect to FIG. 35 and FIG. 36.

IGMP is used to establish host memberships in particular multicast groups on a single network. The mechanisms of this protocol allow a host to inform its local router, using host membership reports, that it wants to receive messages addressed to a specific multicast group.

The raw uncompressed video/audio data is moved from the client computer's port into the network using IGMP V3 protocol by a suitable programming interface. A suitable programming interface for moving raw data into the network using IGMP V3 protocol is one that is based on a serverless conferencing model. A serverless conferencing model is one in which audio mixing and video switching are performed on individual client computers. For example, Telephony Application Programming Interface V3 (TAPI 3), when appropriately modified, is one such programming interface. TAPI 3 is used for voice over IP (VOIP) applications. However, TAPI 3 can be modified for sending combined audio/video raw data using multicast IP (such as IGMP v3) into the network.

Using an IP multicast based on a serverless conferencing model, in which audio mixing and video switching are performed on individual client computers, allows for multiple participants to join conferences without using Multipoint Conference Units (MCU) products.

Mulitcast IP such as IGMP v3 stretches out the combined raw video and audio data into a number of datagrams and headers (data packets).

As the combined raw video and audio data travels from the source client through TAPI 3, and then through IGMPv3 to the destination client, a percentage of packet loss occurs. Error correction methods are applied to correct for packet loss. For example, a multicast Graphics Language (multicast GL) method is used for error correction. The error correction modules perform checksums at various checkpoints across the network. According to certain embodiments of the invention, mutlicast GL is implemented in both TAPI 3 and IGMPv3.

In multicastGL, a multicast address is designed to enable the delivery of datagrams to a set of hosts (clients) that have been configured as members of a multicast group in various scattered subnetworks. Individual hosts are free to join or leave a multicast group at any time. There are no restrictions on the physical location or the number of members in a multicast group. A host may be a member of more than one multicast group at any given time and does not have to belong to a group to send messages to members of a group.

As the first header associated with a data packet sent by the source client computer is received at the destination client (the forward direction), the destination client has a checksum result. See FIG. 33. The error rate is about 12%. As the stream, containing the combined raw video and audio data, is received by the destination client computer, the destination client computer sends back a signal to the various checksum points requesting the missing data packets, e.g., the data packets that were not delivered to the destination client computer. It takes a fraction of a nano second to check each checksum value along the way. For purposes of explanation, assume that the source client computer is client #1 and the destination client computer is client #2.

For sending data from the client #2 back to the source client computer, the process is reversed (return direction). See FIG. 33. In other words, client #2 computer now behaves in the manner that client #1 previously behaved and sends data to client #1.

Figure 33:
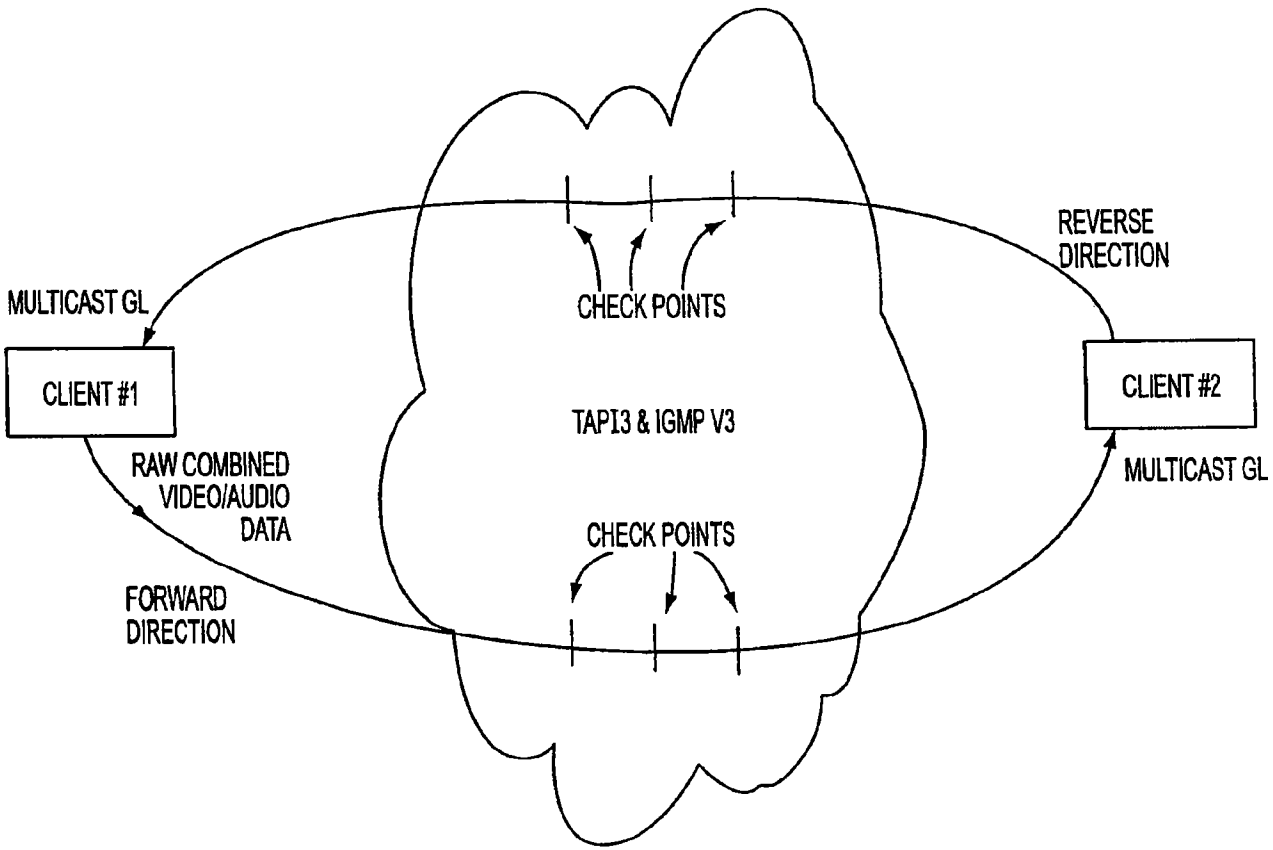
FIG. 33 illustrates an embodiment of a loop used for transmission through checkpoints between two clients.

During the reverse process, the packet loss becomes negligible, in contrast to the 12% error rate in the forward direction. According to certain embodiments of the invention, on the return direction, the error rate is about +−1.08%. With reference to FIG. 33, note that in the reverse direction, client #2 sends the original packets (first set of packets) that client #2 received from client #1 plus client #2 sends a second set of packets from itself to the client #1. There is hardly any packet loss in the first set of packets. However, there is some packet loss in the second packet set during traversal from client #2 to client #1. However, this second set will automatically recover its loss on its second pass through the network to some other computer. Thus, with reference to FIG. 33, the multicast GL at client #1 sends to the client #2's multicast GL, a checksum. The destination client (client #2) already has a list of the losses (from the forward direction in the loop). The whole process takes place at a fraction of a second (with respect to one data packet). The above description describes the process of video conferencing without sacrificing speed and quality of video/audio data that is received.

36 MB of combined raw video and audio data can be sent over the network in approximately 10 seconds, e.g., from source client computer through USB port and through the network to destination client computer, and then back to the source client computer.

According to certain embodiments of the invention, the rate at which the data packets are travelling may be adjusted to accommodate the rate of input of input devices and the rate of output of output devices. For example, typically, an input camera can send input at about 15 frames a second and the USB port only transmits 5 Mega hertz/sec from the camera to the computer. The rate at which the data packets are travelling may be adjusted based on new technological advances in input device speed and camera speed.

The above is a description for a 1-to-1 audio/video communication, which use minimal RAM, processor time, with very little bandwidth. However, the above methodology can be expanded to at least 1-to-128.

For 1-to-1—using prior art technology (port problems, compression, bandwidth problems etc, prior art), the usage is about 30% (CPU and Ram)+25% for the operating system (OS).

For 1-to-2, add another 30% usage. Thus 85% of total computer resources are used.

For 1-to-3, add another 30% usage. Thus, 100% of total computer resources are used.

Thus, even for a 1-to-3 net meeting, no other application can be opened during the net meeting because there are no more available computer resources.

According to certain embodiments of the invention, a 1-to-1 net meeting uses about 2% CPU usage plus 25% for the OS. Thus, 27% of total computer resources are used.

A 1-to-2 net meeting with bi-lateral communication means that the 3 participants can video conference with each other simultaneously. Similarly a 1-to-N net meeting with bi-lateral communication means that the N+1 participants can video conference with each other simultaneously. According to certain embodiments of the invention, the computer resources usage are approximately as follows:

For 1-to-2–2.6% cpu usage+25% OS. Thus, 27.6% of total computer resources are used.

For 1-3–3.1% cpu usage+25% OS. Thus, 28.1% of total computer resources are used

For 1-6–10% cpu usage+25% OS. Thus, 35% of total computer resources are used. This is the VORTEX point (pt of no return)

For 1-7–10% cpu usage+25% OS. Thus, 35% of total computer resources are used.

For 1-8–10% cpu usage+25% OS. Thus, 35% of total computer resources are used.

For 1-9–10% cpu usage+25% OS. Thus, 35% of total computer resources are used.

For 1-10–10% cpu usage+25% OS=35%

. . .

For 1-128–10% cpu usage+25% OS. Thus, 35% of total computer resources are used.

For 1-to-128 participant net meeting, the total information data fluctuation was +/−7% (e.g., 35%+/−7% usage), according to certain embodiments of the invention.

Figure 34:
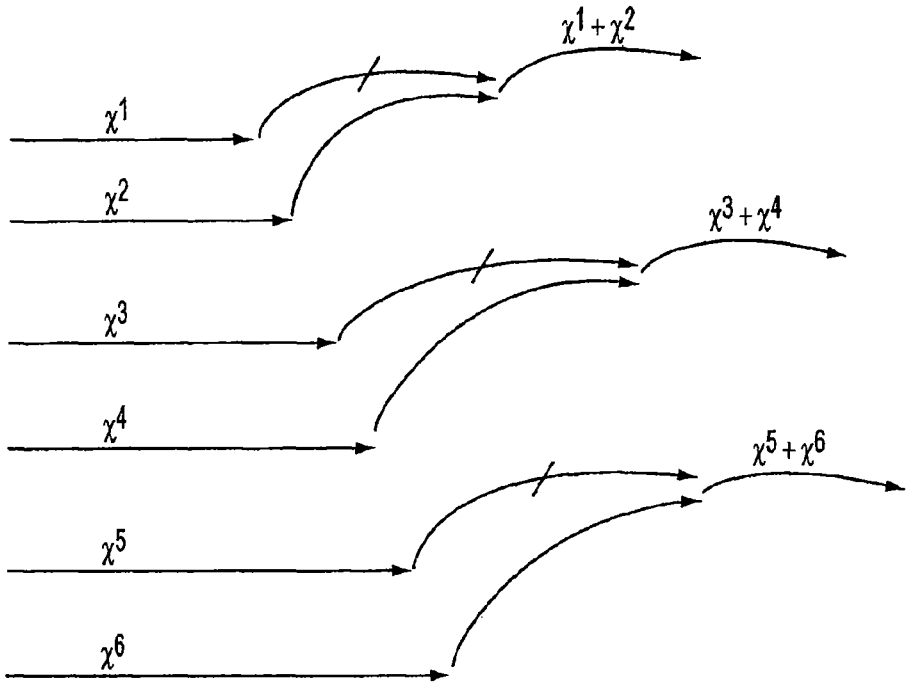
FIG. 34 illustrates combination of data streams in one embodiment.

According to certain embodiments of the invention, FIG. 34 illustrates the spectrum analysis associated with the multi-participant net meeting. With reference to FIG. 34, if needed, data streams x1 and x2 can merge to form a combined data stream x1+x2 when data is sent from a source client computer to a destination client computer through the network. Similarly, data streams x3 and x4 can merge to form a combined data stream x3+x4. Data streams x5 and x6 can merge to form a combined data stream x5+x6, etc. Even though FIG. 34 shows streams x1 to x6, there may be many more streams.

The following events are needed for a given connection in a multi-user net meeting:

1) keep users online and available

2) ID the video conference users

3) ID the messages

Figure 35:
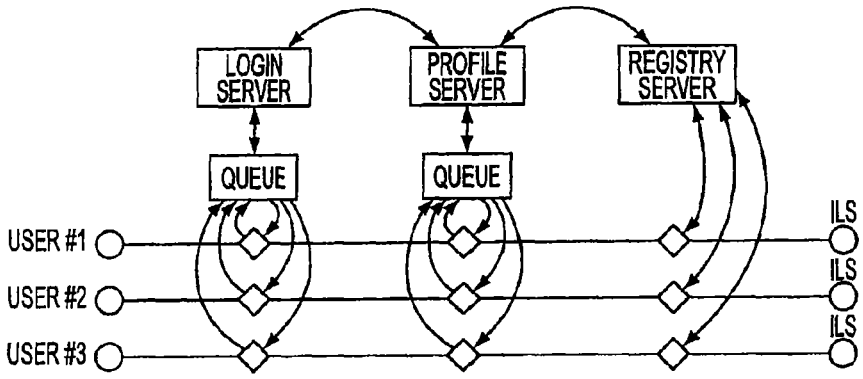
FIG. 35 illustrates connections between user devices or clients and servers in one embodiment.

With reference to FIG. 35, multiple users, such as, user #1, user #2, user #3, etc., are connected to an internet locator server (ILS) in a single stream. The same multicast technology as described above is used to keep users online and available, to ID the video conference users, and to check for messages in one multicast data connection.

With reference to FIG. 35, a multicast data stream is created such that the ILS server connects to the users rather than the users connecting to the ILS server. Once a user comes online, the user connects to the ILS server. The ILS server locates the user, IDs the user and finds out what the user is doing. In the connection shown in FIG. 35, we have 3 servers, namely: 1) login server, 2) profile server, 3) registry server, each connected through a gateway to the network. For example, Windows 2000 and XP have built-in ILS servers. Also, there are hundreds of public ILS servers available worldwide. Note that the login server, profile server and registry server can reside in one servers or more than one server. According to certain embodiments of the invention, when there are more than 1000 users who wish to participate in a given video conference with one another, then at least three server devices are used for housing the login, profile and registry servers.

In FIG. 35, three users are shown connected to the ILS. There is one multicast data connection (for data needed for connecting the users) between the users and the ILS.

The login server and the profile server, is each associated with a multicast queue. See FIG. 35. For example, when user #1 sends out a signal, the login server's queue comes to the gateway and pings client #1. The queue sends many signals. Thus, the queue lines up the signals from each user in the queue. As a result, the login server can process each user one at a time from the queue. For example, it may take the login server 2 to 3 seconds to process 1000 users who want to log in and who are queued up.

After the login server has completed its job, the login server sends a signal to the profile server. The profile server IDs each user. In other words, the profile server checks to see if the user is who the user says he is, or authenticates the identity of the user. When the profile server is done checking out a particular user, the profile server signals the registry server with respect to the user who has just been checked. The registry server sends back information to the profile server regarding user the user.

Note that the first time a new user creates a signature on the multicast network, the registry server comes into play. The new user registers with the registry server. The registry server opens a port to the new user. The new user then enters all his information (name, address, etc.) Once a user is logged in and the user has been checked against the information in the registry server, that particular user can join a given net meeting. The profile server sends back to the user who is on the same stream any messages, or tells the user if there are other users that are waiting to video conference with that user. The profile server also provides information on communication ports, IP numbers, and any other information that the user needs to know for establishing multicast connections.

With reference to FIG. 35, user #1, user #2, and user #3 are logged in and connected to the ILS. Further initially, user #1 is online but is not video conferencing with any other user as yet. User #1 waits to be invited by someone to video conference. At some point, user #3 invites user #1 to a video conference. User #3 sends a message out to the profile server to inform that user #3 wants to invite user #1 to a video conference. Profile server then sends a message to user #1 informing user #1 of user #3's invitation. User #1 can agree to join the video conference by letting the ILS server know of user #1's desire to join. User #1 and user #3 are then connected to each other on the same stream.

Figure 36:
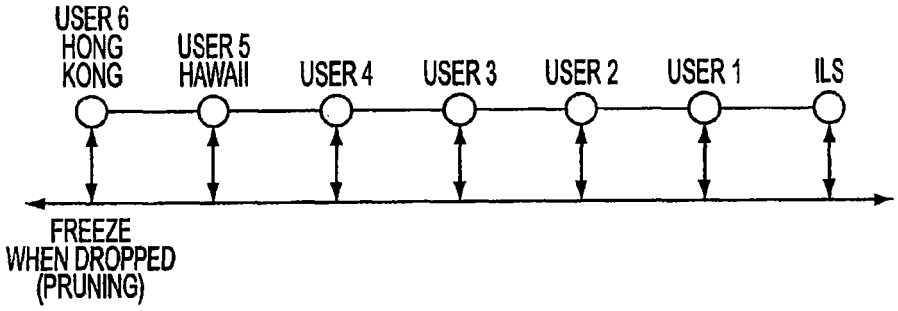
FIG. 36 illustrates users in a conference and pruning in one embodiment.

Each user (client computer) that is connected has an independent open port available to receive the multicast signal. There may be up to 9000 open multicast ports on each client (based on current technological limits). Even though user #1 is connected to user #3, such a connection does not terminate the responsibility of the profile server. Periodically, both user #1 and user #3 will each create a second stream for sending to the profile server. For example, every 10 seconds both user #1 and user #3 will each create a second stream for sending to the profile server. However, the connection to the profile server, at this point, is not a constant steady link. The second stream will check for incoming messages, for example. The check lasts for about 2 seconds and then the connection to profile server breaks up. If there is an incoming message for a user that has logged in, the profile server will respond by sending the message to the appropriate user. When any user sends out that second stream to the profile server but does not get an acknowledgment from the profile server, then it probably means that there is no multicast connection. For example, there will be no multicast connection if the profile server has crashed. And if there is a one-to-many video conferencing, the ILS establishes a stream (connection) from the outer most point in the network. See FIG. 36. In FIG. 36, user 6 (Hong Kong) is the outermost user. In FIG. 36, all the other users will also connect to that connection. If any user drops off, for example Hong Kong, then user 5 (Hawaii) becomes the outermost point. At this point, the ILS server seamlessly drops Hong Kong (without crashing the conference) and connects Hawaii as the outer most point. The Hong Kong zone (video) gets frozen (known as pruning). The 5 remaining users continue video conferencing with one another. The conference will continue until the very last user drops off. When the very last user drops off, the connection shuts down.

Figure 37:
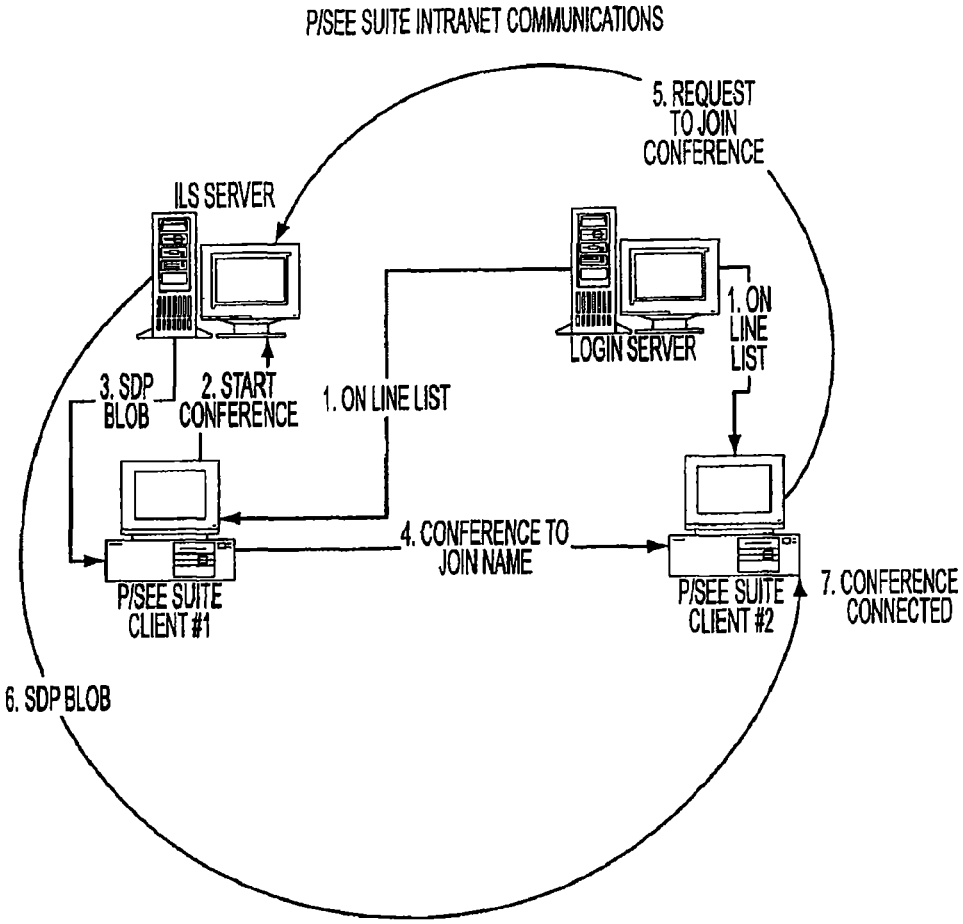
FIG. 37 illustrates connection of a conference in one embodiment.

FIG. 37 illustrates an Intranet connection for a net meeting in certain embodiments of the invention. For purposes of simplicity, only 2 client computers are shown as participants of the net meeting. However, at least 128 participants can be included. With reference to FIG. 37, the following operations are:

Operation 1: Online list sent to each client (the login server send out to every gateway, e.g., to each client informing of who is online.)

Operation 2: client #1 starts conference by connecting ILS server to request start of conference.

Operation 3: The ILS creates a multicast stream containing specific information about the conference to client #1.

Operation 4: client #1 invites client #2 to join the net meeting (video conference) and conference name is sent to client #2.

Operation 5: If Client #2 agrees to join then client #2 will inform the ILS of its desire to join. Client #2 requests the multicast stream containing specific information about the conference.

Operation 6: The multicast stream containing specific information about the conference is sent to client #2.

Operation 7: the conference is connected.

According to certain embodiments of the invention, the rate of sending combined raw video/audio data using multicast needs to match the biggest bandwidth among the participants in the video conferencing group. For example, if someone in the group uses a T1 line, then the source client needs to send out the multicast stream at the rate that is appropriate for a T1 capacity connection. Typically, the capacity of each participant for receiving data is known.

According to certain embodiments of the invention, the method for a one-to-many bi-lateral communication can also be applied to a one-to-many unilateral net meeting (video conferencing).

Recall, there was packet loss in a first pass (forward direction) for a particular stream of packets and the loss disappeared on the return direction. See FIG. 33.

Figure 38:
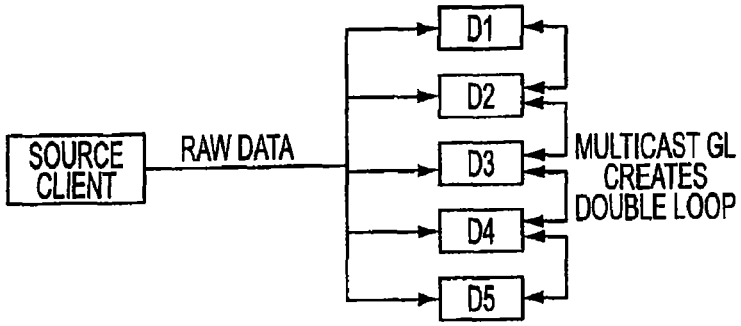
FIG. 38 illustrates double loop connections in one embodiment.

In the case of a one-to-many unilateral net meeting, multicast GL is used in a double loop. See FIG. 38. For example, in FIG. 7, the source client sends combined raw video/audio data to destination client D1, then D1 sends the same data to D2. D2 sends the data back to D1. This is the double loop, which gets rid of packet loss. Thus, the double loop applies for D1 through D5. Note that D1 through D5 are receiving the same data from the source because the data is unilaterally broadcast from the source client. Each destination client checks with the adjacent destination client.

Figure 40:
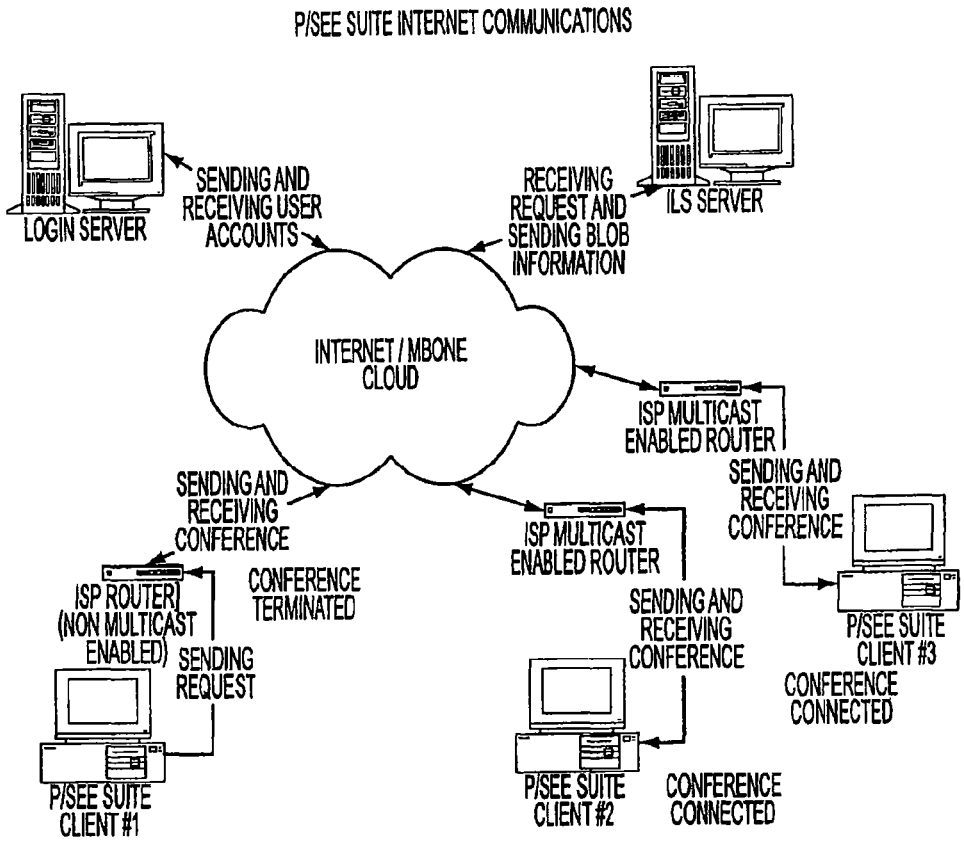
FIG. 40 illustrates conference connections and terminations in one embodiment.
Figure 41:
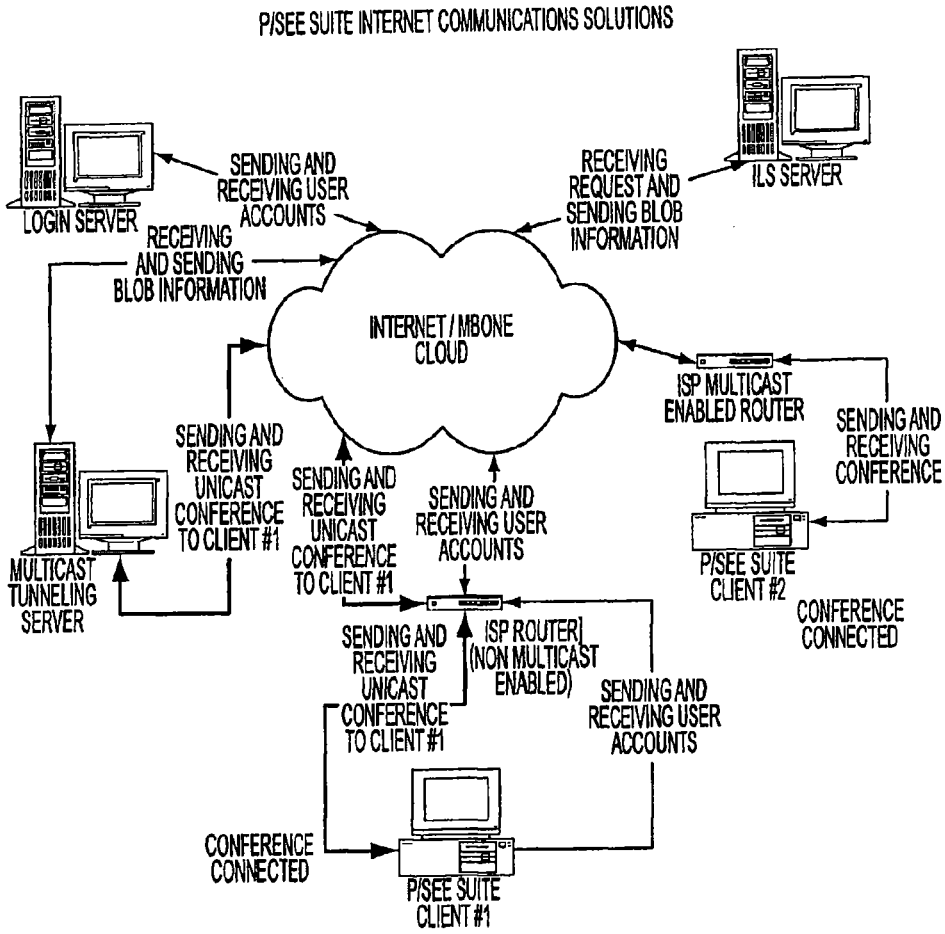
FIG. 41 further illustrates conference connections and terminations in one embodiment.

FIG. 40 and FIG. 41 illustrate a system for a one-to-many bilateral net meeting according to certain embodiments of the invention.

Figure 42:
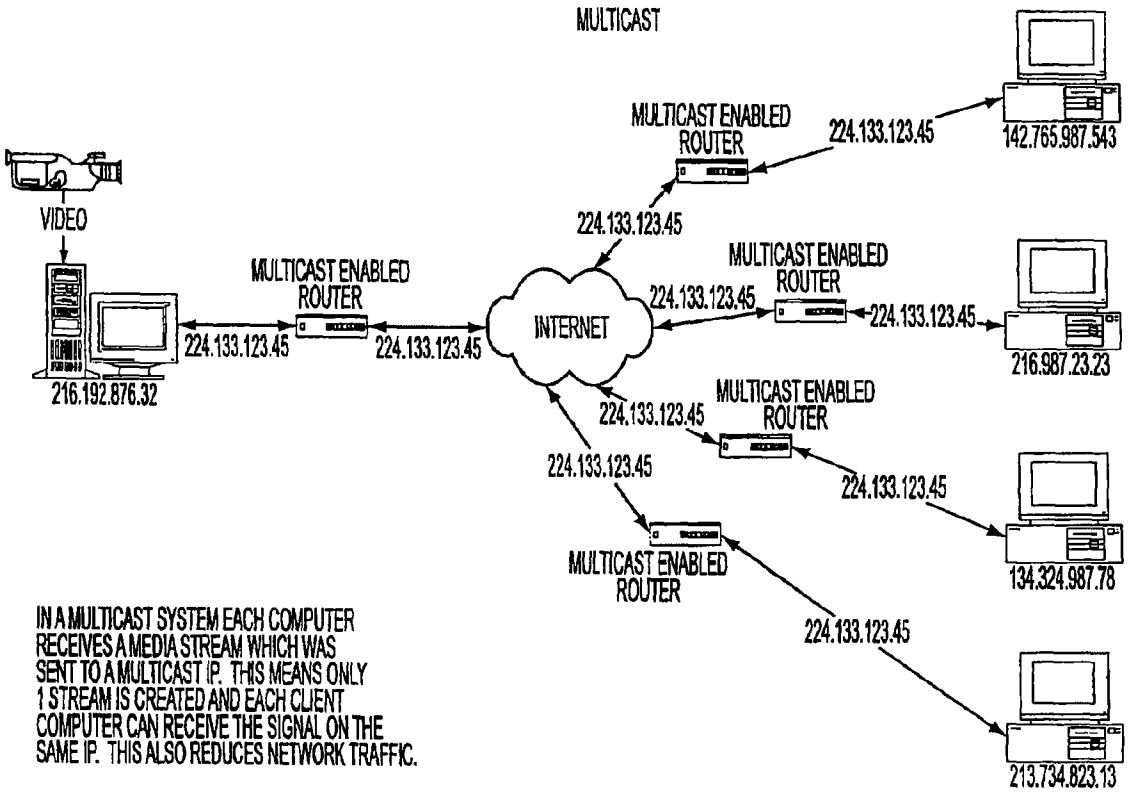
FIG. 42 illustrates multicasting in one embodiment.

FIG. 42 illustrates the multicast characteristics of a one-to-many bilateral net meeting.

E-Mail

According to certain embodiments of the invention, the method for sending combined raw video/audio data through the network as described herein can apply to e-mail systems as well. When video is sent through e-mail, the common problems are (with respect to SMTP):

A. Size of the files: the files are usually too big to be opened by an e-mail application. The average video is 15 megaB, and the application usually can't open more than 5 megaB.

B. Intensity of the network—how many hops (routers) to get from source to destination.

C. Traffic on the network—how many users on the system.

D. Time—the time it takes for recipients to receive their e-mail.

Figure 39:
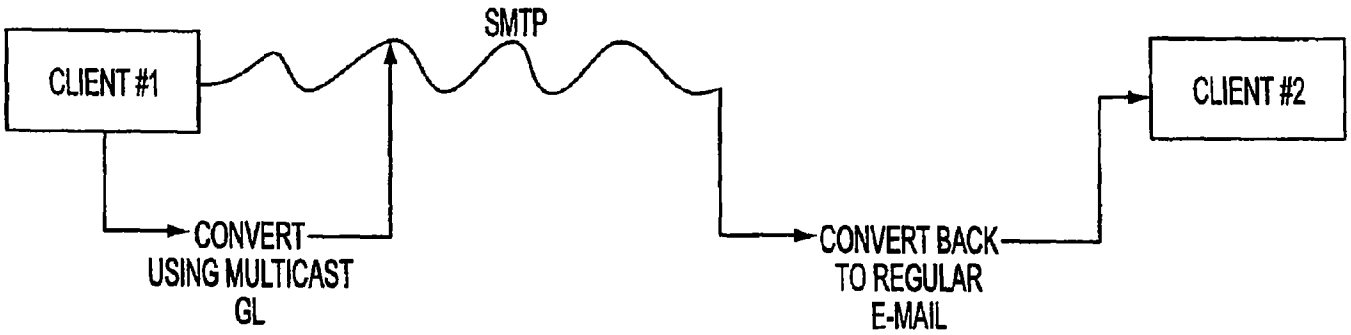
FIG. 39 illustrates using an email for multicasting in one embodiment.

In FIG. 39, e-mail containing raw video/audio content from client #1 is converted using multicast GL and sent through SMTP to client #2. Then, the data is converted back to a regular email message when the data gets to client #2.

For example, in FIG. 39, client #1 sends a 40 second commercial video to client #2 using SMTP. Assume there are about 10 to 15 routers between client #1 and client #2. The raw video/audio data of about 5 MB is stretched file into a 2 Kb stream. Such a process is herein referred to as a Rich Media E-Mail Response (RMER).

In the RMER process, the multicast data stream go through an expedited traversal of the routers between the client computers as long as the routers are multicast enabled. The first multicast enabled router that gets the multicast stream will look at the IP address of the destination client and will fires the stream to the destination IP address.

In certain embodiments of the invention, if a modem does not accept multicast transmissions, then the multicast in sent in the guise of unicast transmission through the modem and onto the first multicast enabled router. Thus, the multicast transmission masquerades as a unicast transmission.

Components

One embodiment of the invention is herein referred to as P/SEE™ Suite for convenience. Further, for convenience, P/SEE™ Suite is described with reference to 6 participants in a net meeting that uses P/SEE™ Suite. However, the scope of the invention is not limited to 6 participants. The number of participants in the net meeting may vary from implementation to implementation. Potentially, thousands of participants may participate in a net meeting, all at one time.

In this example, P/SEE™ Suite has 6 videoconferencing windows, each with the capability to support one Multicast or Unicast user at a time. One client selects the group for a videoconference, then a request message is sent from that client to those other five users, All of those who accept will form the videoconference group.

P/SEE™ Suite easily and instantly transforms a given client computer into a state of the art videoconference workstation. P/SEE™ Suite offers Internet users the freedom to talk with at least five other friends face-to-face on a virtual real time video and audio, in a many-to-many Multicast environment.

P/SEE™ Suite allows for sending and receiving, in real time, video, audio and text to and from anyone in the world via direct connect, local area network, and the Internet. Thus, P/SEE™ Suite provides full motion video, supports full color and runs on Windows 2000 environment and upgrades with on-line services.

Multi-Client Web Browsing

Figure 44:
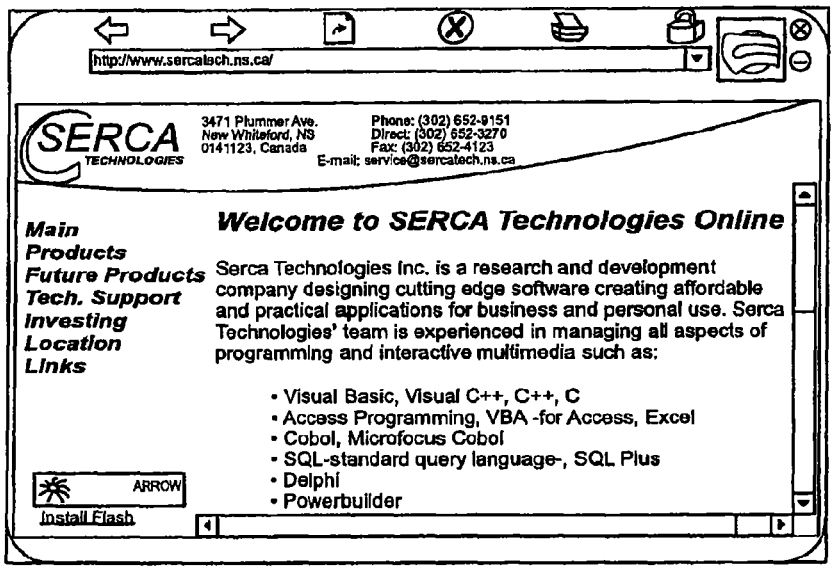
FIG. 44 illustrates browsing in a multicast environment in one embodiment.

P/SEE™ Suite's browser system enables groups of friends to surf the web together. The lock icon, located at the top of the web browser, when clicked, will allow the browser initiator to lock the web sites for the entire group of users. This means that one person can initiate a buddy browsing session, and control the page displayed on the computers of everyone else in the buddy browse session. FIG. 44 illustrates a web browser.

With this multi-client web browsing, the videoconferencing, and the text based chat, meetings via the Internet can be versatile, effective, and comprehensive, not to mention low in cost. Online presentations can be organized, and deployed, in literally a matter of seconds. This is the total package for the office, or for home.

Text Chat: The text-based chat was added in case someone in the friends list does not have audio or video. This text chat is a client/server based, multi-user chat session. Messages can be broadcast to one's whole group of online users, or private messages can be sent to one specific user. This is another excellent addition to this already extensive software application.

Thus, P/SEE™ Suite provides a real-time videoconference, with six different users, allowing them to view web pages together, and send text messages to everyone or private messages to specific users.

The Interface

Figure 43:
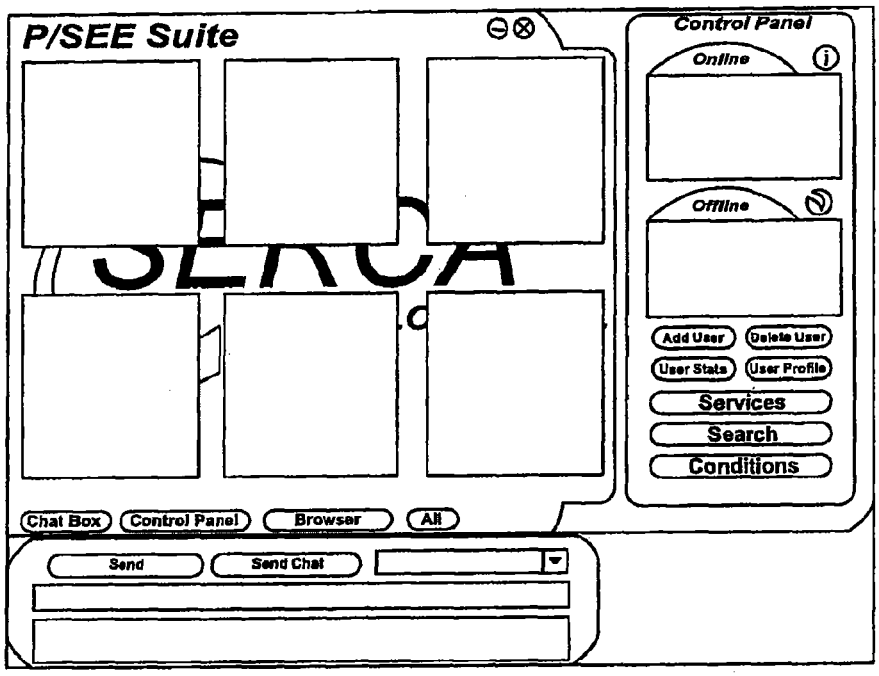
FIG. 43 illustrates a user interface for videoconferencing in one embodiment.

FIG. 43 illustrates the main screen of P/SEE™ suite. In FIG. 43, there are three main parts: 1) the videoconferencing windows, 2) the Control Panel, and 3) the dropdown text chat.

The Videoconferencing Form

The large blocks in FIG. 43 are where the live video stream from each client in the videoconference session appears on a given participant's computer.

The Videoconferencing Form Command Buttons:

With reference to FIG. 43, the following applies:

Chat Box Button: Brings the drop-down text chat box, so one can send text messages to any online friend, or send a message out to everyone online.

Control Panel Button: Slides the Control Panel form out the right side on the Videoconference Window. The control panel's options and buttons are described in the next section.

Browser Button: Opens the Warp Click web browser, for regular, one person web browsing. To initiate a group browse, the intended users must be selected, and a request will be sent to each user. (see FIG. 44 illustrates companion Web Browser to P/SEE™ Suite.)

All Button: Shows both the Control Panel, and the drop-down text chat window, when they are hidden, or contracts them both if they are visible.

The Control Panel Form

The control panel automatically comes into view to the right of the Main Form (video panel). The Control Panel gives the user a view of all the user's P/SEE™ Suite friends that are both online and offline, plus it allows the user access to various services and possible conditions to be set.

The Control Panel can be slid in behind the Main Form and returned to view by pressing the Control or All buttons at the bottom of the Main Form. The Online list box at the top of the Control Panel displays a list of friends that are currently online within P/SEE™ environment. The user can click on up to five other users from this window and videoconference with them. When the user clicks on the individual, the program sends out a request to videoconference with the selected user. The selected user does have the option to decline this request. The Offline list box on the Control Panel displays a list of the user's friends that are offline.

The Control Panel Command Buttons:

Add button: the add button is used to add a new friend (user) to the user's friend list. Pressing this button brings the Search Form into view, to find a specific user. Delete button is used to delete a friend currently on the user's friend list. Pressing this button brings the Delete User Form into view, to delete a specific friend.

Status button: when the status button is clicked by the user, it gives the user the option to be viewed on or offline by other friends in the on and offline lists.

Profile button: the profile button brings the User Profiles Form into view. The information on this form is information that was entered in when the user first registered.

Services button: the services button brings the Service and Links form into view. The form displays eight possible choices for the user to select from. When the button is pressed the default browser is brought into view and the link to the specific site is established.

Search button: the search button brings the Search Form into view. The form allows the user to enter in data on a friend user and perform a search for them so that they may be added to the user's friend's list.

Conditions button: the conditions button brings the Conditions Form into view, to allow the user to view the current settings of the servers and friend's user list. This button brings the Conditions Form into view, and allows the users to change or view specific system conditions. The form is setup with several tabs: Startup, Friends, and Blocked. Startup tab allows the user to view the server's IP numbers, choose to auto-logon (no Password) and the user can also set his contacting status to available or unavailable.

The "Friends" tab displays a list of all the friends of the user and the type of communication between each of the users. E.g. Video check box displays the list of Friends that can have a video connection with the user. Blocked allows the user to view a list of users that have requested the user as a friend and been blocked at the first request. The Remove button allows the user to select a user from the blocked list and remove him from the list.

The "Blocked" tab allows the user to view a list of users that have requested the user as a friend and been blocked at the first request. The Remove button allows the user to select a user from the blocked list and remove him from the list.

Profiles button: The User Profiles Form is accessed from the Control Panel by pressing the Profiles button on the Control Panel. The User Profiles Form allows the user to view, and update their personal information, as well as hide it from other users if they wish. This information can be changed on this form and the appropriate changes will be saved.

Text Chat Form

The Text Chat Form is a text based chat added incase someone in the friends list does not have audio or video. See FIG. 43 for a picture of the drop-down text chat. The white text box is where the user enters his text. He must then click the send button to get his text to be sent. This is a gray text box on the Chat Panel, where the user entered text is stored. The Online list box displays all of the user friends that are currently online. A selection must be made here to send a message to the correct user or all online.

Text Chat Form Buttons:

Send button: the send button, when clicked, sends the current message to the users selected in the list box (upper right corner) and enters the message into the textbox below to view the current conversation.

Save Chat: the save Chat button, when clicked, saves the chat for future reference.

Login Server

The login server connects to clients via TCP winsock connections (all information is encrypted). The login server has the following characteristics:

- login information is processed and transaction is sent to login queue in folder.
- login server checks login out folder for response, is processed and sent back to client.
- TCP connection is then set back to listen state.

Login Queue

The login queue has the following characteristics:

- the queue checks the in folder for any new transactions of registrations and logins.
- if new registration information is found then the information is added to login database.
- if login request the queue verifies login, adds IP to database and sends transaction to profile in folder.
- if logoff request deletes clients IP from database and sends transaction to profile in folder.

Profile Server

The profile server connects to clients via TCP winsock connections (all information is encrypted). The profile server has the following characteristics:

- profile information is processed and transaction is sent to profile queue in folder.
- profile server checks profile out folder for response, is processed and sent back to client.
- TCP connection is then set back to listen state.

Profile Queue

The profile queue has the following characteristics:

- queue checks profile in folder for transactions
- transactions can be for friend list, delete friend and add friend
- response transaction is sent to out folder with information about processed transaction Registration Server The registration server connects to clients via TCP winsock connections (all information is encrypted).

On Registration

- the client connects to the server with 2 connections.
  - 1st connection carries registration information from client to Registration Server.
  - 2nd connection carries Photo information from client to Registration Server (if photo supplied).
  - Server verifies information for duplication—if duplicate information exists then message sent back to client.
  - Server creates a unique serial number that is sent back to the client and used as a unique password for logging onto the system.
  - a transaction is sent to the login and profile queues with new registration information.

On Searches or Adding to Friend list

- a query is sent to the registration server via TCP winsock connection.
- Registration database is queried and results are sent back to client.

P/SEE™ Podium

P/SEE™ Podium is a video conferencing tool aimed at long distance education via the Internet. P/SEE™ Podium allows real time audio and video to be Multicasting from one to many, while receiving audio from many upon request. See FIG. 45.

A scheduled time is given to the users, so that they know when the conference lecture will begin. The students must log into a TCP/IP server and their IP address information is forwarded to the Podium Host. These IP's are then fed into P/SEE™ Podium. The lecture will be sent only to the IP address forwarded by the server. The lecture will happen in real time. The people receiving the lecture will be able to prompt the Podium and send feedback or questions. The Professor/Podium only will receive this feedback. The Podium may then reply.

Details of P/SEE™ Podium:

Frame rates: Rates of 15-32 fps may be achieved, based on a video window of ¼ screen on a 600×800 screen resolution, Video is H-323 and H-324 compliant and can be received by non-Podium viewer if the viewer is multicast enabled, audio is compliant with G-711 and can be extracted by non-podium viewer. On a 56 k modem, ISDN, xDSL, Cable and Satellite rates up to full motion video may be achieved—these frame rates are all approximate due to the nature of the Internet. With the Internet, time of day, local net traffic, and number of clients can all affect reception rates, the transmission should stay steady. Cable connections have the added disadvantage of bandwidth sharing in their local area. Modems also have the problem of connection speeds, in that even if one has a 56 k modem one might only connect at 1.44 k if there is a lot of line noise or if the dial-up ISP one is using doesn't allow for high-speed connections. Also in most areas the fastest a 56 k modem can connect is 53 k.

RMER™ (Rich Media Email Response)

What can be sent through e-mail is limited by the size of digital data that can be emailed across the Internet because of available bandwidth. Due to this limitation the sending of video or real-time visual data used for the purposes of multiple conference calling or advertising is prohibitive. However, RMER™ overcomes such limitations without the need for data compression technology. RMER™ allows for the flow of video data to be transmitted across the Internet at a size of approximately 2 Kb. RMER™ is not a new form of compression technology, but instead is a way of "reconstituting" the present information into a format that is more efficiently sized for transmission.

This "reconstitution" of video data will allow the use of the Internet and the wireless network, to send video data directly to new generation cell phones for face to face conversations. The direct mailing of business advertising to cell phone users, who have interest in particular areas of industry, becomes a possibility with specific targeting of clients to more efficiently get information across to relevant user groups.

RMER™ allows the movement of visual information that promotes endless possibilities for the communications and advertising industries to blanket all markets with a release through every level of receiving mediums, be it wireless phone, personal computer, or some yet to be developed form of personal communication. RMER™ is a technology that can be attached to other products to enable Multicasting to become a web wide phenomenon and create multiple conference calling, which at this point can only be achieved inside a wider Area Network (WAN) within a controlled environment.

Server Transaction System

This newly developed system incorporates a highly developed server transaction system. Taking full advantage of both the UDP and TCP winsocks that allows the server based system to interact with the client with speed and reliability. This makes the task of signing up and logging on to P/SEE Suite user friendly and very secure through the use of embedded encryption.

All personal information sent to the servers is scrutinized and validated for duplication then stored on a secure database. The user is then given their password and user identification number in the form of a message box and is also told where to find this information if needed in the future. The user is then logged on for a trial period to test the product. This registration information is tracked and can be used on the user's computer at home or in the office or on a portable PC system. If the application is transported from one machine to another, and a reinstall is performed with the proper registration information, it will allow the user to logon from anywhere (makes application portable).

Using P/SEE™ Suite and Adding to Friend List

From this point the user is given the instruction that they have no friends on their friend list and must add people to their list in order to talk or video conference with any other P/SEE™ Suite users. As a user attempts to add new users to their personalized friend list, the person that is requested to be placed on any other persons friend list is prompted to except or refuse this transaction. The request is placed in a queue to be processed by a server whenever the user is online. Should the request be accepted, the user requesting a friend is automatically added to the friend list of the person they requested. The requester is notified either way.

Time to Conference

The friends on the friend list are ready to communicate with each other. If there are friends on the online list, the user can talk to them via a chat box without ever engaging in a Video/Audio conference. The user can chat, by dropping down the chat box and selecting everybody online or selecting the individual that the user wants to text chat with. The text chat is displayed in a small field and can be saved as a text file for future reference.

Video/Audio Conferencing

The user can also start a video/audio conference at this point. Providing that the user has friends on his online list, the user can select a group of up to five friends that the user wants to conference with. Once the group is established the user can then request that the people selected in the group join the conference. The people who are selected have the option to join or refuse. Should they join, they will automatically be joined to this video/audio conference using our highly advanced technology that take full advantage of DirectX, Direct Show and many other technologies which include the use of Multicasting technology.

Browsing and Surfing the Internet

Another intriguing aspect to this application is the fact that it incorporates a unique Internet browser that enhances Internet speed of browsing and will allow one to take one's friends along with one on one's web browsing session. It gives the user the ability to lock on to a friend's browser (should the friend accept the user's request) of the group and whatever web site the user goes to, the friend's browser is automatically taken to the same site.

Figure 45:
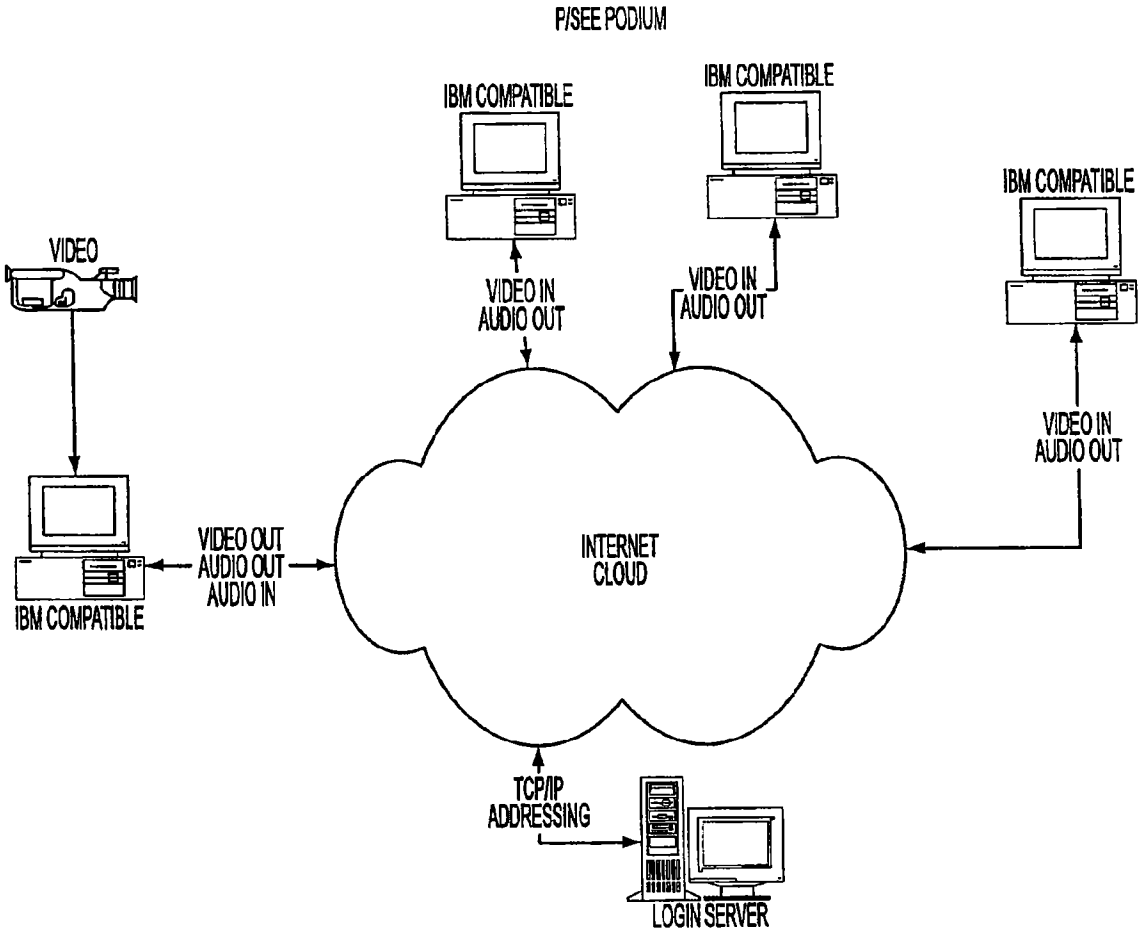
FIG. 45 illustrates a one-to-many videoconference in one embodiment.

According to certain embodiments of the invention, FIG. 45 illustrates a system for implementing P/See Podium.

Figure 46:
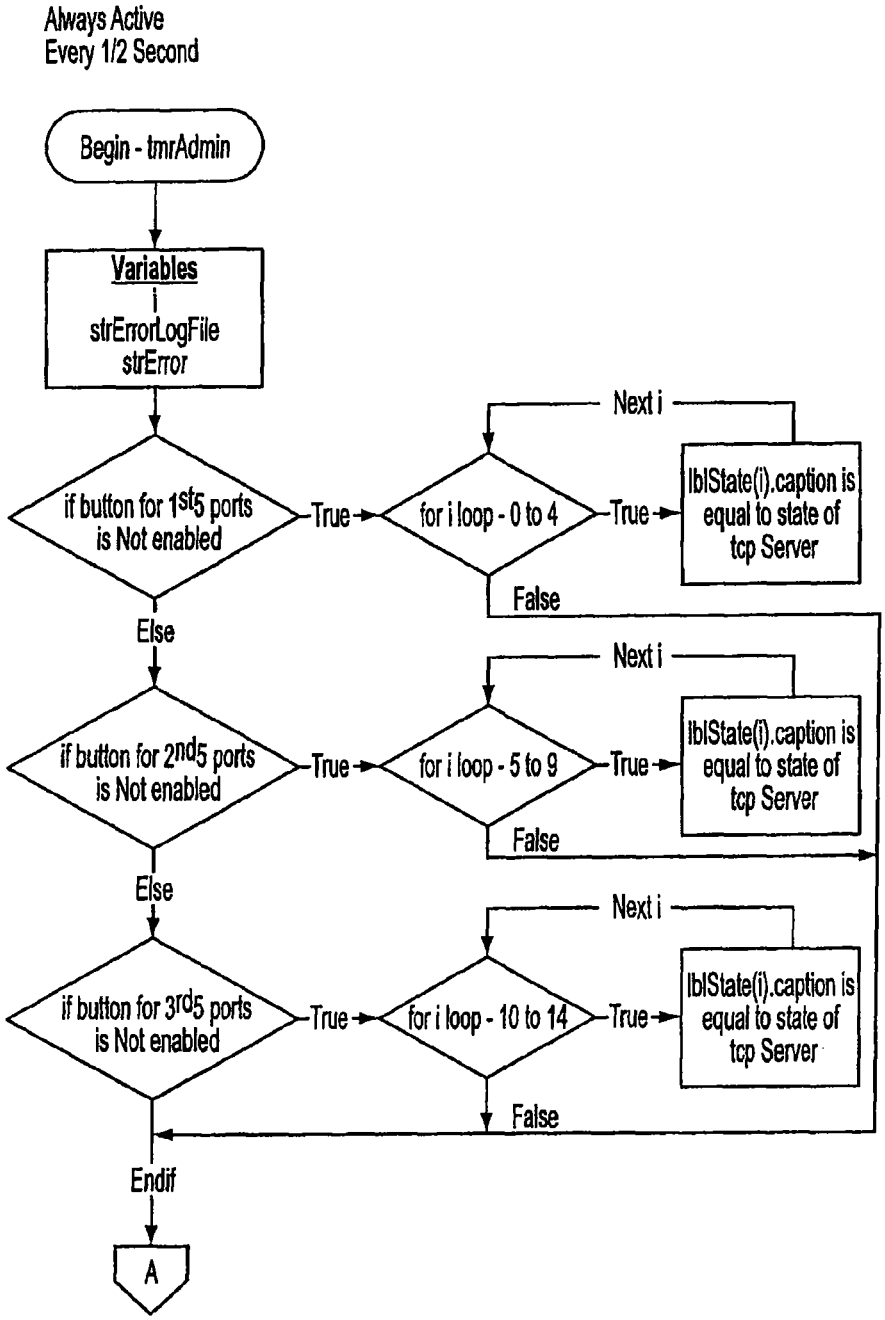
FIG. 46 illustrates the flow of information from a source client computer to the ILS through the login server, the profile server, and through the registry server in one embodiment.

According to certain embodiments of the invention, FIG. 46 illustrates the flow of information from a source client computer to the ILS through the login server, the profile server, and through the registry server.

Figure 47:
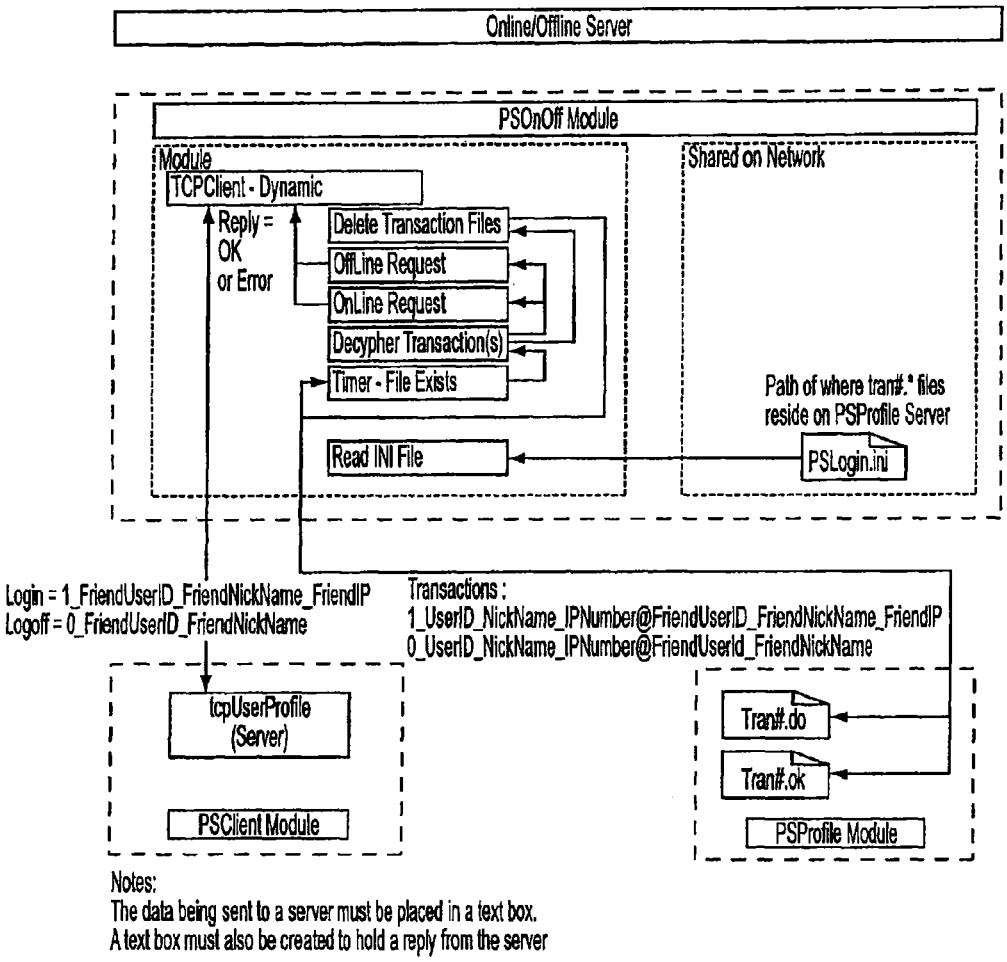
FIG. 47 illustrates the flow of data through the login server, profile server, and registry server in one embodiment.

According to certain embodiments of the invention, FIG. 47 illustrates the flow of data through the login server, profile server, and registry server.

Figure 48:
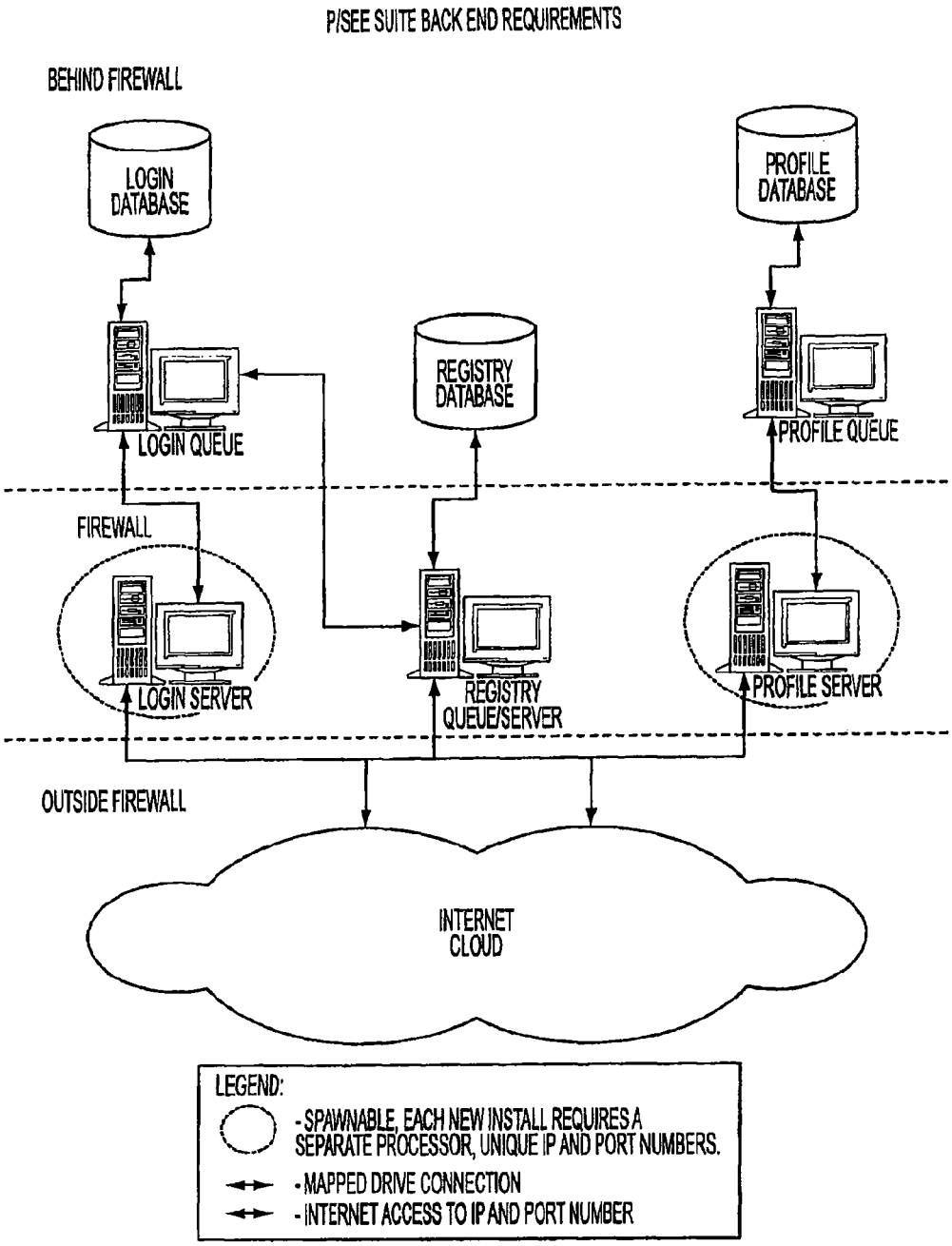
FIG. 48 illustrates the backend requirements for a 3-server set-up (login/profile/registry servers) in one embodiment

According to certain embodiments of the invention, FIG. 48 illustrates the backend requirements for a 3-server set-up (login/profile/registry servers).

Altorete (Advanced of P/SEE Suite)

Figure 49:
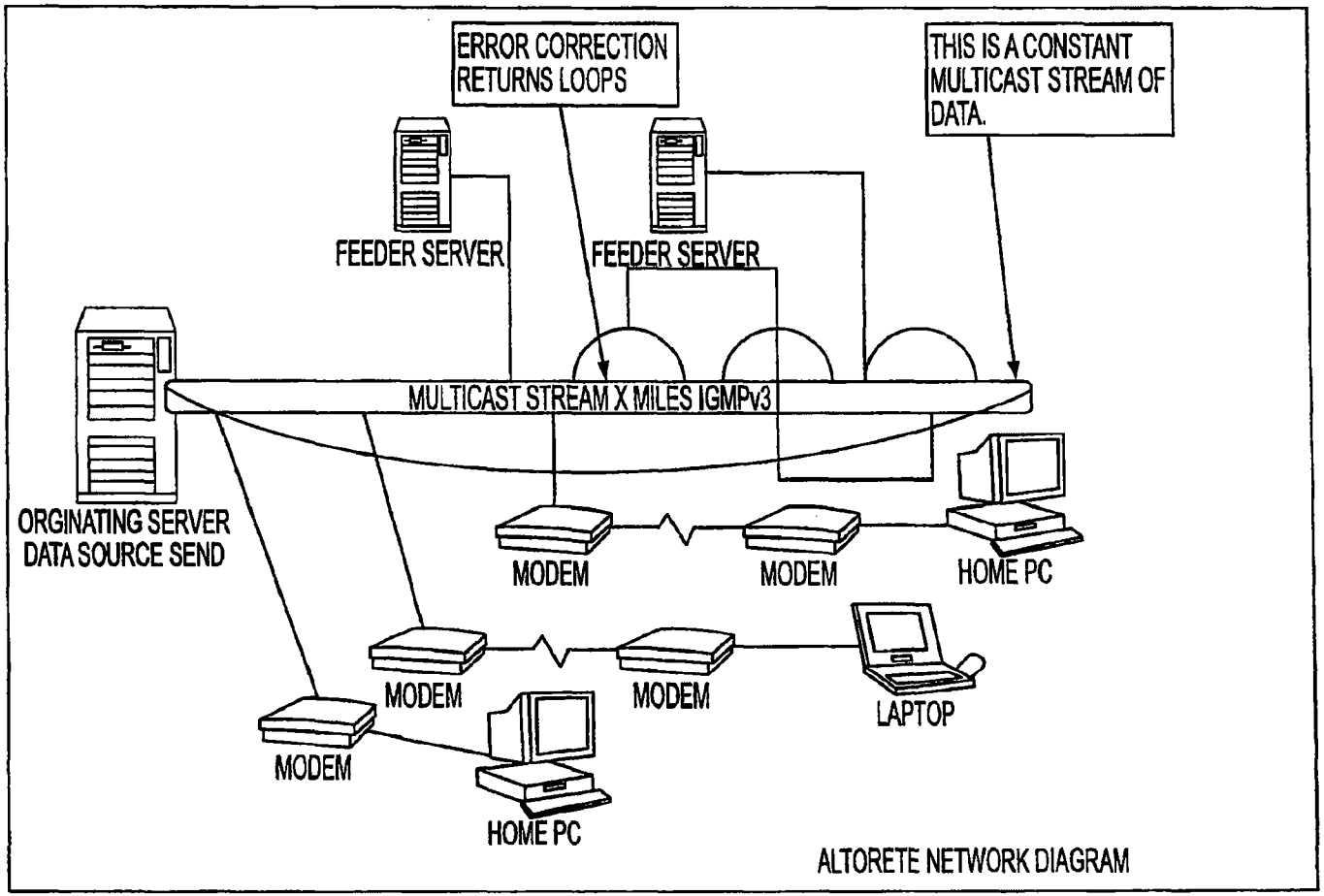
FIG. 49 illustrates a set of interconnected systems with a data stream flowing therebetween in one embodiment.

Altorete is the advanced flow of datagrams through a multicast stream. Once a stream has been created by the originating (source) server, the stream continuously travels along the data pipe (satellite, fiber optic, or twisted pair) endlessly in a circle. At connector points within the loop, modems are used to access the data and retrieve the data for use on personal computers. The inner circle of the multicast stream contains the core data whereas the outer circle contains the index files and search headers. As the stream passes over a point in the loop, the error correction loops take place assuring that the data has the correct datagram checksums. As the flow continues there is a need to continuously feed data into the Multicast stream, so flow feeder servers are required. These servers act similarly to Dynamic Name Servers (DNS). The data traveling along the pipe is continuously moving at the relative speeds of the network. In cases where a fiber optic network is used, the datagrams can be pushed to avoid some common transit problems of fiber optic cables, thereby increasing transmission speed which may then only be affected by termination points or modems. At a modem point, the multicast datagram is extracted from the stream and sent to the requesting computer in the forest (forest refers to multiple computers in a single stream group). The data is then stored on the user's computer until the moment it requires action to be read and at that point it gets deleted, hence the TTL (Time to Live is 0). The stream continues. See FIG. 49.

The following description is intended to provide an overview of computer hardware and other operating components suitable for performing the methods of the invention described above, but is not intended to limit the applicable environments. The invention can be practiced with other computer system configurations, including hand-held devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network.

Several computer systems may be coupled together through a network, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art.

Access to the Internet is typically provided by Internet service providers (ISP). Users on client systems obtain access to the Internet through the Internet service providers. Access to the Internet allows users of the client computer systems to exchange information, receive and send e-mails, and view documents, such as documents which have been prepared in the HTML format. These documents are often provided by web servers, which are considered to be "on" the Internet. Often these web servers are provided by the ISPs, although a computer system can be set up and connected to the Internet without that system also being an ISP.

The web server is typically at least one computer system which operates as a server computer system and is configured to operate with the protocols of the World Wide Web and is coupled to the Internet. Optionally, the web server can be part of an ISP which provides access to the Internet for client systems. The web server is typically coupled to the server computer system which itself is coupled to web content, which can be considered a form of a media database. While two computer systems are described, the web server system and the server computer system can be one computer system having different software components providing the web server functionality and the server functionality provided by the server computer system which will be described further below.

Client computer systems can each, with the appropriate web browsing software, view HTML pages provided by the web server. The ISP provides Internet connectivity to the client computer system through a modem interface which can be considered part of the client computer system. The client computer system can be a personal computer system, a network computer, a Web TV system, or other such computer system.

Similarly, the ISP provides Internet connectivity for client systems, although the connections need not be the same for the various computer systems. One client computer system may be coupled through a modem interface while other client computer systems may be part of a LAN. While interfaces to a network may be described generically as a "modem," each of these interfaces can be an analog modem, ISDN modem, cable modem, satellite transmission interface (e.g. "Direct PC"), or other interfaces for coupling a computer system to other computer systems. Client computer systems may be coupled to a LAN through network interfaces, which can be Ethernet network or other network interfaces. The LAN may also be coupled to a gateway computer system which can provide firewall and other Internet related services for the local area network. This gateway computer system may be coupled to the ISP to provide Internet connectivity to the client computer systems. The gateway computer system can be a conventional server computer system. Also, the web server system can be a conventional server computer system.

Alternatively, a server computer system can be directly coupled to the LAN through a network interface to provide files and other services to the clients without the need to connect to the Internet through the gateway system.

In one embodiment, one example of a conventional computer system that can be used as a client computer system or a server computer system or as a web server system is described as follows. Such a computer system can be used to perform many of the functions of an Internet service provider. The computer system interfaces to external systems through a modem or network interface. It will be appreciated that the modem or network interface can be considered to be part of the computer system. This interface can be an analog modem, ISDN modem, cable modem, token ring interface, satellite transmission interface (e.g. "Direct PC"), or other interfaces for coupling a computer system to other computer systems.

The computer system includes a processor, which can be a conventional microprocessor such as an Intel Pentium microprocessor or Motorola Power PC microprocessor. Memory is coupled to the processor by a bus. Memory can be dynamic random access memory (DRAM) and can also include static RAM (SRAM). The bus couples the processor to the memory, also to non-volatile storage, to a display controller, and to an input/output (I/O) controller.

The display controller controls in the conventional manner a display on a display device which can be a cathode ray tube (CRT) or liquid crystal display (LCD) for example. The input/output devices can include a keyboard, disk drives, printers, a scanner, and other input and output devices, including a mouse or other pointing device. The display controller and the I/O controller can be implemented with conventional well known technology. A digital image input device can be a digital camera which is coupled to an I/O controller in order to allow images from the digital camera to be input into the computer system.

The non-volatile storage is often a magnetic hard disk, an optical disk, or another form of storage for large amounts of data. Some of this data is often written, by a direct memory access process, into memory during execution of software in the computer system. One of skill in the art will immediately recognize that the terms "machine-readable medium" or "computer-readable medium" includes any type of storage device that is accessible by the processor and also encompasses a carrier wave that encodes a data signal.

The computer system is one example of many possible computer systems which have different architectures. For example, personal computers based on an Intel microprocessor often have multiple buses, one of which can be an input/output (I/O) bus for the peripherals and one that directly connects the processor and the memory (often referred to as a memory bus). The buses are connected together through bridge components that perform any necessary translation due to differing bus protocols.

Network computers are another type of computer system that can be used with the present invention. Network computers do not usually include a hard disk or other mass storage, and the executable programs are loaded from a network connection into the memory for execution by the processor. A Web TV system, which is known in the art, is also considered to be a computer system according to the present invention, but it may lack some of the features described above, such as certain input or output devices. A typical computer system will usually include at least a processor, memory, and a bus coupling the memory to the processor.

In addition, the computer system may be controlled by operating system software which includes a file management system, such as a disk operating system, which is part of the operating system software. One example of an operating system software with its associated file management system software is the family of operating systems known as Windows® from Microsoft Corporation of Redmond, Wash., and their associated file management systems. Another example of an operating system software with its associated file management system software is the LINUX operating system and its associated file management system. The file management system is typically stored in non-volatile storage and causes the processor to execute the various acts required by the operating system to input and output data and to store data in memory, including storing files on the non-volatile storage.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention, in some embodiments, also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language, and various embodiments may thus be implemented using a variety of programming languages.

From the foregoing, it will be appreciated that specific embodiments of the invention have been described herein for purposes of illustration, but that various modifications may be made without deviating from the spirit and scope of the invention. In some instances, reference has been made to characteristics likely to be present in various or some embodiments, but these characteristics are also not necessarily limiting on the spirit and scope of the invention. In the illustrations and description, structures have been provided which may be formed or assembled in other ways within the spirit and scope of the invention. As an example, methods have been illustrated and described as linear processes, but such methods may have operations reordered or implemented in parallel within the spirit and scope of the invention. Accordingly, the invention is not limited except as by the appended claims.

In particular, the separate modules of the various block diagrams represent functional modules of methods or apparatuses and are not necessarily indicative of physical or logical separations or of an order of operation inherent in the spirit and scope of the present invention. Similarly, methods have been illustrated and described as linear processes, but such methods may have operations reordered or implemented in parallel within the spirit and scope of the invention. Accordingly, the invention is not limited except as by the appended claims.

What is claimed is:

1. A method for multicasting data through a network in real-time, the method comprising the computer-implemented acts of:

multicasting said data through said network as a data stream having a specific rate using a bi-directional delivery protocol (BDP);

determining an available bandwidth of said network to connect to a first client; and dynamically adjusting a rate of the data stream based on the available bandwidth determined for said network, wherein, the adjusted rate of the data stream is selected such that the first client having available network bandwidth to receive the data stream at the adjusted rate based on the available bandwidth;

wherein, said dynamic adjustment of the rate of the data stream occurs automatically based on the available bandwidth, multicasting at least a portion of the data to the first client at the adjusted rate based on the available bandwidth;

sending a signal to a checksum point to request a data packet of the data that is missing from the at least a portion of the data received at the first client;

passing corrective data through the network via the bi-directional delivery protocol; and performing error correction to reduce packet loss using checksums when multicasting said data;

wherein, said data comprises video data that is multicasted through the network in uncompressed form, and wherein, said bi-directional delivery protocol (BDP) comprises sending a binomial TCP forward packet and a simple UDP backwards packet allowing for matching up of the TCP packet and the UDP packet.

2. The method of claim 1, further comprising:

multicasting the data to a second client connected to said network.

3. The method of claim 2, further comprising:

using a multicast global listener (multicast GL) between the first and second clients to correct for packet loss;

wherein, the first client sends the data to the second client and the second client sends the data to the first client.

4. The method of claim 3, wherein, the multicast GL is implemented in, one or more of, TAPI 3 and IGMPv3.

5. The method of claim 2, further comprising multicasting the data through the network from the second client; and receiving the data at the first client.

6. The method of claim 2, further comprising:

performing a multi-client web browsing session;

wherein, a browser at the first client is locked to a browser at the second client and displays the same website as that displayed at the second client.

7. The method of claim 1, wherein, said determining of the available bandwidth is based on a source client connected to said network and configured to send the rate of data stream.

8. The method of claim 7, wherein said determining of the available bandwidth is performed, by the source client, through a process of increasing and decreasing the rate of the rate of data stream sent for delivery to the first client.

9. The method of claim 8, wherein the first client and a second client join a group configured to receive the rate of data stream, and wherein the rate of the rate of data stream corresponds to a receiving rate of the first client and the second client.

10. The method of claim 1, wherein, the data includes audio data.

11. The method of claim 10, wherein, the audio data is uncompressed.

12. The method of claim 1, wherein, to determine the available bandwidth, the first client receives a second rate of data stream.

13. The method of claim 12, wherein, the first client ceases to receive the second rate of data stream upon determination of insufficient available bandwidth.

14. The method of claim 1, wherein an increase in the available network bandwidth is achieved by filtering specific information from the rate of data stream multicast through the network.

15. The method of claim 14, wherein the specific information is selected from the group consisting of a frame type, layer, frequency, and codec.

16. The method of claim 1, wherein, the data comprises live updates to a sporting event.

17. The method of claim 1, further comprising:

receiving a checksum result at the first client; and determining a list of data packets that are missing from the at least a portion of the data received at the first client using the checksum result.

18. The method of claim 1, wherein, the network is a local area network or wide area network.

19. The method of claim 1, wherein, the network is the internet or an intranet.

20. The method of claim 1, wherein, the network is a wireless network.

21. The method of claim 1, wherein, the first client is a wireless phone.

22. The method of claim 1, wherein the dynamic adjustment of the rate of data stream is based on modifying a TCP window size and modifying a compression rate of the data of the rate of data stream.

23. The method of claim 1, wherein the rate of data stream is directed through one or more routers located on the network, wherein the one or more routers are not actively enabled for multicasting.

* * * * *